United States Patent
Kendrick et al.

(10) Patent No.: US 10,263,254 B2
(45) Date of Patent: Apr. 16, 2019

(54) TIN-CONTAINING COMPOUNDS

(71) Applicants: FARADION LIMITED, Yorkshire (GB); SHARP KABUSHIKI KAISHA, Osaka (JP)

(72) Inventors: Emma Kendrick, Oxford (GB); Robert Gruar, Oxford (GB); Motoaki Nishijima, Osaka (JP); Hirotaka Mizuhata, Osaka (JP); Takuya Otani, Osaka (JP); Isao Asako, Osaka (JP); Yuichi Kamimura, Osaka (JP)

(73) Assignees: Faradion Limited, Yorkshire (GB); Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 15/311,982

(22) PCT Filed: May 22, 2015

(86) PCT No.: PCT/GB2015/051515
§ 371 (c)(1),
(2) Date: Nov. 17, 2016

(87) PCT Pub. No.: WO2015/177568
PCT Pub. Date: Nov. 26, 2015

(65) Prior Publication Data
US 2017/0092947 A1    Mar. 30, 2017

(30) Foreign Application Priority Data
May 22, 2014   (GB) .................................. 1409142.5

(51) Int. Cl.
*H01M 4/485* (2010.01)
*C01G 19/00* (2006.01)
(Continued)

(52) U.S. Cl.
CPC ............ *H01M 4/485* (2013.01); *C01G 19/00* (2013.01); *C01G 19/006* (2013.01);
(Continued)

(58) Field of Classification Search
None
See application file for complete search history.

(56) References Cited

U.S. PATENT DOCUMENTS

| 2009/0239149 A1 | 9/2009 | Choi et al. |
| 2010/0233534 A1* | 9/2010 | Iwama ................ H01M 4/0421 429/209 |

(Continued)

FOREIGN PATENT DOCUMENTS

| EP | 2 533 334 A1 | 12/2012 |
| JP | 2009-224305 A | 10/2009 |

(Continued)

OTHER PUBLICATIONS

Daniel Buchholz et al.: "P2-type layered $Na_{0.45}Ni_{0.22}Co_{0.11}Mn_{0.66}O_2$ as intercalation host material for lithium and sodium batteries", Electrochimica Acta, vol. 110, 2013, pp. 208-213.

(Continued)

*Primary Examiner* — Wyatt P McConnell
(74) *Attorney, Agent, or Firm* — Renner, Otto, Boisselle & Sklar, LLP

(57) ABSTRACT

The invention relates to novel materials of the formula: $A_uM^1_vM^2_wM^3_xO_{2\pm\delta}$ wherein A is one or more alkali metals; $M^1$ comprises one or more redox active metals with an oxidation state in the range +2 to +4; $M^2$ comprises tin, optionally in combination with one or more transition metals; $M^3$ comprises one or more transition metals either alone or in combination with one or more non-transition elements selected from alkali metals, alkaline earth metals, other metals, metalloids and non-metals, with an oxidation state in (Continued)

the range +1 to +5; wherein the oxidation state of M1, M2, and M3 are chosen to maintain charge neutrality and further wherein δ is in the range $0 \leq δ \leq 0.4$; U is in the range $0.3 < U < 2$; V is in the range $0.1 \leq V < 0.75$; W is in the range $0 < W < 0.75$; X is in the range $0 \leq X < 0.5$; and $(U+V+W+X) < 4.0$. Such materials are useful, for example as electrode materials, in rechargeable battery applications.

18 Claims, 50 Drawing Sheets

(51) Int. Cl.
C01G 45/12 (2006.01)
C01G 49/00 (2006.01)
C01G 51/00 (2006.01)
C01G 53/00 (2006.01)
H01M 4/505 (2010.01)
H01M 4/525 (2010.01)
H01M 10/054 (2010.01)
H01M 10/052 (2010.01)
H01M 10/36 (2010.01)

(52) U.S. Cl.
CPC ....... *C01G 45/1228* (2013.01); *C01G 49/009* (2013.01); *C01G 49/0027* (2013.01); *C01G 51/42* (2013.01); *C01G 51/50* (2013.01); *C01G 53/42* (2013.01); *C01G 53/50* (2013.01); *H01M 4/505* (2013.01); *H01M 4/525* (2013.01); *H01M 10/054* (2013.01); *C01P 2002/72* (2013.01); *C01P 2006/40* (2013.01); *H01M 10/052* (2013.01); *H01M 10/36* (2013.01)

(56) References Cited

U.S. PATENT DOCUMENTS

2012/0319036 A1* 12/2012 Kajiya ............... C01G 45/1228
  252/182.1
2013/0101751 A1* 4/2013 Berland ................. C23C 14/48
  427/528

FOREIGN PATENT DOCUMENTS

JP    2009-259601 A   11/2009
WO   WO 2013/140174 A2   9/2013
WO   WO 2014/009723 A1   1/2014

OTHER PUBLICATIONS

DingDing Yuan et al.: "P2-type $Na_{0.67}Mn_{0.65}Fe_{0.2}Ni_{0.15}O_2$ cathode material with high-capacity for sodium-ion battery" Electrochimica Acta, vol. 116, 2014 pp. 300-305.

Y.J. Shin et al., Preparation and Magnetic Properties of Some New Layer Rocksalt and Mixed Delafossite-Type Oxides, Mat. Res. Bull., vol. 28, pp. 159-165, 1993.

* cited by examiner

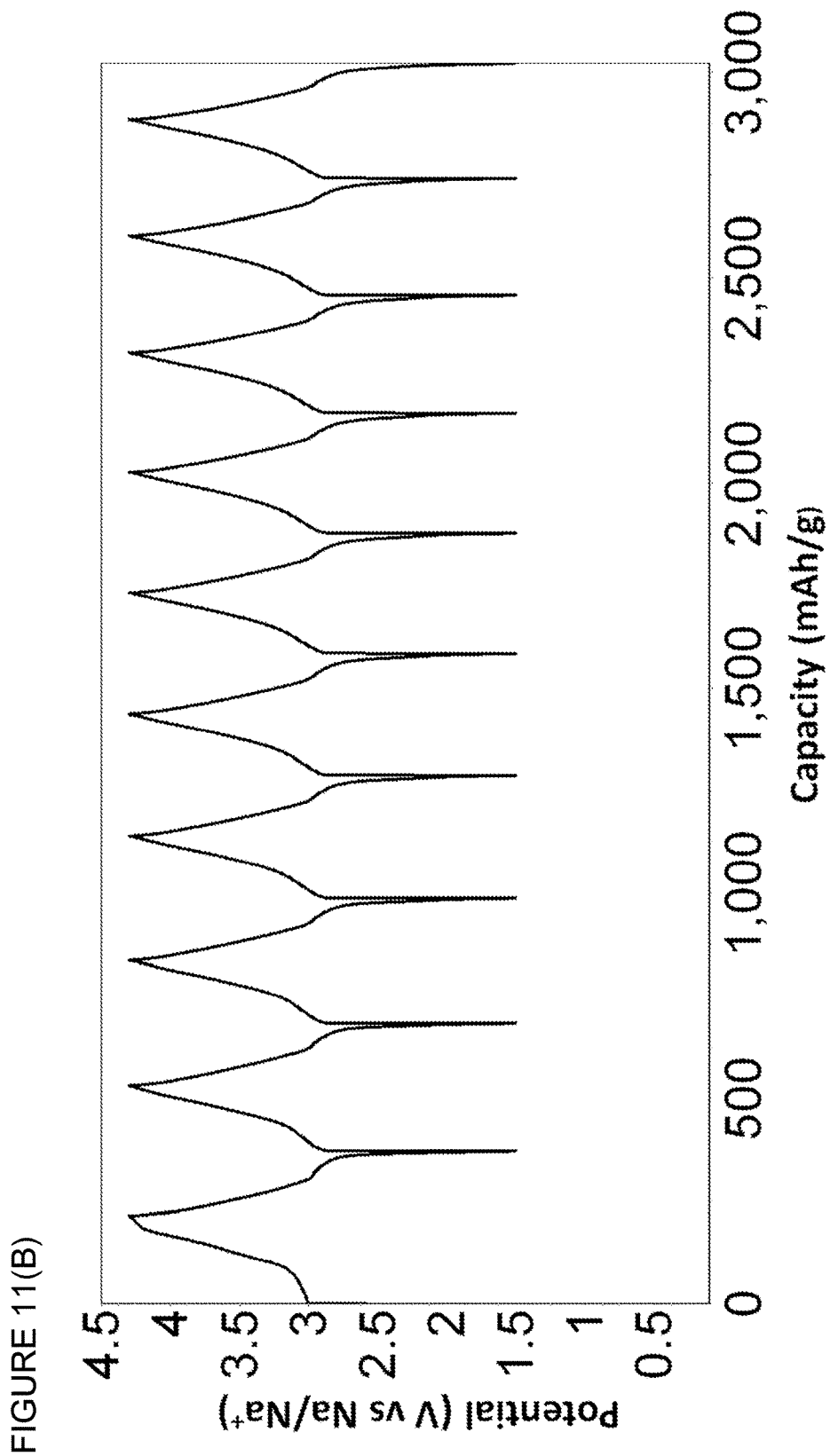

TIN-CONTAINING COMPOUNDS

FIELD OF THE INVENTION

The present invention relates to novel tin-containing compounds, their method of preparation, to novel electrodes which utilise an active material that comprises said tin-containing compounds, and to the use of these electrodes, for example in rechargeable batteries and other energy storage devices.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

$NaNi_{0.5}Mn_{0.5}O_2$ is a known Na-ion material in which the nickel is present as $Ni^{2+}$ while the manganese is present as $Mn^{4+}$. The material is ordered with the Na and Ni atoms residing in discrete sites within the structure. The nickel ions ($Ni^{2+}$) are a redox element which contributes to the reversible specific capacity and the manganese ions ($Mn^{4+}$) play the role of a structure stabilizer. Compound $NaNi_{0.5}Ti_{0.5}O_2$ is analogous to $NaNi_{0.5}Mn_{0.5}O_2$ in that the $Ni^{2+}$ ions provide the active redox centre and the $Ti^{4+}$ ions are present for structure stabilization. There is plenty of literature describing the preparation of $NaNi_{0.5}Mn_{0.5}O_2$ (and to a lesser extent $NaNi_{0.5}Ti_{0.5}O_2$) as the precursor for making $LiNi_{0.5}Mn_{0.5}O_2$ and $LiNi_{0.5}Ti_{0.5}O_2$ by $Na \rightarrow Li$ ion exchange for Li-ion applications. A direct synthesis method to make these Li materials may yield undesirable disordered materials, for example, as a result of the lithium and nickel atoms sharing structural sites. However, recent electrochemical studies reported by Komaba et al Adv. Funct. Mater. 2011, 21, 3859 describe the sodium insertion performance of hard-carbon and layered $NaNi_{0.5}Mn_{0.5}O_2$ electrodes in propylene carbonate electrolyte solutions. The results obtained show that $NaNi_{0.5}Mn_{0.5}O_2$ exhibits some reversible charging and discharging ability, unfortunately however the capacity of the material fades by 25% or more, after only 40 cycles which makes the use of this material extremely disadvantageous for rechargeable energy storage applications.

Work is now being undertaken to find even more efficient electrochemically active materials, which have large charge capacity, are capable of good cycling performance, highly stable, and of low toxicity and high purity. Of course, to be commercially successful, the cathode materials must also be easily and affordably produced. This long list of requirements is difficult to fulfil but it is understood from the literature that the active materials which are most likely to succeed are those with small particle size and narrow size distribution, with an optimum degree of crystallinity, a high specific surface area, and with uniform morphology.

Prior art, for example PCT/GB2013/051822 and PCT/GB2013/050736, also describes that electrochemical activity is substantially improved in both specific capacity and cathode material stability, for active materials with metal constituents of certain defined oxidation states and further particularly for active materials with an O3 layered oxide crystal structure.

As described below, the present Applicant has designed a novel series of compounds which are straightforward to manufacture and easy to handle and store. Further the invention provides cost effective electrode materials, particularly cathode materials, for use in a sodium ion, a lithium-ion or a potassium-ion battery. Particularly advantageous is the high reversible discharge capacity observed even with a heavy metal addition. The cyclability of the materials of the present invention is also reasonably high.

Therefore, the first aspect of the present invention provides compounds of the formula:

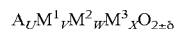

$$A_U M^1{}_V M^2{}_W M^3{}_X O_{2 \pm \delta}$$

wherein

A is one or more alkali metals, preferably selected from sodium, lithium and potassium;

$M^1$ comprises one or more redox active metals with an oxidation state in the range +2 to +4, preferably with an average oxidation state of +2 or +3;

$M^2$ comprises tin, optionally in combination with one or more transition metals, preferably with an oxidation state in the range +3 to +5 and further preferably with an average oxidation state of +4;

$M^3$ comprises one or more transition metals either alone or in combination with one or more non-transition elements selected from alkali metals, alkaline earth metals, other metals and metalloids, with an oxidation state in the range +1 to +5, preferably with an average oxidation state of +3;

wherein the oxidation state of $M^1$, $M^2$, and $M^3$ are chosen to maintain charge neutrality;

and further wherein $\delta$ is in the range $0 \leq \delta \leq 0.4$, preferably $0 \leq \delta \leq 0.2$;

U is in the range $0.3 < U < 2$, preferably $0.5 < U < 2$, further preferably $0.5 < U \leq 1$;

V is in the range $0.1 \leq V < 0.75$;

W is in the range $0 < W < 0.75$, preferably $0.1 < W < 0.75$; further preferably $0.125 < W < 0.75$;

X is in the range $0 \leq X < 0.5$;

and $(U+V+W+X) < 4.0$.

The above formula includes compounds that are oxygen rich or oxygen deficient. Further the oxidation states may or may not be integers i.e. they may be whole numbers or fractions or a combination of whole numbers and fractions.

Preferably the sum of the average oxidation state of $(A+M^1+M^2+M^3)$ is equal to the oxygen charge; i.e. it achieves charge neutrality with the oxygen content.

Further preferably $(U+V+W+X)$ is 3.5.

Yet further preferably $M^3$ comprises one or more transition metals either alone or in combination with one or more non-transition elements selected from alkali metals, alkaline earth metals, other metals an metalloids, with an oxidation state in the range +2 to +4.

Preferably, $M^1$ comprises one or more metals selected from nickel, manganese, cobalt, iron and chromium.

Preferably, $M^2$ comprises tin, optionally in combination with one or more metals selected from magnesium, copper, titanium, vanadium, chromium and manganese, with a preferred oxidation state in the range +3 to +5 and further preferably with an average oxidation state of +4.

Preferably, $M^3$ comprises one or more transition metals selected from titanium, vanadium, niobium, tantalum, hafnium, chromium, molybdenum, tungsten, manganese, iron, osmium, cobalt, nickel, palladium, platinum, copper, silver, gold, zinc, cadmium, scandium, yttrium, zirconium, technetium, rhenium, ruthenium, rhodium, iridium and mercury; and optionally one or more non-transition elements selected from: alkali metals including lithium, sodium and potassium; other metals including aluminium, gallium, indium, lead, bismuth and thallium; alkaline earth metals including magnesium, calcium, beryllium, strontium and barium; and metalloids including boron, silicon, germanium, arsenic, antimony and tellurium.

When $M^3$ includes one or more alkali metals, the alkali metal element(s) may be the same or different from the one or more alkali metals defined in A, however, A and $M^3$ represent two different and distinct crystallographic sites within the structure of the compounds of the invention. As such, the alkali metals in one site may not be regarded as interchangeable with the alkali metal in the other site.

In additionally preferred compounds of the present invention, $M^2 \neq M^3$.

Preferred compounds of the present invention are of the formula:

$$A_U M^1{}_V M^2{}_W M^3{}_X O_2$$

i.e. $\delta = 0$
wherein
A is one or more alkali metals, preferably selected from sodium, lithium and potassium;
$M^1$ comprises one or more redox active metals with an oxidation state in the range +2 to +4, preferably with an average oxidation state of +2 or +3;
$M^2$ comprises tin, optionally in combination with one or more transition metals; with a preferred oxidation state in the range +3 to +5 and further preferably with an average oxidation state of +4;
$M^3$ comprises one or more transition metals either alone or in combination with one or more non-transition elements selected from alkali metals, alkaline earth metals, other metals and metalloids, with an oxidation state in the range +1 to +5, and preferably with an average oxidation state of +3;
wherein
the oxidation state of $M^1$, $M^2$, and $M^3$ are chosen to maintain charge neutrality;
and further wherein
U is in the range $0.3 < U < 2$, preferably $0.5 < U < 2$, further preferably $0.5 < U \leq 1$;
V is in the range $0.1 \leq V < 0.75$;
W is in the range $0 < W < 0.75$, preferably $0.1 < W < 0.75$; further preferably $0.125 < W < 0.75$;
X is in the range $0 \leq X < 0.5$;
and $(U+V+W+X) < 4.0$.

Preferred compounds of the present invention include: e.g.

$$NaNi_{1/2}Mn_{1/4}Sn_{1/8}Ti_{1/8}O_2$$

Especially preferred compounds of the present invention include:

$NaNi_{1/2}Mn_{1/4}Sn_{1/4}O_2$
$NaNi_{1/3}Mn_{1/3}Sn_{1/6}Mg_{1/6}O_2$
$NaNi_{1/2}Mn_{1/4}Sn_{1/8}Ti_{1/8}O_2$
$NaNi_{1/4}Mn_{4/12}Sn_{3/12}Na_{1/6}O_2$
$NaNi_{1/3}Mn_{1/6}Sn_{1/6}Mg_{1/6}Ti_{1/6}O_2$
$NaNi_{1/2}Mn_{1/4}Sn_{1/8}Ti_{1/8}O_2$
$NaNi_{1/2}Ti_{1/4}Sn_{1/4}O_2$
$Na_{0.95}Ni_{0.3167}Mn_{0.3167}Mg_{0.1625}Sn_{0.2018}O_2$
$Na_{0.95}Ni_{0.3167}Sn_{0.3167}Mg_{0.1625}Ti_{0.2018}O_2$
$NaNi_{1/2}Sn_{1/2}O_2$
$NaNi_{1/2}Ti_{1/4}Sn_{1/4}O_2$
$NaNi_{1/2}Ti_{3/8}Sn_{1/8}O_2$
$NaCo_{1/8}Ni_{1/8}Na_{1/6}Mn_{4/12}Sn_{3/12}O_2$
$NaCo_{1/2}Mn_{4/12}Sn_{3/12}Na_{1/6}O_2$
$NaCo_{1/2}Mn_{1/4}Sn_{1/8}Ti_{1/8}O_2$
$NaCo_{1/2}Sn_{1/2}O_2$
$NaCo_{1/2}Sn_{1/4}Ti_{1/4}O_2$
$NaMn_{1/2}Sn_{1/2}O_2$
$NaMn_{1/2}Ti_{1/4}Sn_{1/4}O_2$
$NaFe_{1/2}Mn_{1/4}Sn_{1/8}Ti_{1/8}O_2$
$NaFe_{1/2}Sn_{1/2}O_2$
$NaFe_{1/4}Mn_{4/12}Sn_{3/12}Na_{1/6}O_2$
$NaNi_{1/2}Mn_{1/4}Sn_{1/8}Ti_{1/8}O_{1.9}$
$NaNi_{1/2}Ti_{3/8}Sn_{1/8}O_{1.95}$
$Na_{9/10}Li_{1/10}Ni_{1/2}Mn_{1/4}Sn_{1/8}Ti_{1/8}O_2$
$Na_{8/10}Li_{2/10}Ni_{1/2}Mn_{1/4}Sn_{1/8}Ti_{1/8}O_2$
$Na_{7/10}Li_{3/10}Ni_{1/2}Mn_{1/4}Sn_{1/8}Ti_{1/8}O_2$
$Na_{5/10}Li_{5/10}Ni_{1/2}Mn_{1/4}Sn_{1/8}Ti_{1/8}O_2$
$NaNi_{1/4}Na_{1/6}Mn_{13/24}Sn_{1/24}O_2$
$NaNi_{1/4}Na_{1/6}Mn_{1/12}Ti_{5/12}Sn_{1/12}O_2$
$NaNi_{1/4}Na_{1/6}Mn_{2/12}Ti_{4/12}Sn_{1/12}O_2$.

Further, extremely preferred compounds of the present invention include:

$NaNi_{1/2}Mn_{1/4}Sn_{1/4}O_2$
$NaNi_{1/3}Mn_{1/3}Sn_{1/6}Mg_{1/6}O_2$
$NaCo_{1/8}Ni_{1/8}Na_{1/6}Mn_{4/12}Sn_{3/12}O_2$
$NaNi_{1/3}Mn_{1/6}Sn_{1/6}Mg_{1/6}Ti_{1/6}O_2$
$NaNi_{1/2}Mn_{1/4}Sn_{1/8}Ti_{1/8}O_2$
$NaNi_{1/2}Ti_{1/4}Sn_{1/4}O_2$
$Na_{0.95}Ni_{0.3167}Mn_{0.3167}Mg_{0.1625}Sn_{0.2018}O_2$
$Na_{0.95}Ni_{0.3167}Sn_{0.3167}Mg_{0.1625}Ti_{0.2018}O_2$
$NaNi_{1/2}Sn_{1/2}O_2$
$NaNi_{1/2}Ti_{3/8}Sn_{1/8}O_2$
$NaNi_{1/2}Mn_{1/4}Sn_{1/8}Ti_{1/8}O_{1.9}$
$NaNi_{1/2}Ti_{3/8}Sn_{1/8}O_{1.95}$
$NaNi_{1/4}Na_{1/6}Mn_{13/24}Sn_{1/24}O_2$
$NaNi_{1/4}Na_{1/6}Mn_{1/12}Ti_{5/12}Sn_{1/12}O_2$
$NaNi_{1/4}Na_{1/6}Mn_{2/12}Ti_{4/12}Sn_{1/12}O_2$.

Alternative preferred compounds of the present invention are of the formula:

$$A_U M^1{}_V M^2{}_W M^3{}_X O_{2 \pm \delta}$$

wherein $0 < \delta \leq 0.4$; preferably $0 < \delta \leq 0.2$; oxygen deficient compounds e.g. $O_{1.9}$ are particularly preferred
wherein
A is one or more alkali metals, preferably selected from sodium, lithium and potassium;
$M^1$ comprises one or more redox active metals with an oxidation state in the range +2 to +4, preferably with an average oxidation state of +2 or +3;
$M^2$ comprises tin, optionally together with one or more transition metals, preferably with an oxidation state in the range +3 to +5 and further preferably with an average oxidation state of +4;

$M^3$ comprises one or more transition metals either alone or in combination with one or more non-transition elements selected from alkali metals, alkaline earth metals, other metals, and metalloids, with an oxidation state in the range +1 to +5, and preferably with an average oxidation state of +3;
wherein
the oxidation state of $M^1$, $M^2$, and $M^3$ are chosen to maintain charge neutrality;
and further wherein
U is in the range $0.3<U<2$, preferably $0.5<U<2$, further preferably $0.5<U\leq 1$;
V is in the range $0.1\leq V<0.75$;
W is in the range $0<W<0.75$, preferably $0.1<W<0.75$; further preferably $0.125<W<0.75$;
X is in the range $0\leq X<0.5$;
and $(U+V+W+X)<4.0$.

Alternative preferred compounds of the present invention include:

$$NaNi_{1/2}Mn_{1/4}Sn_{1/8}Ti_{1/8}O_{1.9}$$

$$NaNi_{1/2}Ti_{3/8}Sn_{1/8}O_{1.95}$$

In a second aspect, the present invention provides an electrode comprising an active compound of the formula:

$$A_U M^1{}_V M^2{}_W M^3{}_X O_{2\pm\delta}$$

wherein
A is one or more alkali metals, preferably selected from sodium, lithium and potassium;
$M^1$ comprises one or more redox active metals with an oxidation state in the range +2 to +4, preferably with an average oxidation state of +2 or +3;
$M^2$ comprises tin, optionally in combination with one or more transition metals, preferably with an oxidation state in the range +3 to +5 and further preferably with an average oxidation state of +4;
$M^3$ comprises one or more transition metals either alone or in combination with one or more non-transition elements selected from alkali metals, alkaline earth metals, other metals and metalloids, with an oxidation state in the range +1 to +5, preferably with an average oxidation state of +3;
wherein
the oxidation state of $M^1$, $M^2$, and $M^3$ are chosen to maintain charge neutrality;
and further wherein
$\delta$ is in the range $0\leq\delta\leq 0.4$, preferably $0\leq\delta\leq 0.2$;
U is in the range $0.3<U<2$, preferably $0.5<U<2$, further preferably $0.5<U\leq 1$;
V is in the range $0.1\leq V<0.75$;
W is in the range $0<W<0.75$, preferably $0.1<W<0.75$; further preferably $0.125<W<0.75$;
X is in the range $0\leq X<0.5$;
and $(U+V+W+X)<4.0$.

The elements $M^1$, $M^2$ and $M^3$, their average oxidation state and the values of U, V, W and X, are the same as described above in relation to the compounds of the present invention. The Applicants have found that in the voltage ranges they have investigated, tin per se is mostly electrochemically inactive. Nevertheless, the Applicants have found that the presence of tin has no adverse effects of the specific energy density of the active compounds of the present invention, and moreover the addition of tin is found to have a stabilising effect on the structure of these active materials when used in the electrodes of the present invention. Indeed, the presence of tin is found to be highly advantageous because it promotes higher than expected specific capacities than have been any observed previously for other layered oxide materials. Such a result is extremely surprising, especially in respect of the sodium/tin-containing compounds of the present invention; in the case of such sodium/tin-containing compounds one would expect that the high atomic weight of sodium would reduce the specific capacity but as demonstrated below this is not what is observed in practice. The presence of tin is further advantageous because it improves the electrochemical stability on cycling and produces active materials which are capable of being charged and recharged with only a moderate reduction in cycling capacity. Moreover, all of these advantages are obtained when only fractional amounts of tin are present in the active compounds.

Preferred electrodes of the present invention comprise active compounds selected from one or more of: e.g.

$$NaNi_{1/2}Mn_{1/4}Sn_{1/8}Ti_{1/8}O_2$$

Especially preferred electrodes of the present invention comprise active compounds selected from one or more of:
$NaNi_{1/2}Mn_{1/4}Sn_{1/4}O_2$
$NaNi_{1/3}Mn_{1/3}Sn_{1/6}Mg_{1/6}O_2$
$NaNi_{1/2}Mn_{1/4}Sn_{1/4}O_2$
$NaNi_{1/3}Mn_{1/3}Sn_{1/6}Mg_{1/6}O_2$
$NaNi_{1/2}Mn_{1/4}Sn_{1/8}Ti_{1/8}O_2$
$NaNi_{1/4}Mn_{4/12}Sn_{3/12}Na_{1/6}O_2$
$NaNi_{1/3}Mn_{1/6}Sn_{1/6}Mg_{1/6}Ti_{1/6}O_2$
$NaNi_{1/2}Mn_{1/4}Sn_{1/8}Ti_{1/8}O_2$
$NaNi_{1/2}Ti_{1/4}Sn_{1/4}O_2$
$Na_{0.95}Ni_{0.3167}Mn_{0.3167}Mg_{0.1625}Sn_{0.2018}O_2$
$Na_{0.95}Ni_{0.3167}Sn_{0.3167}Mg_{0.1625}Ti_{0.2018}O_2$
$NaNi_{1/2}Sn_{1/2}O_2$
$NaNi_{1/2}Ti_{1/4}Sn_{1/4}O_2$
$NaNi_{1/2}Ti_{3/8}Sn_{1/8}O_2$
$NaCo_{1/8}Ni_{1/8}Na_{1/6}Mn_{4/12}Sn_{3/12}O_2$
$NaCo_{1/2}Mn_{4/12}Sn_{3/12}Na_{1/6}O_2$
$NaCo_{1/2}Mn_{1/4}Sn_{1/8}Ti_{1/8}O_2$
$NaCo_{1/2}Sn_{1/2}O_2$
$NaCo_{1/2}Sn_{1/4}Ti_{1/4}O_2$
$NaMn_{1/2}Sn_{1/2}O_2$
$NaMn_{1/2}Ti_{1/4}Sn_{1/4}O_2$
$NaFe_{1/2}Mn_{1/4}Sn_{1/8}Ti_{1/8}O_2$
$NaFe_{1/2}Sn_{1/2}O_2$
$NaFe_{1/4}Mn_{4/12}Sn_{3/12}Na_{1/6}O_2$
$NaNi_{1/2}Mn_{1/4}Sn_{1/8}Ti_{1/8}O_{1.9}$
$NaNi_{1/2}Ti_{3/8}Sn_{1/8}O_{1.95}$
$Na_{9/10}Li_{1/10}Ni_{1/2}Mn_{1/4}Sn_{1/8}Ti_{1/8}O_2$
$Na_{8/10}Li_{2/10}Ni_{1/2}Mn_{1/4}Sn_{1/8}Ti_{1/8}O_2$
$Na_{7/10}Li_{3/10}Ni_{1/2}Mn_{1/4}Sn_{1/8}Ti_{1/8}O_2$
$Na_{5/10}Li_{5/10}Ni_{1/2}Mn_{1/4}Sn_{1/8}Ti_{1/8}O_2$
$NaNi_{1/4}Na_{1/6}Mn_{13/24}Sn_{1/24}O_2$
$NaNi_{1/4}Na_{1/6}Mn_{1/12}Ti_{5/12}Sn_{1/12}O_2$
$NaNi_{1/4}Na_{1/6}Mn_{2/12}Ti_{4/12}Sn_{1/12}O_2$.

Further, extremely preferred electrodes of the present invention comprise active compounds selected from one or more of:
$NaNi_{1/2}Mn_{1/4}Sn_{1/4}O_2$
$NaNi_{1/3}Mn_{1/3}Sn_{1/6}Mg_{1/6}O_2$
$NaCo_{1/8}Ni_{1/8}Na_{1/6}Mn_{4/12}Sn_{3/12}O_2$
$NaNi_{1/3}Mn_{1/6}Sn_{1/6}Mg_{1/6}Ti_{1/6}O_2$
$NaNi_{1/2}Mn_{1/4}Sn_{1/8}Ti_{1/8}O_2$
$NaNi_{1/2}Ti_{1/4}Sn_{1/4}O_2$
$Na_{0.95}Ni_{0.3167}Mn_{0.3167}Mg_{0.1625}Sn_{0.2018}O_2$
$Na_{0.95}Ni_{0.3167}Sn_{0.3167}Mg_{0.1625}Ti_{0.2018}O_2$
$NaNi_{1/2}Sn_{1/2}O_2$
$NaNi_{1/2}Ti_{3/8}Sn_{1/8}O_2$ $NaNi_{1/2}Mn_{1/4}Sn_{1/8}Ti_{1/8}O_{1.9}$
$NaNi_{1/2}Ti_{3/8}Sn_{1/8}O_{1.95}$
$NaNi_{1/4}Na_{1/6}Mn_{13/24}Sn_{1/24}O_2$
$NaNi_{1/4}Na_{1/6}Mn_{1/12}Ti_{5/12}Sn_{1/12}O_2$
$NaNi_{1/4}Na_{1/6}Mn_{2/12}Ti_{4/12}Sn_{1/12}O_2$.

Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s) or mixtures thereof.

As well as in electrodes, the active materials according to the present invention are suitable for use in many different applications, for example in energy storage devices such as rechargeable batteries, electrochemical devices and electrochromic devices. The active materials according to the present invention may be used as part of an electrode in these energy storage devices, but this need not necessarily be the case.

In a third aspect, the present invention provides an energy storage device that utilises one or more active materials according to the present invention as described above, and particularly an energy storage device for use as one or more of the following: a sodium and/or lithium and/or potassium ion cell; a sodium and/or lithium and/or potassium metal cell; a non-aqueous electrolyte sodium and/or potassium ion; an aqueous electrolyte sodium and/or lithium and/or potassium ion cell.

The novel compounds of the present invention may be prepared using any known and/or convenient method. For example, the precursor materials may be heated in a furnace so as to facilitate a solid state reaction process.

A fourth aspect of the present invention provides a particularly advantageous method for the preparation of the compounds described above comprising the steps of:
a) mixing the starting materials together, preferably intimately mixing the starting materials together and further preferably pressing the mixed starting materials into a pellet;
b) heating the mixed starting materials for example in a furnace, at a preferred temperature of between 400° C. and 1500° C., further preferably at a temperature of between 500° C. and 1200° C., for between 0.5 and 20 hours; and
c) allowing the reaction product to cool.

Preferably the reaction is conducted under an atmosphere comprising one or more selected from ambient air and any other gaseous medium. Examples of a suitable gaseous medium include one or more selected from an inert gas, nitrogen and oxygen. Where two or more gases are used, they may be combined to produce a mixture, or alternatively, the two or more gases may be used sequentially either singly or in any combination, and in any order. Preferably an ambient air atmosphere is followed by an atmosphere of nitrogen.

In a preferred method of the present invention, steps a), and b) of the reaction may be performed under an atmosphere of ambient air or under a partial oxygen-containing atmosphere and then cooling in step c) may be performed under an ambient air or partial oxygen-containing atmosphere, or in a non-oxidising atmosphere e.g. under nitrogen gas or quenched in liquid nitrogen. The non-stoichiometric levels of oxygen in the product (i.e. compounds in which $\delta \neq 0$) can be tailored by the choice of cooling step used in the method of the present invention; that is, different cooling rates at different temperatures in different atmospheric conditions gives a different amount of oxygen in the final product.

A particularly convenient method to achieve oxygen deficient compounds of the present invention is to perform step c) of the above method under nitrogen as this results in the oxygen deficiency being fixed.

BRIEF DESCRIPTION OF THE DRAWINGS

The present invention will now be described with reference to the following figures in which:

FIG. 9 (B) shows the result of TGA-STA of $NaNi_{1/2}Mn_{1/4}Sn_{1/8}Ti_{1/8}O_2$ synthesised as described in Example 9B, i.e. Example 3 followed by further heating to 950° C. and cooling under a constant flow of $N_2$.

FIG. 10 (B) shows the result of TGA-STA of $NaNi_{1/2}Ti_{3/8}Sn_{1/8}O_2$ prepared according to Example 10B, i.e. Example 8 followed by an additional heat treatment step in which the sample was heated to 950° C. and cooled under a constant flow of $N_2$.

FIG. 11(B) shows the first ten charge-discharge voltage profiles (Na-ion half cell Voltage [V vs Na/Na$^+$] plotted against Cathode specific capacity [mAh/g]) for the cathode material prepared according to Example 11;

DETAILED DESCRIPTION

Figure 1A:
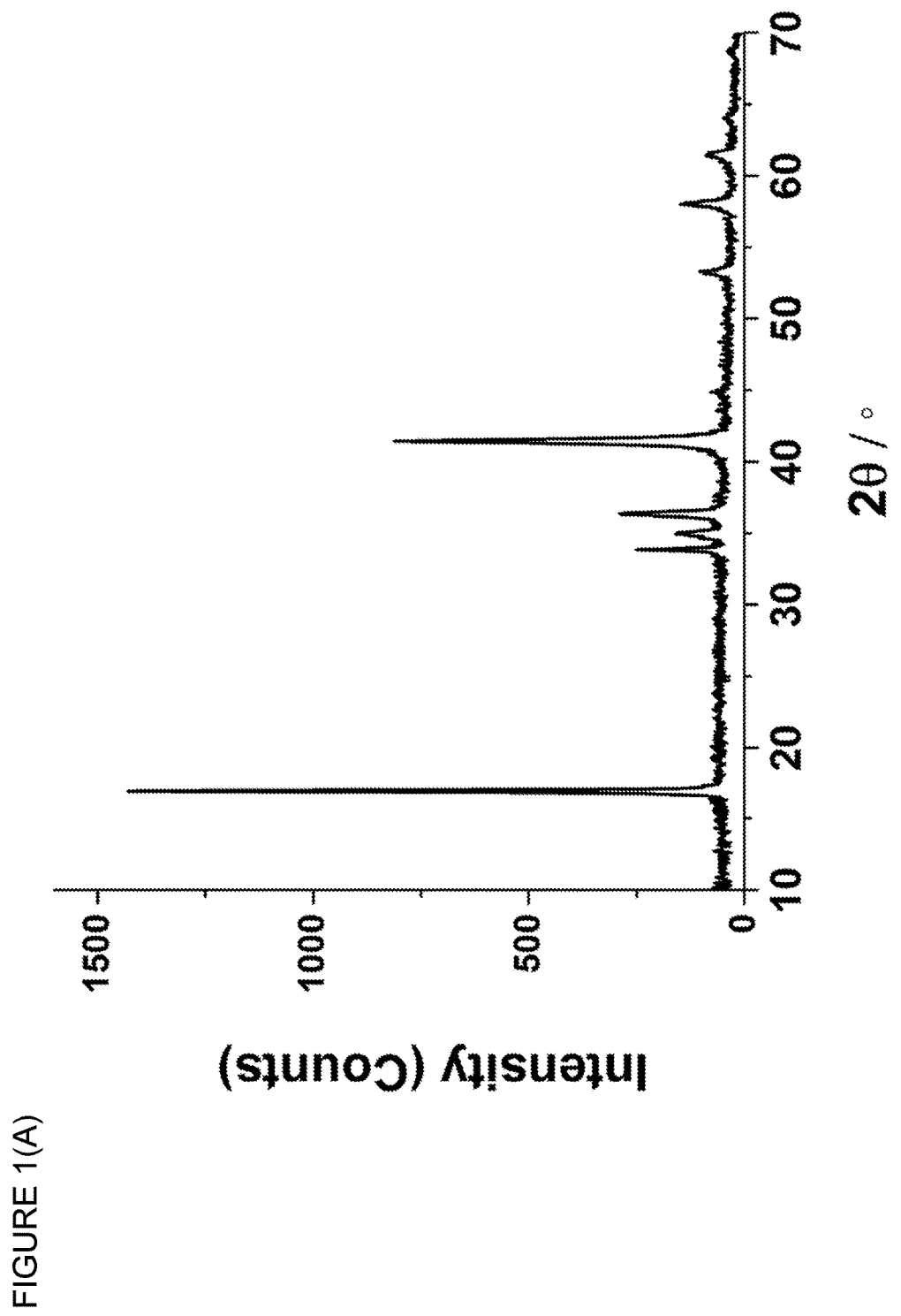
FIG. 1(A) shows the Powder X-ray diffraction pattern for $NaCo_{1/8}Ni_{1/8}Na_{1/6}Mn_{4/12}Sn_{3/12}O_2$, prepared according to Example 1.

The materials according to the present invention are prepared using the following typical generic method:
Typical Generic Synthesis Method:
The required amounts of the precursor materials are intimately mixed together and either pressed into a pellet or retained as a free flowing powder. The resulting mixture is then heated, for example in a tube furnace or a chamber furnace, under atmospheric conditions comprising one or more selected from ambient air, nitrogen, oxygen and an inert gas (e.g. argon). Where two or more gases are used, they may be combined to produce a mixture, or alternatively, the two or more gases may be used sequentially, either singly or in any combination, and in any order. Preferably an air atmosphere is followed by an atmosphere of nitrogen. The gases may be static or flowing. The heating temperature may be a single or a range of temperatures, ideally from 400° C. to 1500° C. and heating is continued until reaction product forms; for some materials a single heating step may be used and for others (as indicated below in Table 1) more than one heating step may be used. For ease of handling, the reaction product is allowed to cool and then removed from the furnace and then ground into a powder prior to characterisation.

Using the above typical generic method, active materials were prepared according to, Examples 1 to 13, as summarised below in Table 1:

TABLE 1

Summary of reactions which can be used to produce target materials

| EXAMPLE | TARGET COMPOUND | STARTING MATERIALS | FURNACE CONDITIONS |
|---|---|---|---|
| 1 (RG153) (FIGS. 1 (A)(B)(C)(D) | Na Co$_{1/8}$ Ni$_{1/8}$ Na$_{1/6}$ Mn$_{4/12}$ Sn$_{3/12}$ O$_2$ | Na$_2$CO$_3$ Mn (CO$_3$)$_2$ Ni(NO$_3$)$_2$•6H$_2$O Co(NO$_3$)$_2$•6H$_2$O SnO$_2$ | (900° C., 2 h, Air), Re-milled, (900° C., 10 h, Air), re-milled, (950° C., 10 h, Air) |
| 2 (RG154) (FIGS. 2 (A)(B)(C)(D) | Na Ni$_{1/3}$ Mn$_{1/6}$ Sn$_{1/6}$ Mg$_{1/6}$ Ti$_{1/6}$ O$_2$ | Na$_2$CO$_3$ Mn (CO$_3$) Ni(NO$_3$)$_2$•6H$_2$O SnO$_2$ TiO$_2$ Mg (CO$_3$) | (900° C., 2 h, Air), Re-milled, (900° C., 10 h, Air), re-milled, (950° C., 10 h, Air) |
| 3 (Rg156) (FIGS. 3 (A)(B)(C)(D) | Na Ni$_{1/2}$ Mn$_{1/4}$ Sn$_{1/8}$ Ti$_{1/8}$ O$_2$ | Na$_2$CO$_3$ Mn (CO$_3$) Ni(NO$_3$)$_2$•6H$_2$O SnO$_2$ TiO$_2$ | (950° C., 2 h, Air) |
| 4 (RG157) (FIGS. 4 (A)(B)(C)(D) | Na$_{0.95}$ Ni$_{0.3167}$Mn$_{0.3167}$Mg$_{0.1625}$Sn$_{0.2018}$ O$_2$ | Na$_2$CO$_3$ Mn (CO$_3$) Ni(NO$_3$)$_2$•6H$_2$O SnO$_2$ TiO$_2$ Mg(CO$_3$) | (900° C., 2 h, Air), Re-milled, (900° C., 10 h, Air), re-milled, (950° C., 10 h, Air) |
| 5 (RG158) (FIGS. 5 (A)(B)(C)(D) | Na$_{0.95}$ Ni$_{0.3167}$Sn$_{0.3167}$Mg$_{0.1625}$Ti$_{0.2018}$ O$_2$ | Na$_2$CO$_3$ Ni(NO$_3$)$_2$•6H$_2$O SnO$_2$ TiO$_2$ MgCO$_3$ | (900° C., 2 h, Air), Re-milled, (900° C., 10 h, Air) |
| 6 (RG159) (FIGS. 6 (A)(B)(C)(D) | Na Ni$_{1/2}$ Sn$_{1/2}$ O$_2$ | Na$_2$CO$_3$ Ni(NO$_3$)$_2$•6H$_2$O SnO$_2$ | (900° C., 2 h, Air), Re-milled, (900° C., 6 h, Air) |
| 7 (RG160) (FIGS. 7 (A)(B)(C)(D) | Na Ni$_{1/2}$ Ti$_{1/4}$ Sn$_{1/4}$ O$_2$ | Na$_2$CO$_3$ Ni(NO$_3$)$_2$•6H$_2$O SnO$_2$ TiO$_2$ | (900° C., 2 h, Air), Re-milled, (900° C., 6 h, Air) |
| 8 (RG161) (FIGS. 8 (A)(B)(C)(D) | Na Ni$_{1/2}$ Ti$_{3/8}$ Sn$_{1/8}$ O$_2$ | Na$_2$CO$_3$ Ni(NO$_3$)$_2$•6H$_2$O SnO$_2$ TiO$_2$ | 950° C., 2 h, Air |
| 9 | NaNi$_{1/2}$Mn$_{1/4}$Sn$_{1/8}$Ti$_{1/8}$O$_2$ | Product of example 3 | Stoichiometric 900° C., 2 h, Air Non stoichiometric: Re-fired to 950° C., in Nitrogen |
| 10 | Na Ni$_{1/2}$ Ti$_{3/8}$ Sn$_{1/8}$ O$_2$ | Product of Example 8 | Non stoichiometric: Re-fired to 950° C., in Nitrogen |
| 11 (RG520) (FIGS. 11 (A)(B)(C) | Na Ni$_{1/4}$ Na$_{1/6}$ Mn$_{13/24}$ Sn$_{1/24}$ O$_2$ | Na$_2$CO$_3$ Mn(CO$_3$)$_2$ Ni(NO$_3$)$_2$•6H$_2$O SnO$_2$ | (900° C., 10 h, Air) |
| 12 (RG478) | Na Ni$_{1/4}$ Na$_{1/6}$ Mn$_{1/12}$Ti$_{5/12}$Sn$_{1/12}$ O$_2$ | Na$_2$CO$_3$ Mn (CO$_3$) | (900° C., 10 h, Air) |

TABLE 1-continued

Summary of reactions which can be used to produce target materials

| EXAMPLE | TARGET COMPOUND | STARTING MATERIALS | FURNACE CONDITIONS |
|---|---|---|---|
| (FIGS. 12) (A)(B)(C)(D) | | $Ni(NO_3)_2 \cdot 6H_2O$ $SnO_2$ $TiO_2$ | |
| 13 (RG479) (FIGS. 13) (A)(B)(C)(D) | $Na\ Ni_{1/4}\ Na_{1/6}\ Mn_{2/12}Ti_{4/12}\ Sn_{1/12}\ O_2$ | $Na_2CO_3$ $Mn(CO_3)$ $Ni(NO_3)_2 \cdot 6H_2O$ $SnO_2$ $TiO_2$ | (900° C., 10 h, Air) |

All of the product materials were analysed by X-ray diffraction techniques using a Bruker D2 phaser powder diffractometer (fitted with a Lynxeye™ detector) to confirm that the desired target materials had been prepared, and also to establish the phase purity of the products and to determine the types of impurities present. From this information it is possible to determine the unit cell lattice parameters.

The operating conditions used to obtain the powder diffraction patterns illustrated in the Figures are as follows:

Range: $2\theta = 10°\text{-}70°$

X-ray Wavelength=1.5418 Å (Angstroms) (Cu Kα)

Step size: $2\theta = 0.04$

Speed: 0.1 seconds/step

Typical Generic Procedure to Make a Sodium Metal Electrochemical Test Cell:

The positive electrode is prepared by solvent-casting a slurry containing the active material, conductive carbon, binder and solvent. The conductive carbon used is Super P C65 (Timcal). PVdF (e.g. Kynar) is used as the binder, and NMP (N-Methyl-2-pyrrolidone, Anhydrous, Sigma, Uk) is employed as the solvent. The slurry is then cast onto an aluminium current collector using the Doctor-blade technique. The electrode is then dried under Vacuum at about 80° C. The electrode film contains the following components, expressed in percent by weight: 75% active material, 18% Super P carbon, and 7% Kynar binder. Optionally, this ratio can be varied to optimise the electrode properties such as, adhesion, resistivity and porosity. The electrolyte comprises a 0.5 or 1.0 M solution of $NaClO_4$ in propylene carbonate (PC). A glass fibre separator (e.g. Whatman, GF/A) or a porous polypropylene separator (e.g. Celgard 2400) wetted by the electrolyte is interposed between the positive and negative electrodes forming the electrochemical test cell. Typically, cells were symmetrically charged and discharged galvanostatically at a rate of 10 mA/g.

Cell Testing:

Electrochemical cells of materials prepared according to the procedures outlined in Table 1 were tested as follows using Constant Current Cycling Techniques and the results are presented in Table 2.

The cell was cycled at a given current density (ca. 10 mA/g) between pre-set voltage limits. A commercial battery cycler from Maccor Inc. (Tulsa, Okla., USA) was used. Cells were charged symmetrically between the upper and lower voltage limits at a constant current density. On charge, sodium ions are extracted from the cathode and migrate to the anode. On discharge, the reverse process occurs and Sodium ions are re-inserted into the cathode material.

TABLE 2

Electrochemistry Results

| | Electrochemistry | | | |
|---|---|---|---|---|
| EXAMPLE | Redox capacity (mAh/g) per mol Na | Maximum capacity (mAh/g) | Exp.capacity (mAh/g) (D1) | Exp. average Voltage (V) |
| 1 | 220.53 | 110.27 | 126 | 3.0 |
| 2 | 230.92 | 153.95 | 76 | 2.95 |
| 3 | 225.40 | 225.40 | 195 (4.4V) | 3.2 |
| | | | 175 (4.3V) | 3.2 |
| 4 | 227.62 | 144.17 | 129 | 3.03 |
| 5 | 216.79 | 137.31 | 80 | 3.1 |
| 6 | 186.52 | 186.52 | 85 (4.4) | 3.20 |
| | | | 81 (4.2) | 3.24 |
| 7 | 212.75 | 212.75 | 112 (4.4) | 3.14 |
| | | | 108 (4.2) | 3.16 |
| 8 | 228.83 | 228.83 | 142(4.4) | 3.01 |
| | | | 135(4.2) | 3.24 |
| 9 | 225.40 | 225.40 | 150 (4.3) | 3.20 |
| 10 | 228.83 | 228.83 | 120 (4.3) | 3.20 |
| 11 | 242.14 | 242.14 | 160 (4.3) | 3.17 |
| 12 | 234.65 | 234.65 | 158 (4.3) | 3.2 |
| 13 | 235.32 | 235.32 | 200 (4.3) | 3.22 |

Results:

The present Applicant has found that not only are the oxidation states of the metal constituents in the compounds of the present invention a critical feature to the production of highly electrochemically active compounds but they have also confirmed that having metal constituents with these particular oxidation states will determine the overall crystalline structure of the compound. It is known that there are several possible layered structural forms which alkali metal/metal/oxides may adopt, including O3, P3 and P2. The Applicant has shown that the oxidation states for the metal constituents cause a particular structure to be adopted and has determined that alkali metal/metal/oxide compounds with a metal in +4 oxidation state and with a sodium content close to 1, will adopt an O3 crystalline structure. Moreover, the Applicant has demonstrated that alkali metal/metal/oxides with the metal in oxidation state +4 and with an O3 crystalline structure exhibit a much higher electrochemical activity than similar compounds that do not contain a metal in +4 oxidation state.

Although tin is itself electrochemically inactive at the operation voltages, it has a stabilising effect on the structure of the active materials used in the electrodes of the present invention. Further, the presence of tin is particularly advantageous to improve the electrochemical capacity upon cycling; resulting in the active materials which are capable of being charged and recharged numerous times. These observations will now be explained with reference to Examples 1-13.

The Electrochemical Properties of NaCo$_{1/8}$Ni$_{1/8}$Na$_{1/6}$Mn$_{4/12}$Sn$_{3/12}$O$_2$, Prepared in Example 1

Referring to FIGS. 1(A)-1(D):

FIG. 1(A) shows the Powder X-ray diffraction pattern for NaCo$_{1/8}$Ni$_{1/8}$Na$_{1/6}$Mn$_{4/12}$Sn$_{3/12}$O$_2$.

Figure 1B:
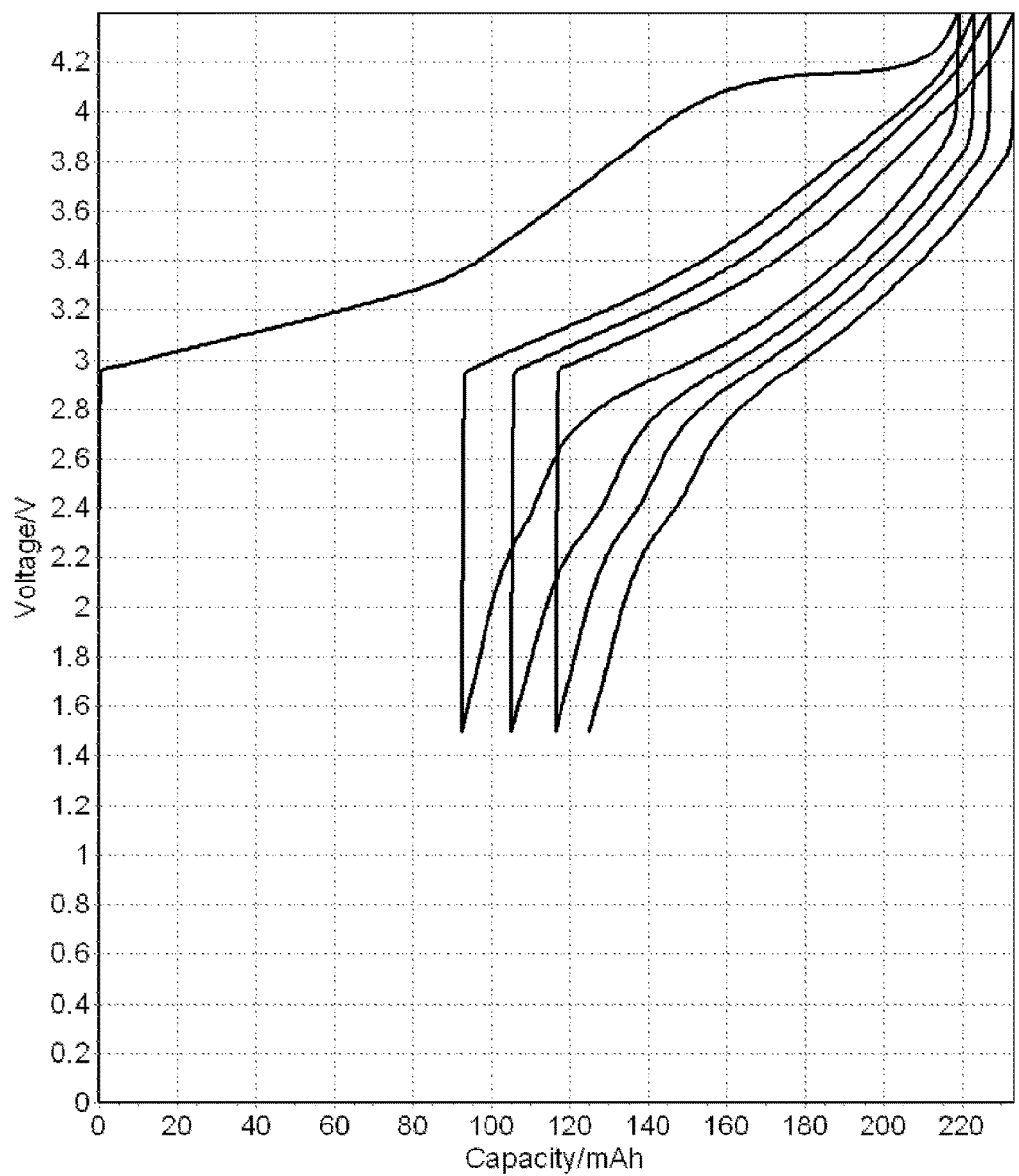
FIG. 1(B) shows the first four charge-discharge voltage profiles (Na-ion half cell Voltage [V] versus Cathode specific capacity [mAh/g]) for the cathode material prepared according to Example 1.
Figure 1C:
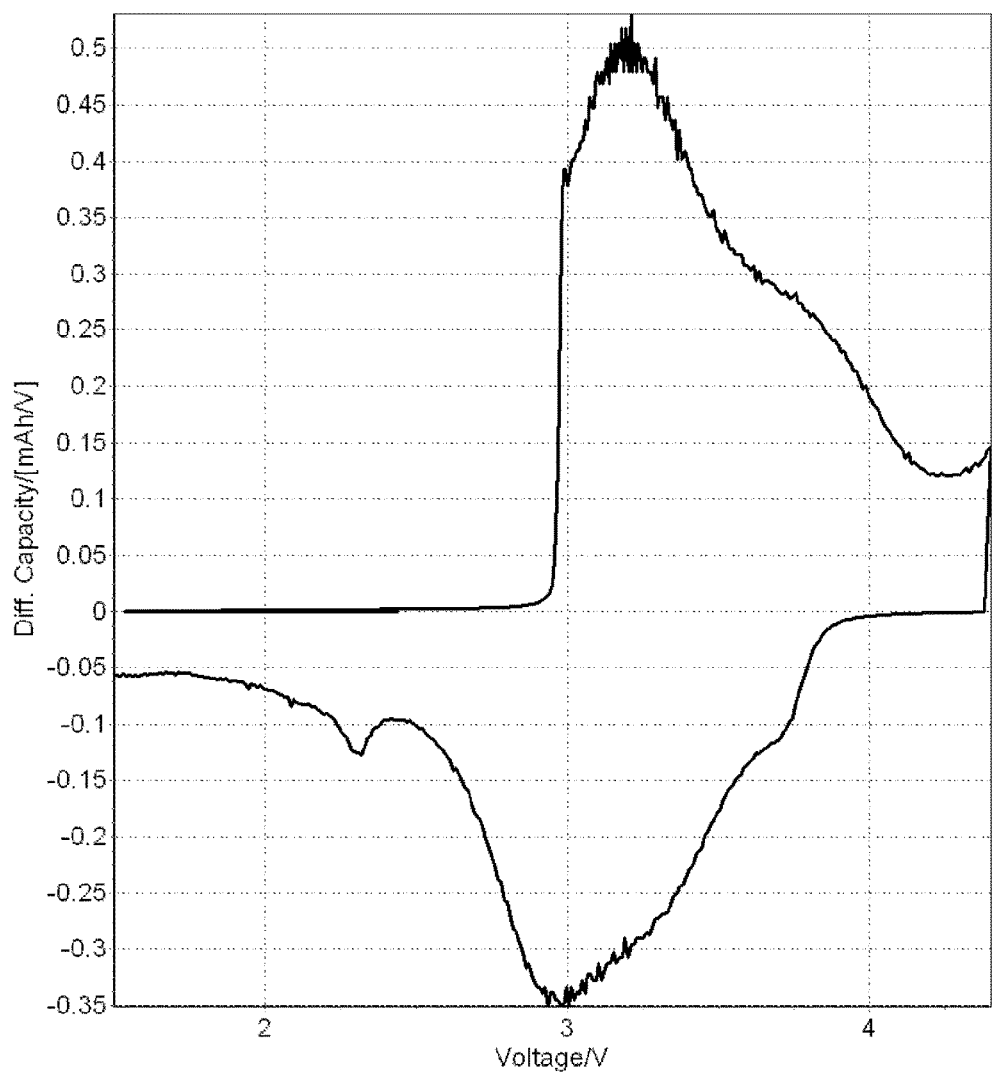
FIG. 1(C) shows the Differential Capacity Profiles for the $3^{rd}$ charge cycle (Differential Capacity [mAh/g/V] versus Na-ion half Cell Voltage [V]) for the cathode material prepared according to Example 1.
Figure 1D:
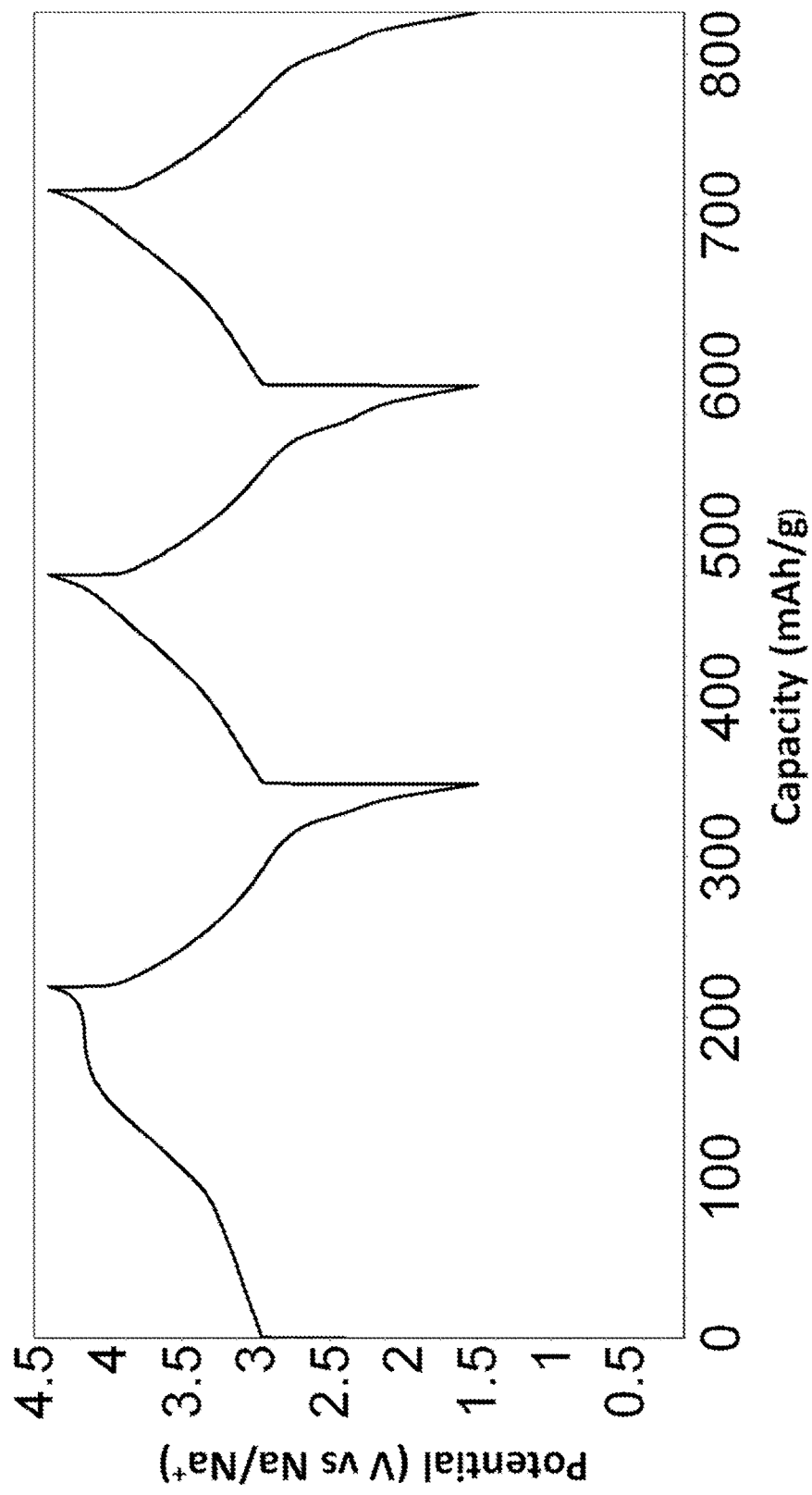
FIG. 1(D) shows the Charge-Discharge Voltage Profiles for the first three cycles (Na-ion half cell Voltage [V] versus Cumulative Cathode Specific Capacity [mAh/g]) for the cathode material prepared according to Example 1.

The data shown in FIGS. 1(B)-(D) are derived from the constant current cycling of NaCo$_{1/8}$Ni$_{1/8}$Na$_{1/6}$Mn$_{4/12}$Sn$_{3/12}$O$_2$ in a Na metal anode cell. The data was collected at an approximate current density of 10 mA/g between the voltage limits of 1.50 V-4.4 V. The material possesses an O3 layered oxide structure. FIG. 1(B) illustrates the first four charge-discharge voltage profiles (Na-ion half cell Voltage [V] versus Cathode specific capacity [mAh/g]). FIG. 1(C) shows the Differential Capacity Profiles for the 3$^{rd}$ charge cycle (Differential Capacity [mAh/g/V] versus Na-ion half Cell Voltage [V]) and from this it is observed that the incorporation of Sn in the cathode active material results in an increase in the reversible cathode capacity to ca. 110 mAh/g. It is also clear in this example that inclusion of Sn yields a sloping voltage profile which is less structured than many prior art materials. This is an important observation as it indicates a single phase reaction upon de-sodiation and a solid solution of sodium in the structure. This is advantageous for good cylability and prolonged cycle life. FIG. 1(D) shows the Charge-Discharge Voltage Profiles for the first three cycles (Na-ion half cell Voltage [V] versus Cumulative Cathode Specific Capacity [mAh/g]) for the cathode material, and it is noted in this Figure that there is a dramatic change in the in the differential capacity profiles, as compared against the published results for NaNi$_{0.5}$Ti$_{0.5}$O$_2$ when incorporated as a cathode material. Furthermore, the level of voltage hysteresis (i.e. the voltage difference between the charge and discharge processes) is seen to be moderate (as shown in FIG. 1(B)). These two observations are highly important as they indicate a material with good electrochemical kinetics of sodiation and de-sodiation reactions, and therefore a high rate capability. In conclusion, Na ion cells reported in the literature commonly show poor specific capacity and show rapid capacity fade after only a few cycles. For example, it is common for a Na ion cathode material such as NaNi$_{0.5}$Ti$_{0.5}$O$_2$ to show a cycling capacity of 79 mAh/g and a capacity fade of ca. 50% in the first 30 cycles. As shown in FIGS. 1(B)-1(D) we can see that inclusion of Sn in the structure of NaCo$_{1/8}$Ni$_{1/8}$Na$_{1/6}$Mn$_{4/12}$Sn$_{3/12}$O$_2$ provides several notable benefits, including high reversibility observed in the second, third and fourth electrochemical cycles at higher cycling capacity.

The Electrochemical Properties of NaNi$_{1/3}$Mn$_{1/6}$Sn$_{1/6}$Mg$_{1/6}$Ti$_{1/6}$O$_2$, Prepared in Example 2

Figure 2A:
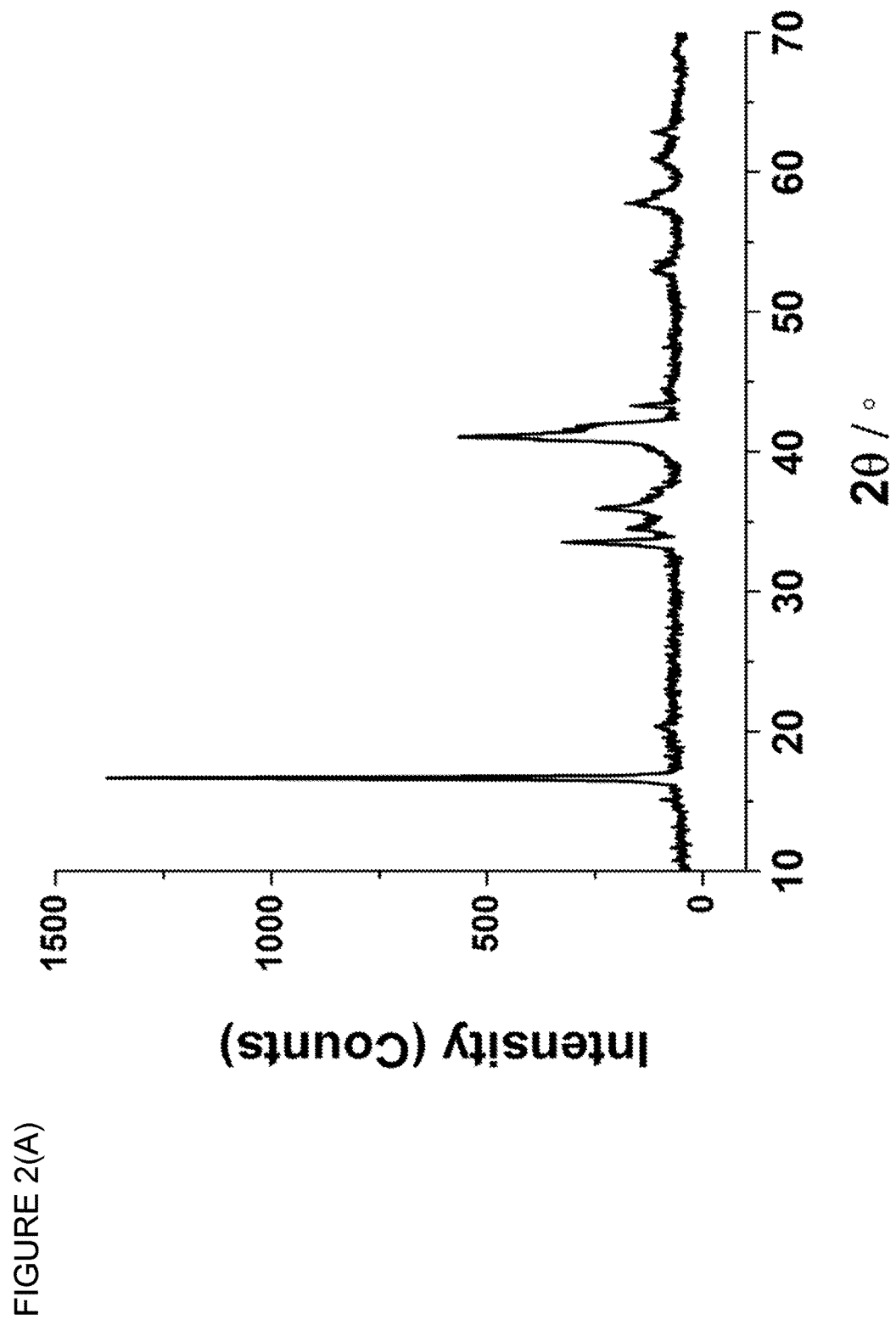
FIG. 2(A) shows the Powder X-ray diffraction pattern for $NaNi_{1/3}Mn_{1/6}Sn_{1/6}Mg_{1/6}Ti_{1/6}O_2$ prepared according to Example 2.
Figure 2B:
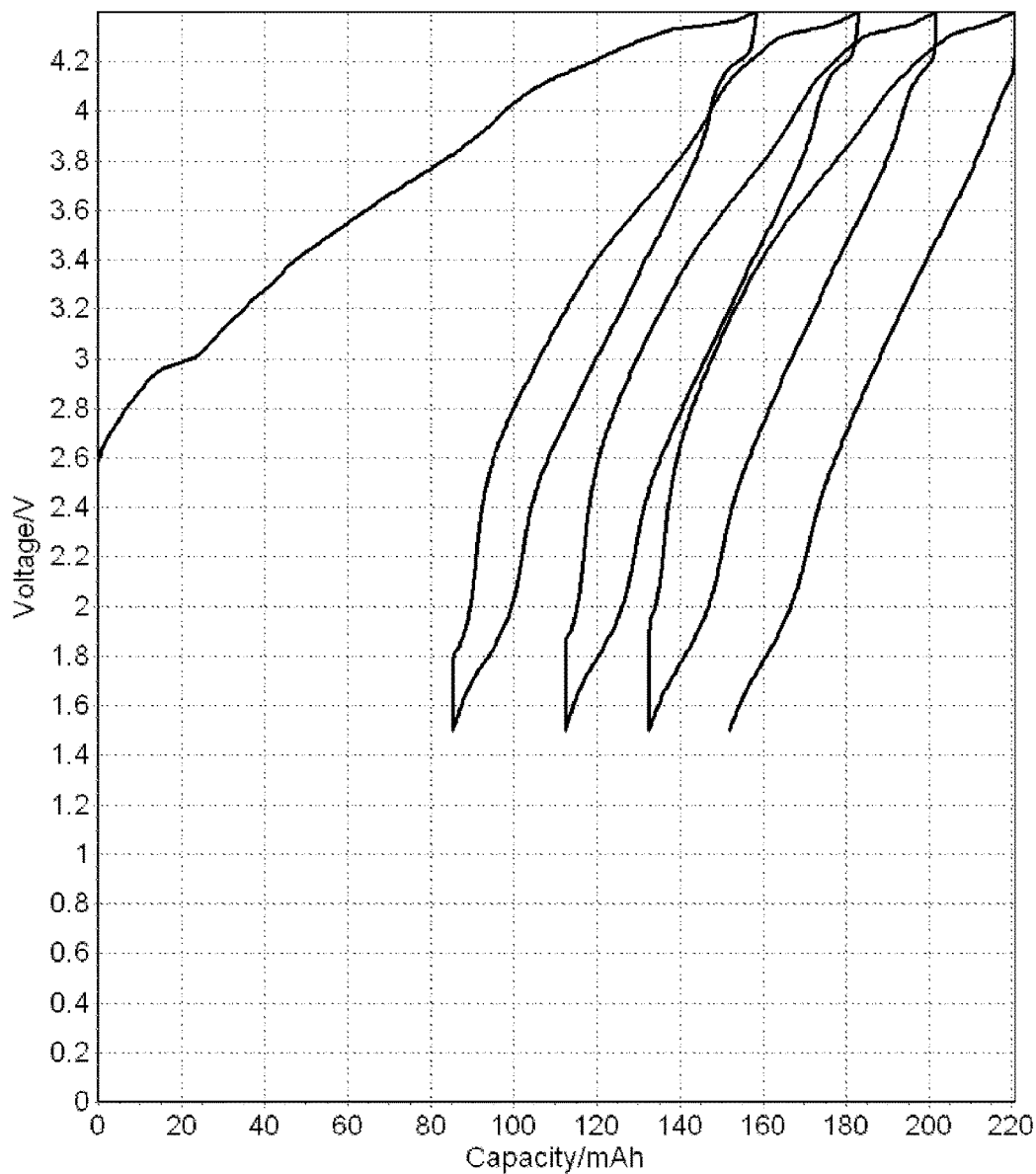
FIG. 2(B) shows the first four charge-discharge voltage profiles (Na-ion half cell Voltage [V] versus Cathode specific capacity [mAh/g]) for the cathode material prepared according to Example 2.
Figure 2C:
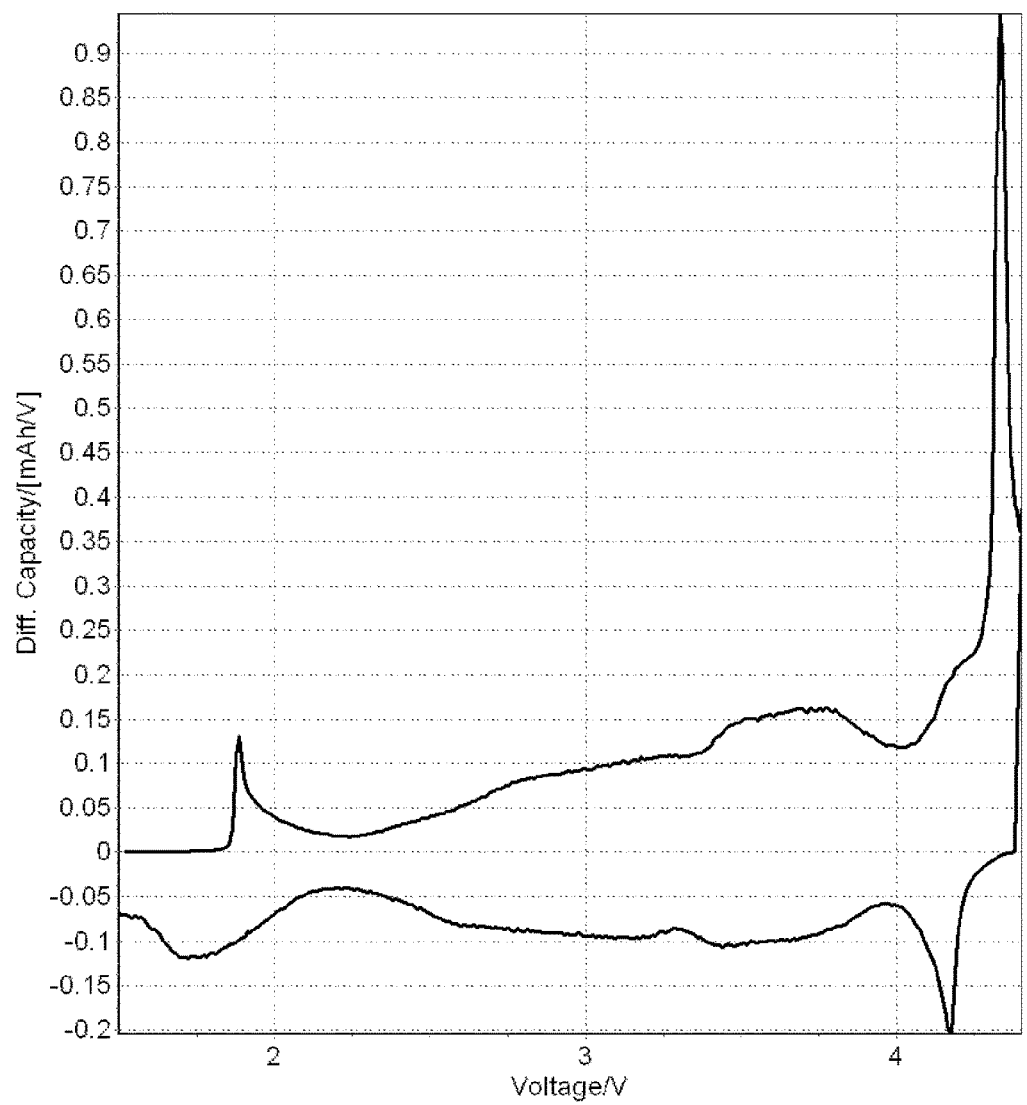
FIG. 2(C) shows the Differential Capacity Profiles for the $3^{rd}$ charge cycle (Differential Capacity [mAh/g/V] versus Na-ion half Cell Voltage [V]) for the cathode material prepared according to Example 2.
Figure 2D:
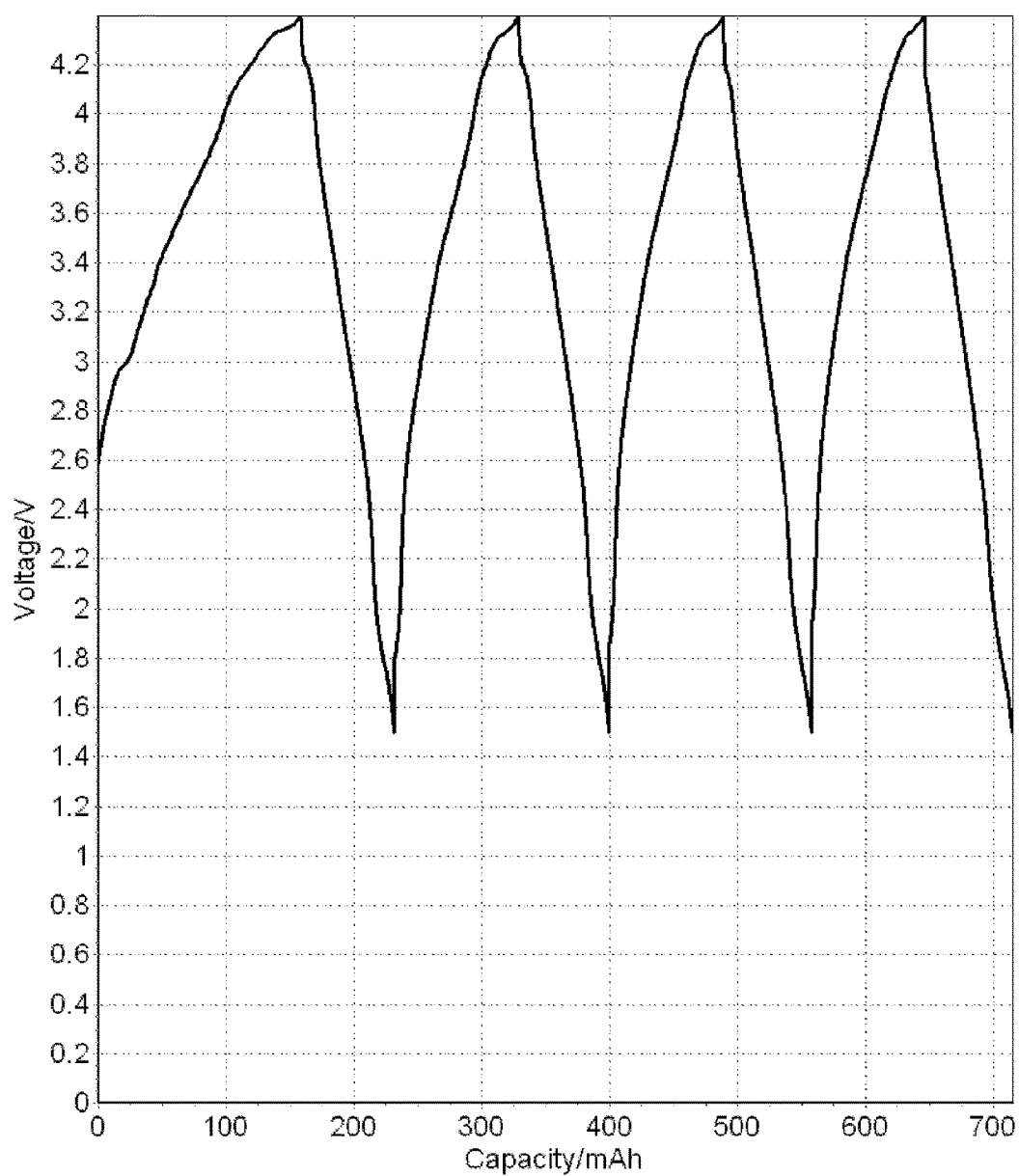
FIG. 2(D) shows the Charge-Discharge Voltage Profiles for the first four cycles (Na-ion half cell Voltage [V] versus Cumulative Cathode Specific Capacity [mAh/g]) for the cathode material prepared according to Example 2.

Referring to FIGS. 2(A)-2(D):

FIG. 2(A) shows the Power X-ray diffraction pattern for NaNi$_{1/3}$Mn$_{1/6}$Sn$_{1/6}$Mg$_{1/6}$Ti$_{1/6}$O$_2$, prepared according to Example 2. The material has an O3 type layered oxide structure. As shown in FIG. 2(B), when the material was tested in a sodium metal anode cell, an initial charge capacity of 160 mAh/g and a discharge capacity of 76 mAh/g was observed. The differential capacity plots for the 1$^{st}$ and 3$^{rd}$ cycles shown in FIGS. 2(C) and 2(D) shows a structural change in the material during cycling. The 3V vs Na/Na+ plateaus observed in the first charge is not observed in subsequent cycles and the voltage slope appears more gradual indicating a solid solution region. Although the reversible capacity is lower than other examples there is a high voltage plateaux region at 4.2V vs Na which is reversible upon cycling.

The Electrochemical Properties of NaNi$_{1/2}$Mn$_{1/4}$Sn$_{1/8}$Ti$_{1/8}$O$_2$, Prepared in Example 3

Figure 3A:
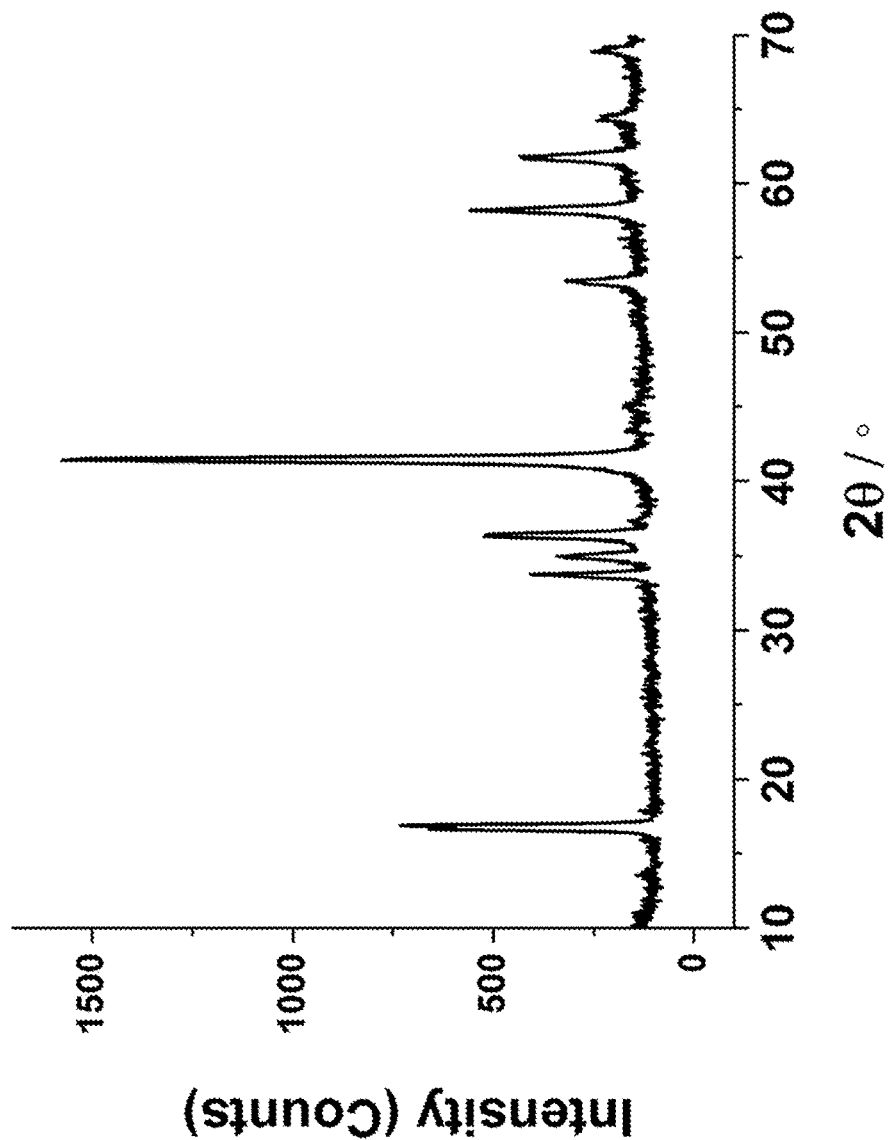
FIG. 3(A) shows the Powder X-ray diffraction pattern for $NaNi_{1/2}Mn_{1/4}Sn_{1/8}Ti_{1/8}O_2$ prepared according to Example 3.
Figure 3B:
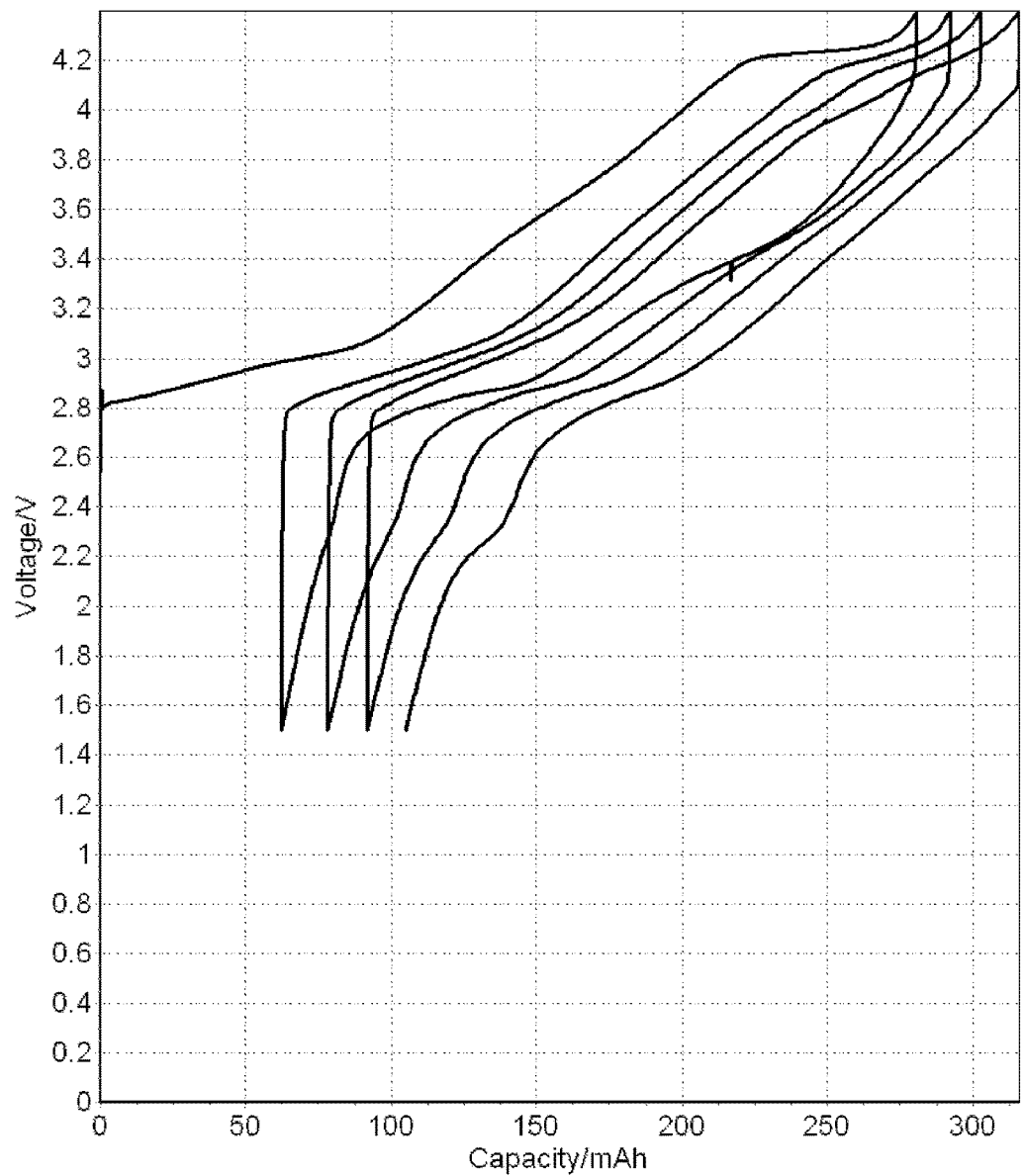
FIG. 3(B) shows the first four charge-discharge voltage profiles (Na-ion half cell Voltage [V] versus Cathode specific capacity [mAh/g]) for the cathode material prepared according to Example 3.
Figure 3C:
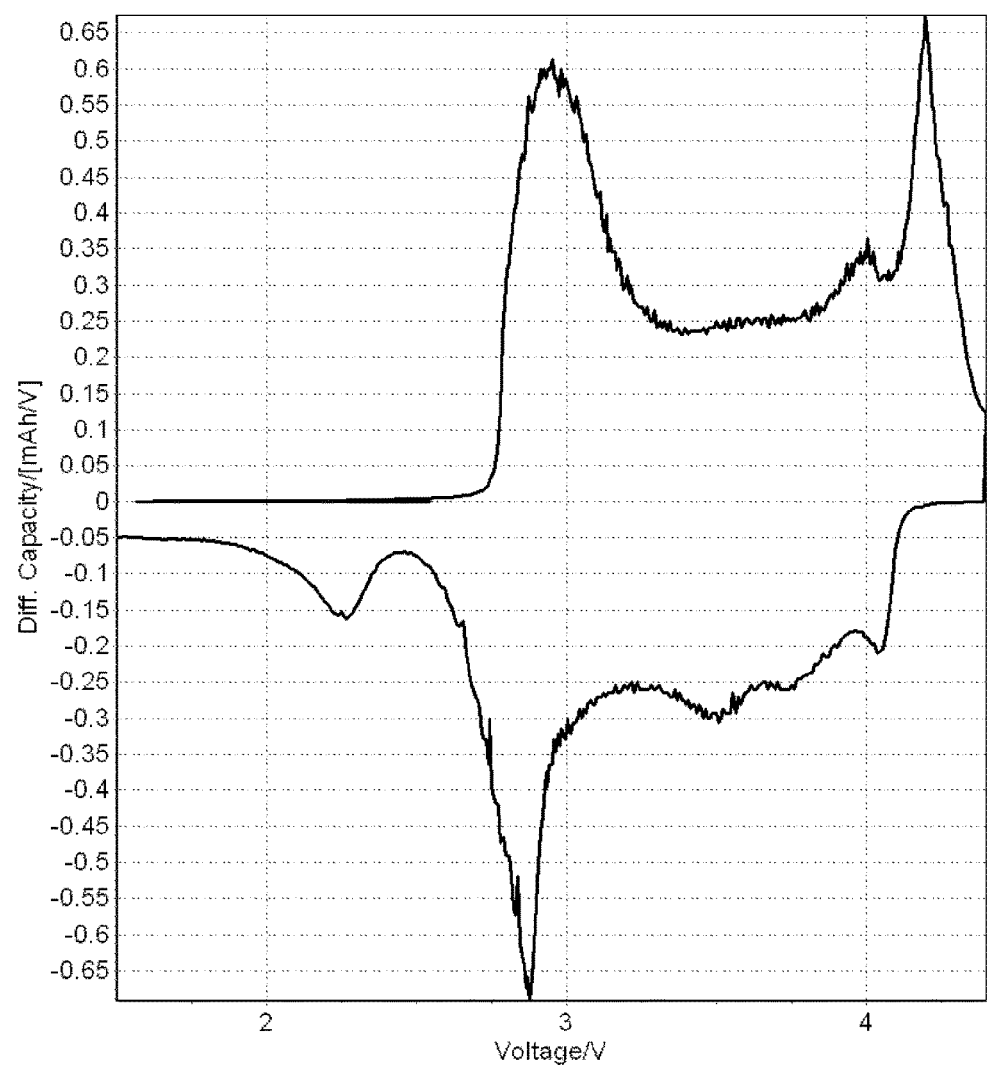
FIG. 3(C) shows the Differential Capacity Profiles for the $3^{rd}$ charge cycle (Differential Capacity [mAh/g/V] versus Na-ion half Cell Voltage [V]) for the cathode material prepared according to Example 3.
Figure 3D:
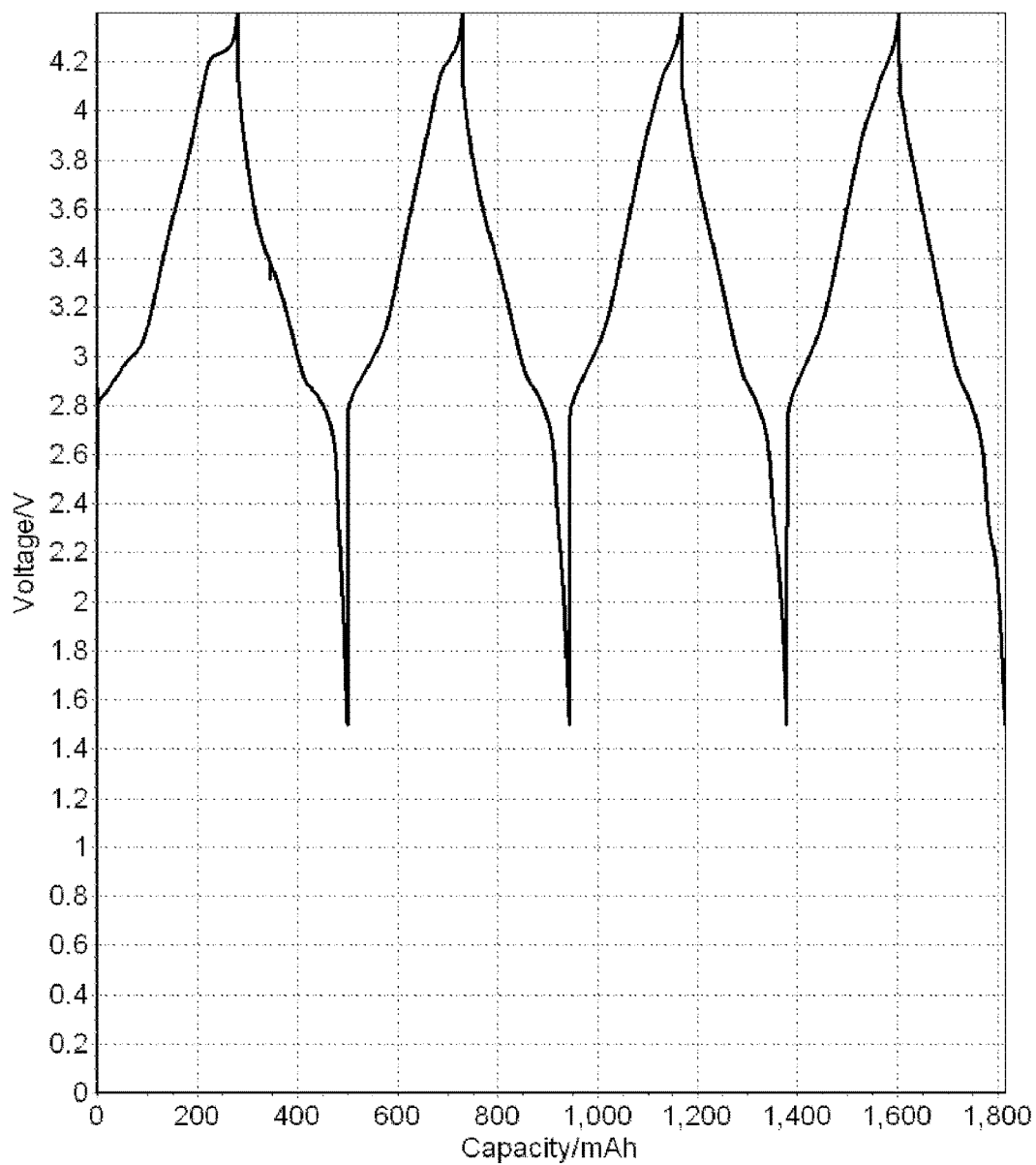
FIG. 3(D) shows the Charge-Discharge Voltage Profiles for the first four cycles (Na-ion half cell Voltage [V] versus Cumulative Cathode Specific Capacity [mAh/g]) for the cathode material prepared according to Example 3.

Referring to FIGS. 3(A)-3(D):

FIG. 3(A) shows Powder X-ray diffraction pattern of NaNi$_{1/2}$Mn$_{1/4}$Sn$_{1/8}$Ti$_{1/8}$O$_2$ prepared according to Example 3. When tested in a sodium metal anode cell, an initial charge capacity of 270 mAh/g is observed with a high first cycle loss (FIG. 3(B)), this loss originates from a partially irreversible high voltage capacity at approximately 4.1V vs Na/Na+, and is observed in the differential capacity plot in FIG. 3(C). The reversible capacity observed is 195 mAh/g when cycled to 4.4V vs Na, and 175 mAh/g when cycled to 4.2V vs Na. The cumulative capacity plot is shown in FIG. 3(D). This material shows high reversible capacities in a sodium metal anode cell and has a slightly higher average voltage (3.2V vs Na/Na+) than other similar materials, and consequently this material looks extremely promising as a high energy density cathode materials for a sodium ion battery.

The Electrochemical Properties of NaNi$_{0.3167}$Mn$_{0.3167}$Mg$_{0.1625}$Sn$_{0.2018}$O$_2$, Prepared in Example 4

Figure 4A:
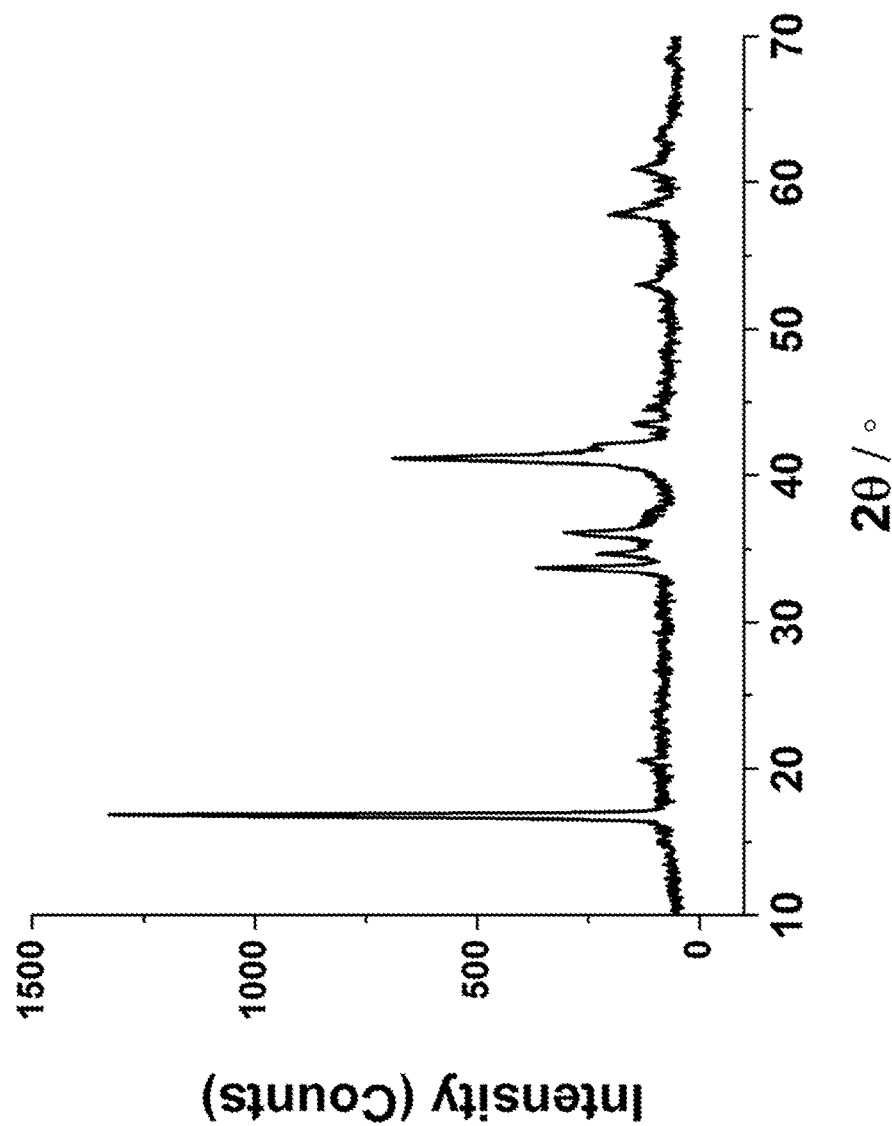
FIG. 4(A) shows the Powder X-ray diffraction pattern for $Na_{0.95}Ni_{0.3167}Mn_{0.3167}Mg_{0.1625}Sn_{0.2018}O_2$ prepared according to Example 4.
Figure 4B:
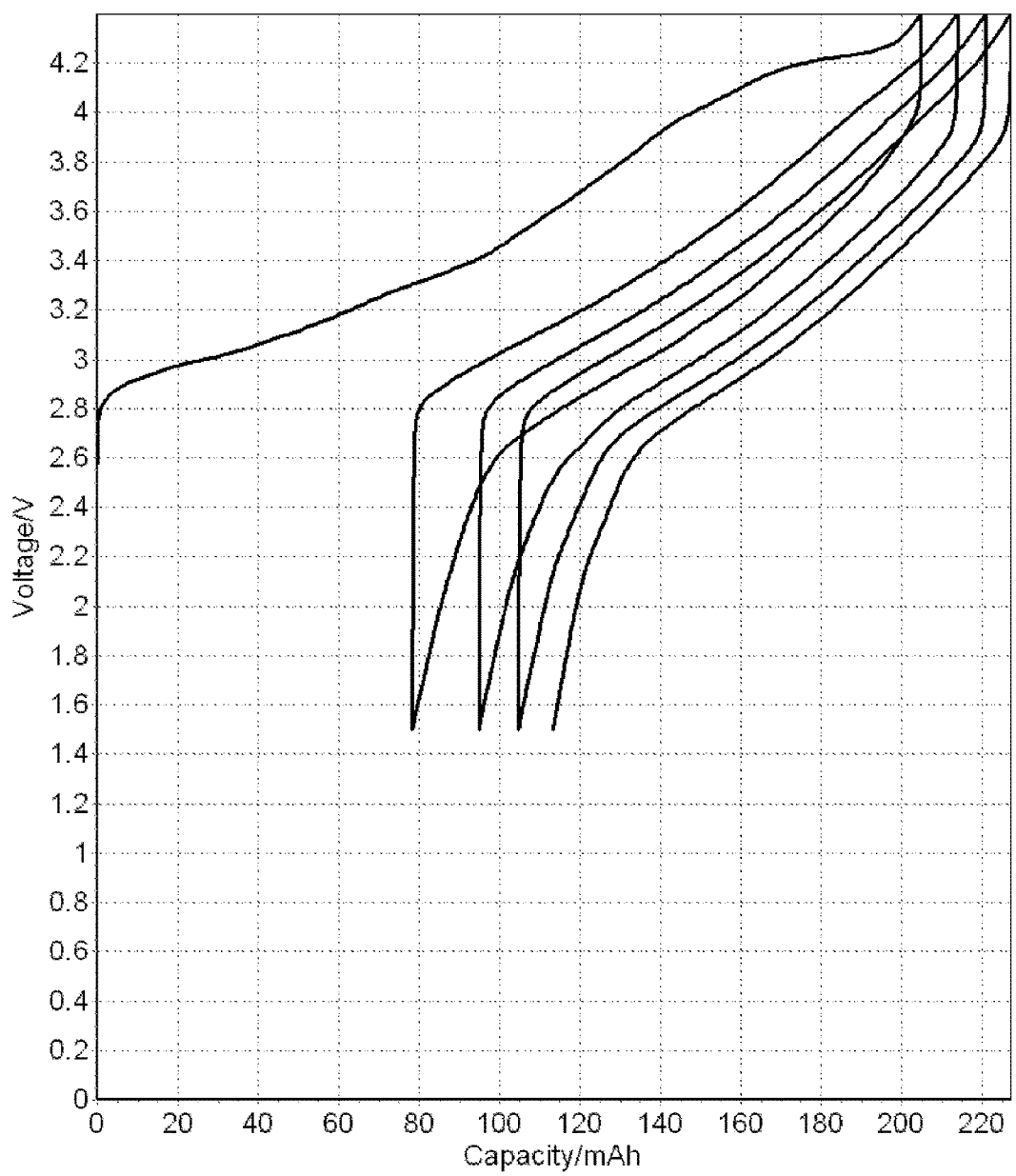
FIG. 4(B) shows the first four charge-discharge voltage profiles (Na-ion half cell Voltage [V] versus Cathode specific capacity [mAh/g]) for the cathode material prepared according to Example 4.
Figure 4C:
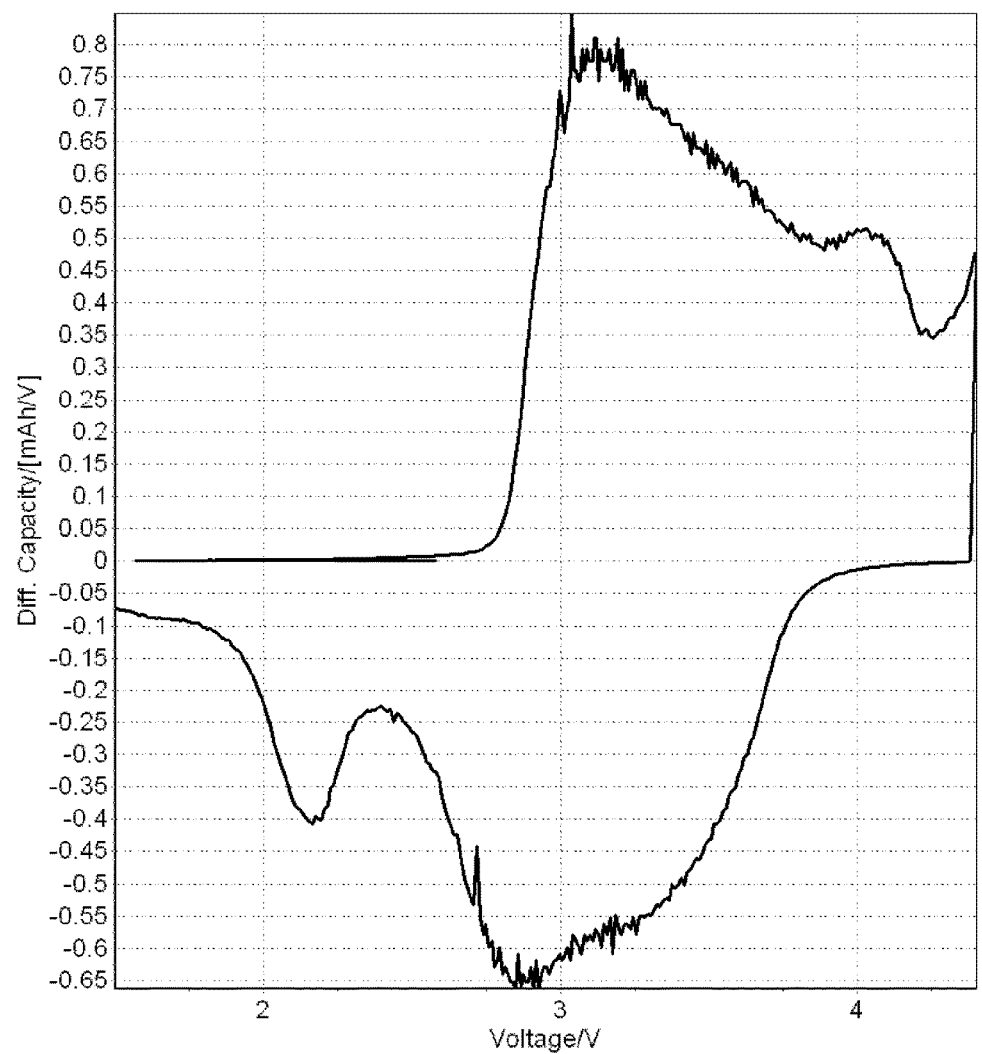
FIG. 4(C) shows the Differential Capacity Profiles for the $3^{rd}$ charge cycle (Differential Capacity [mAh/g/V] versus Na-ion half Cell Voltage [V]) for the cathode material prepared according to Example 4.
Figure 4D:
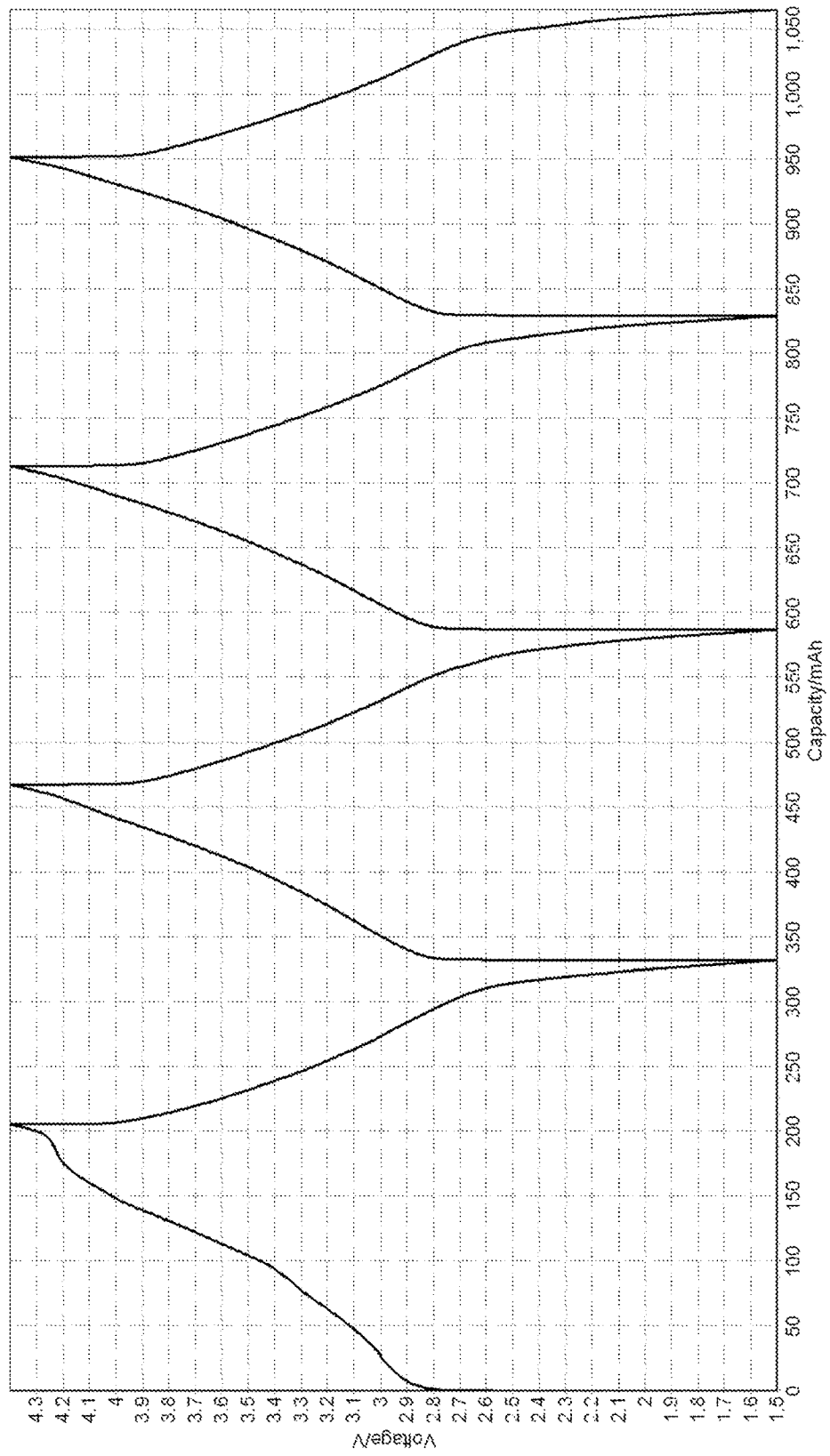
FIG. 4(D) shows the Charge-Discharge Voltage Profiles for the first four cycles (Na-ion half cell Voltage [V] versus Cumulative Cathode Specific Capacity [mAh/g]) for the cathode material prepared according to Example 4.

Referring to FIGS. 4(A)-4(D):

FIG. 4(A) shows Powder X-ray diffraction pattern of Na$_{0.95}$Ni$_{0.3167}$Mn$_{0.3167}$Mg$_{0.1625}$Sn$_{0.2018}$O$_2$ prepared according to Example 4. FIG. 4(B) shows the first four charge-discharge voltage profiles (Na-ion half cell Voltage [V] versus Cathode specific capacity [mAh/g]). An initial charge capacity of 205 mAh/g is observed with a reversible discharge capacity of 129 mAh/g. The discharge voltage profile shows an average voltage of 3.03 V vs Na/Na+. The differential capacity plot as shown in FIG. 4(C) shows the reversible voltage plateaus at around 3V vs Na/Na+ and a high irreversible capacity at high voltage (4.1V vs Na/Na+). The subsequent cycles in FIG. 4(D) show a similar sloped voltage profile indicating a single phase reaction and a solid solution of sodium in the cathode material. This type of sodium extraction leads to good cyclability and a long lived cathode material.

The Electrochemical Properties of NaNi$_{0.3167}$Mn$_{0.3167}$Mg$_{0.1625}$Sn$_{0.2018}$O$_2$ Prepared According to Example 5

Figure 5A:
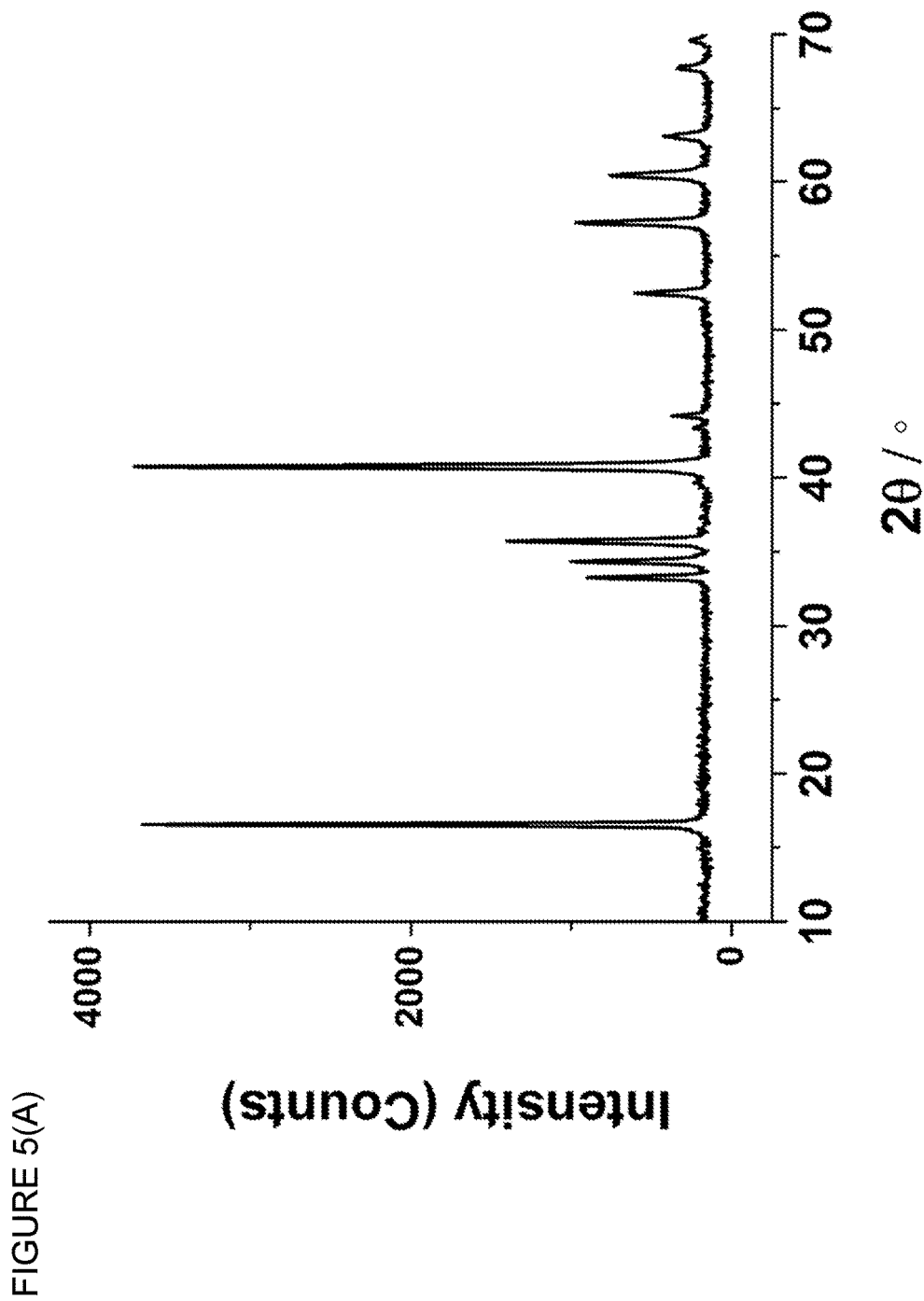
FIG. 5(A) shows the Powder X-ray diffraction pattern for $Na_{0.95}Ni_{0.3167}Mn_{0.3167}Mg_{0.1625}Sn_{0.2018}O_2$ prepared according to Example 5.
Figure 5B:
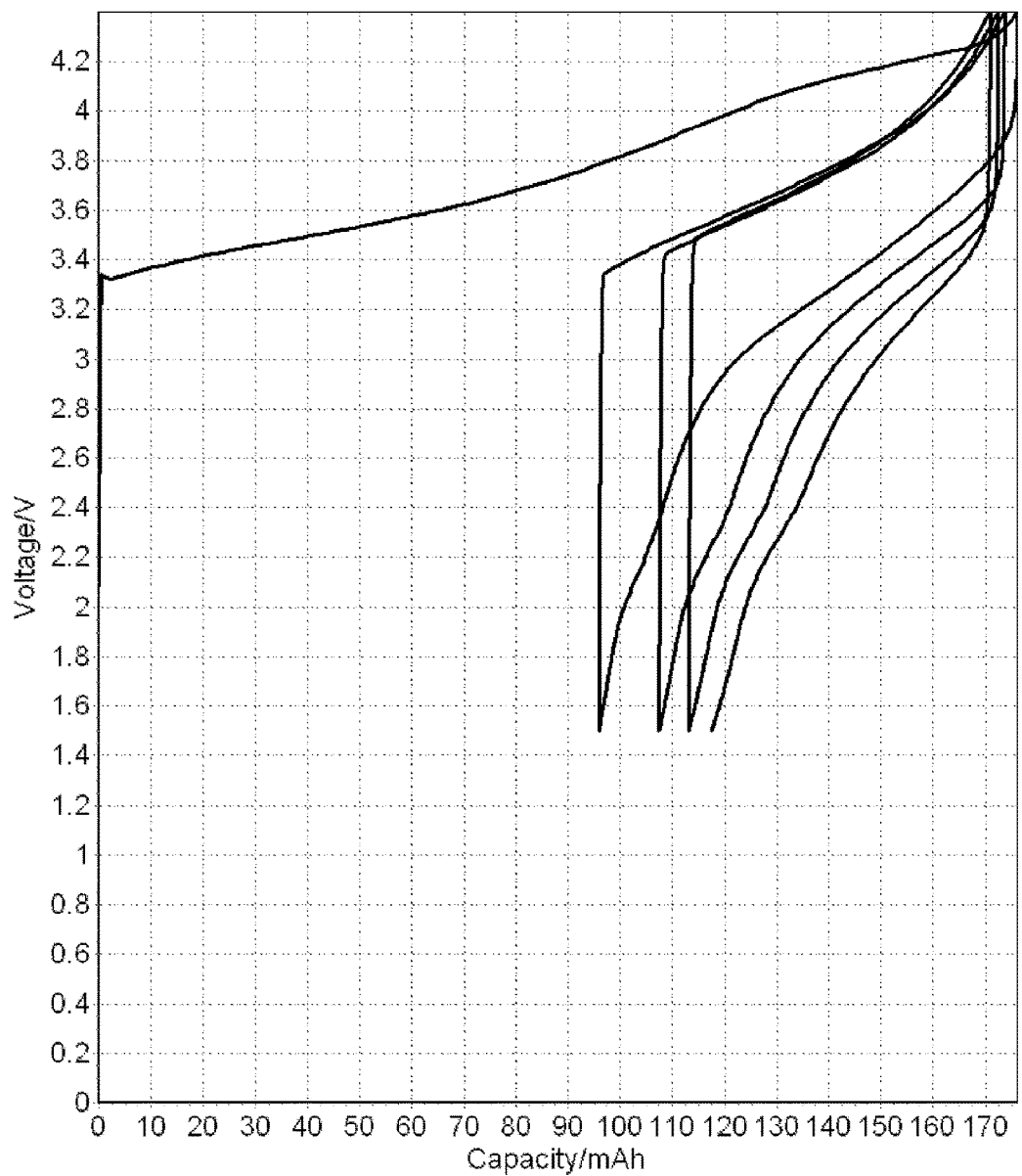
FIG. 5(B) shows the first four charge-discharge voltage profiles (Na-ion half cell Voltage [V] versus Cathode specific capacity [mAh/g]) for the cathode material prepared according to Example 5.
Figure 5C:
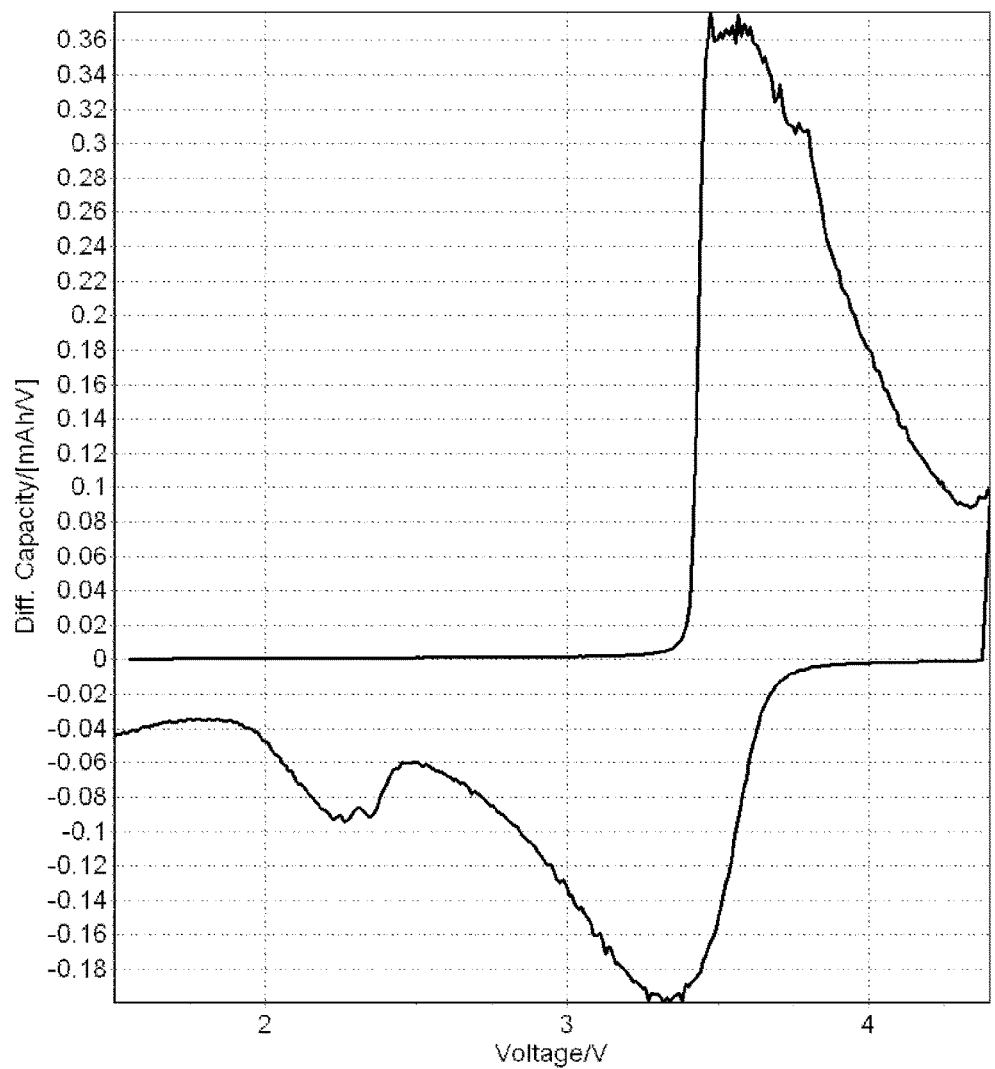
FIG. 5(C) shows the Differential Capacity Profiles for the $3^{rd}$ charge cycle (Differential Capacity [mAh/g/V] versus Na-ion half Cell Voltage [V]) for the cathode material prepared according to Example 5.
Figure 5D:
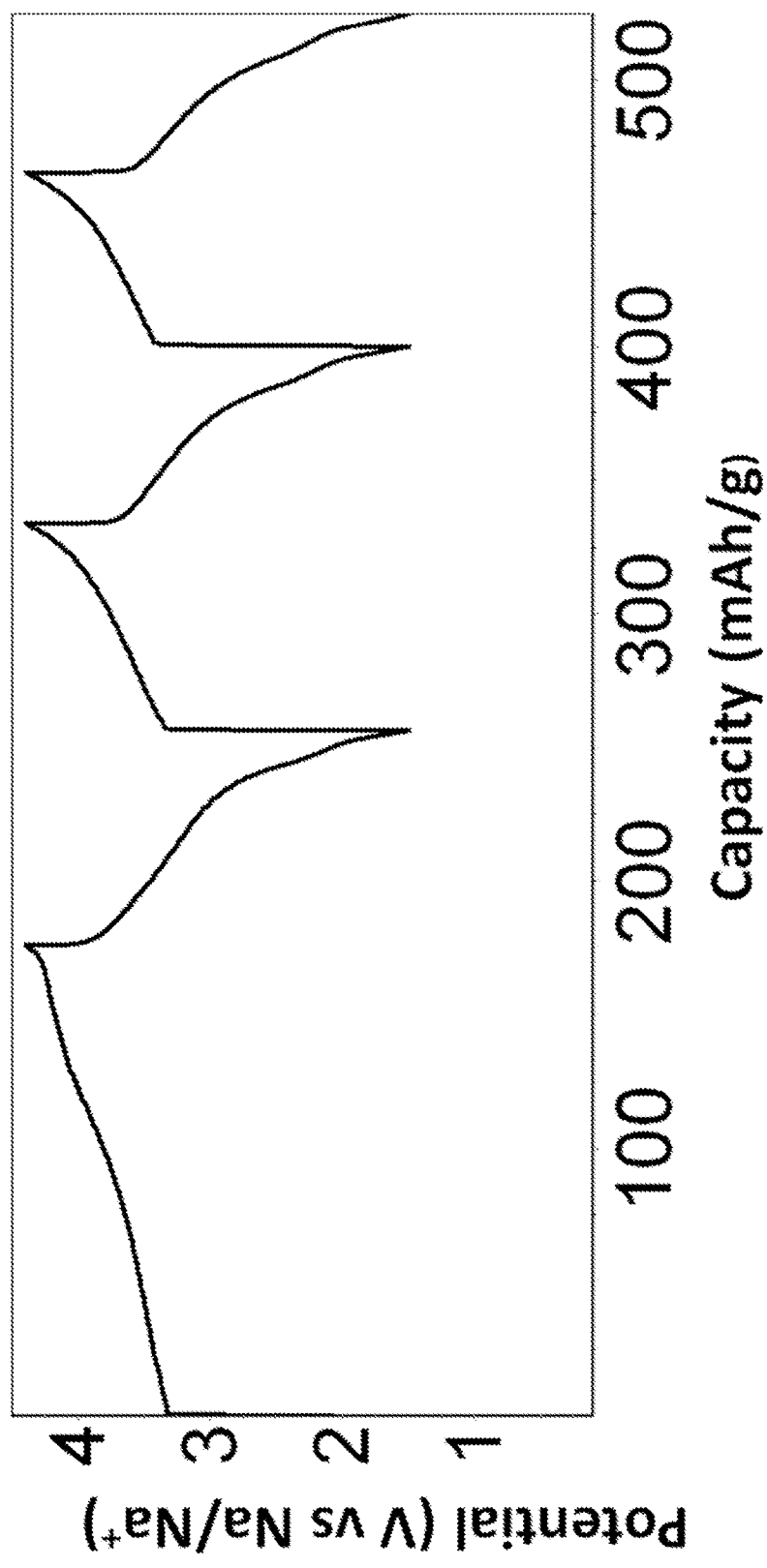
FIG. 5(D) shows the Charge-Discharge Voltage Profiles for the first three cycles (Na-ion half cell Voltage [V] versus Cumulative Cathode Specific Capacity [mAh/g]) for the cathode material prepared according to Example 5.

Referring to FIGS. 5(A)-5(D):

FIG. 5(A) shows the Powder X-ray diffraction pattern of Na$_{0.95}$Ni$_{0.3167}$Mn$_{0.3167}$Mg$_{0.1625}$Sn$_{0.2018}$O$_2$ prepared according to Example 5. When cycled in a sodium metal half cell as shown in FIG. 5(B), this material exhibits an initial charge capacity of 165 mAh/g and a low discharge capacity of 80 mAh/g. This material also exhibits a large hysteresis in charge and discharge which is shown to increase upon cycling, (FIG. 5(B)). The differential capacity plot shows two discharge voltage regions at 3.0V and 2.2V vs Na/Na+ as shown in FIG. 5(C). The cumulative capacity cycling is observed in FIG. 5(D).

The Electrochemical Properties of NaNi$_{1/2}$Sn$_{1/2}$O$_2$, Prepared According to Example 6

Figure 6A:
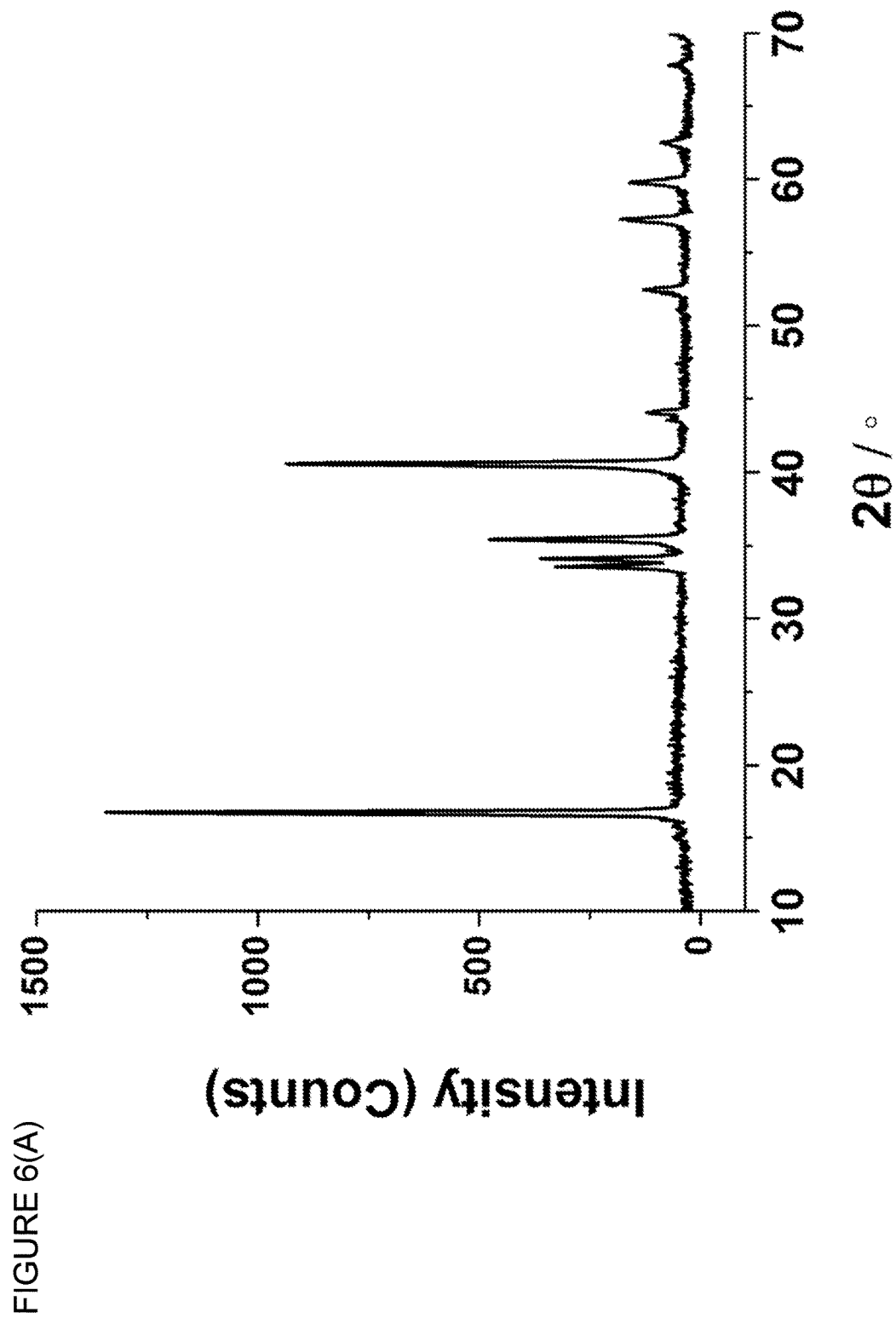
FIG. 6(A) shows the Powder X-ray diffraction pattern for $NaNi_{1/2}Sn_{1/2}O_2$ prepared according to Example 6.
Figure 6B:
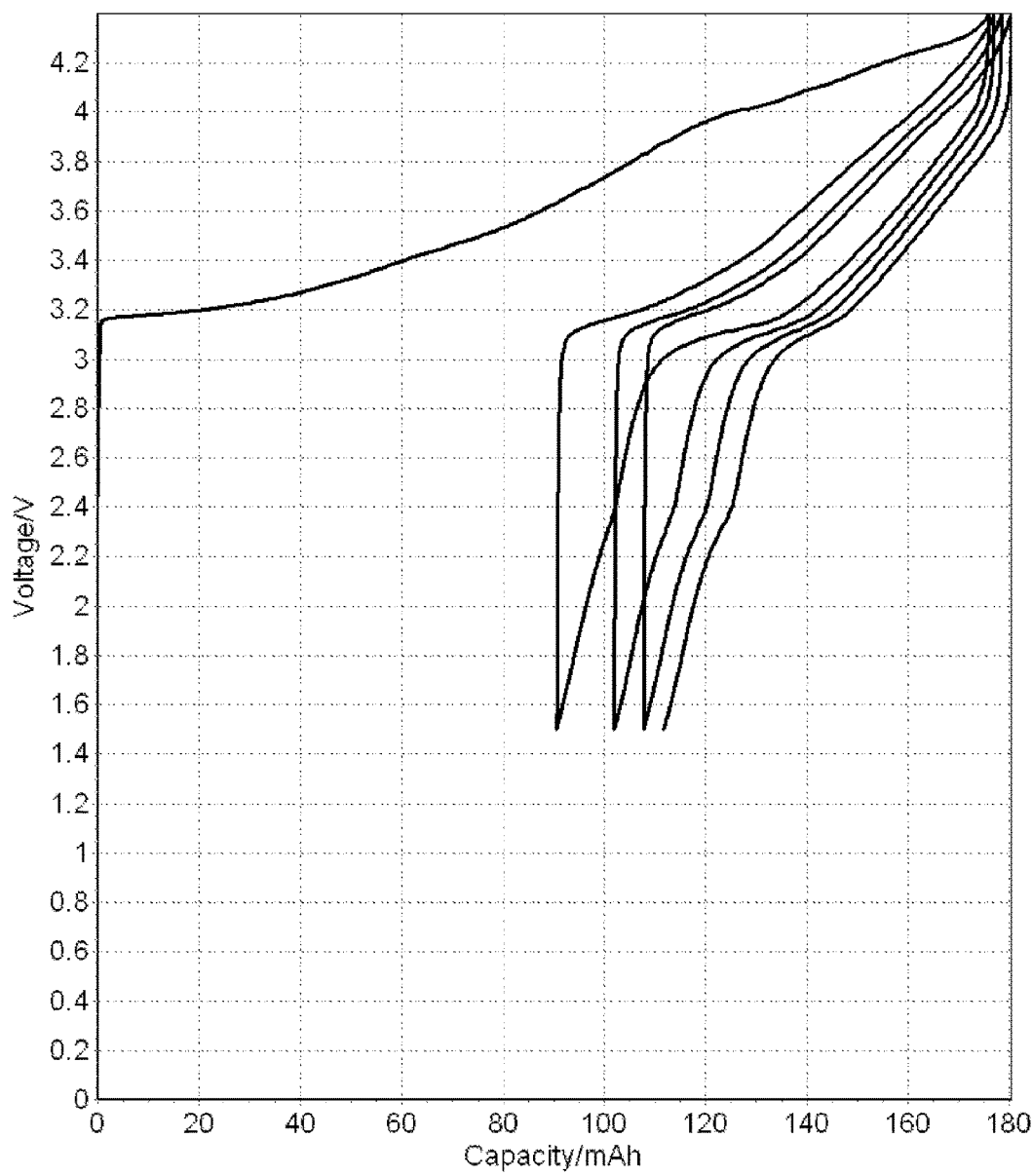
FIG. 6(B) shows the first four charge-discharge voltage profiles (Na-ion half cell Voltage [V] versus Cathode specific capacity [mAh/g]) for the cathode material prepared according to Example 6.
Figure 6C:
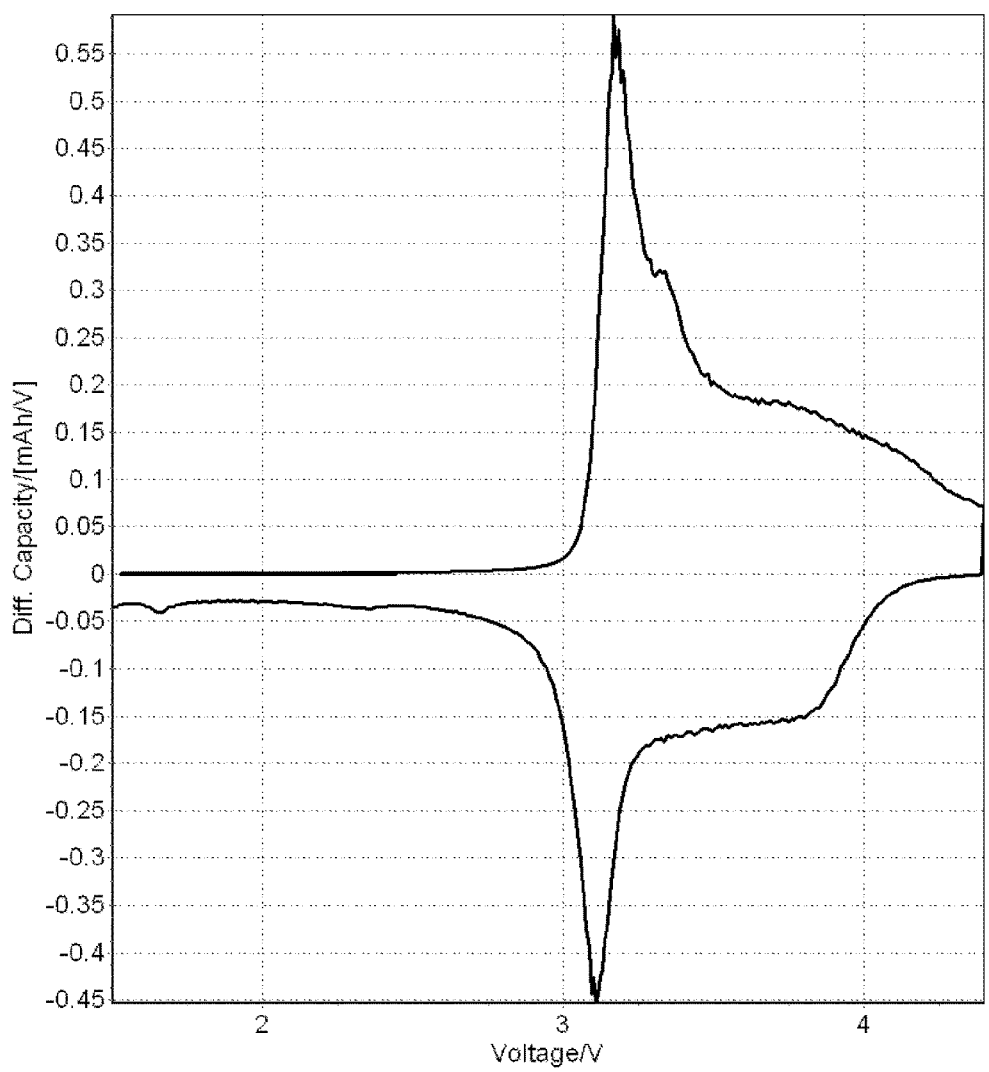
FIG. 6(C) shows the Differential Capacity Profiles for the $3^{rd}$ charge cycle (Differential Capacity [mAh/g/V] versus Na-ion half Cell Voltage [V]) for the cathode material prepared according to Example 6.
Figure 6D:
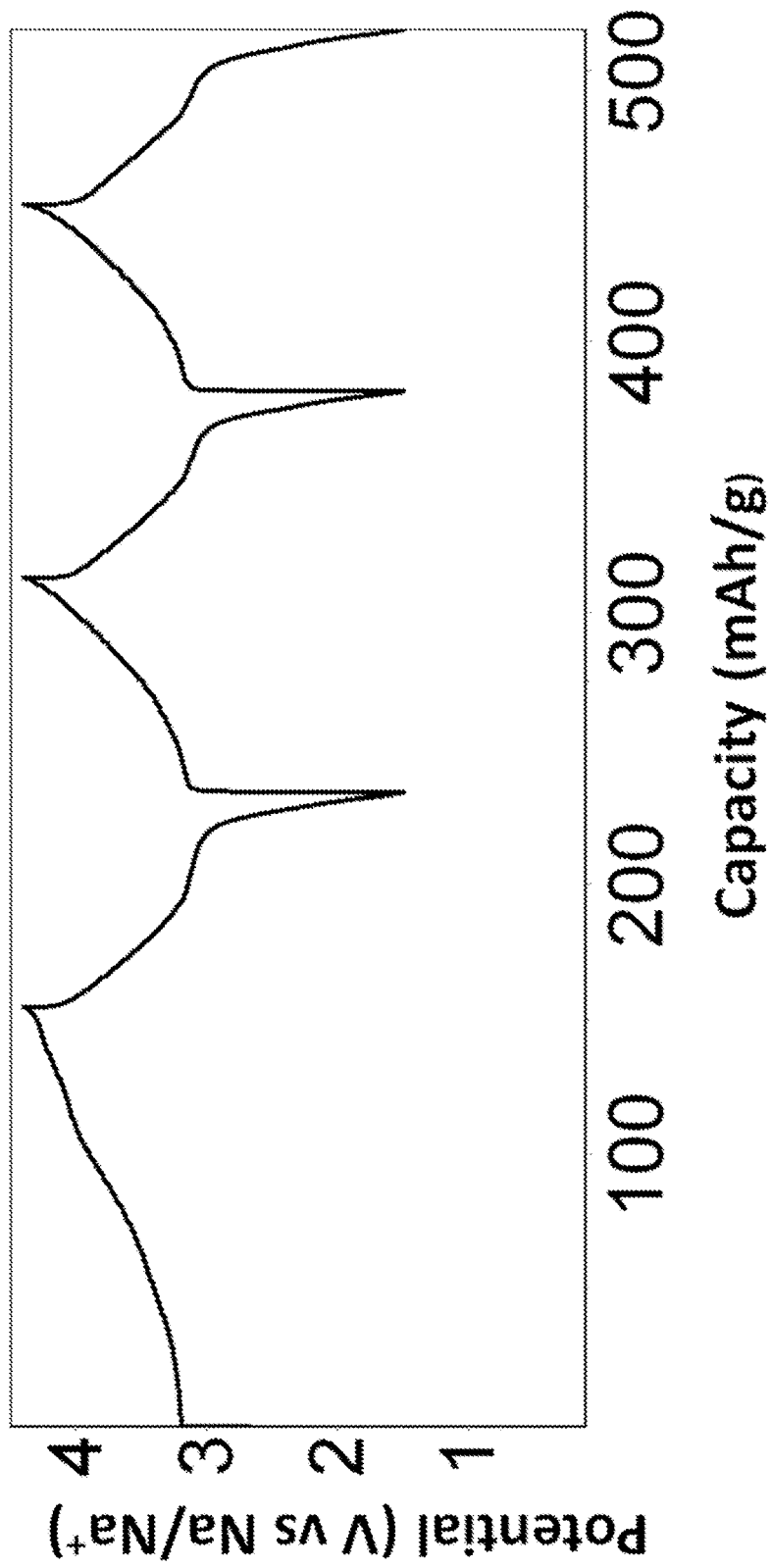
FIG. 6(D) shows the Charge-Discharge Voltage Profiles for the first three cycles (Na-ion half cell Voltage [V] versus Cumulative Cathode Specific Capacity [mAh/g]) for the cathode material prepared according to Example 6.

Referring to FIGS. 6(A)-6(D):

FIG. 6(A) shows the Powder X-ray diffraction pattern of NaNi$_{1/2}$Sn$_{1/2}$O$_2$ prepared according to Example 6. When cycled in a sodium metal half cell as shown in FIG. 6(B) an initial charge capacity of 170 mAh/g is observed with a reversible capacity of about 85 mAh/g. Similar to Example 5, the material exhibits a high hysteresis which increases upon cycling, but is an improvement over that observed in Example 5. The differential capacity profile shows a reversible discharge voltage region of around 3.1V vs Na, and a high irreversible capacity is observed at voltages greater than 4V v Na/Na+ (FIG. 6(C)). An improvement in the reversibility of the material may be obtained by limiting the voltage limits of this test, however the reversible capacity is relatively low. The accumulative cycling capacity is observed in FIG. 6(D).

The Electrochemical Properties of NaNi$_{1/2}$Ti$_{1/4}$Sn$_{1/4}$O$_2$, Prepared According to Example 7

Figure 7A:
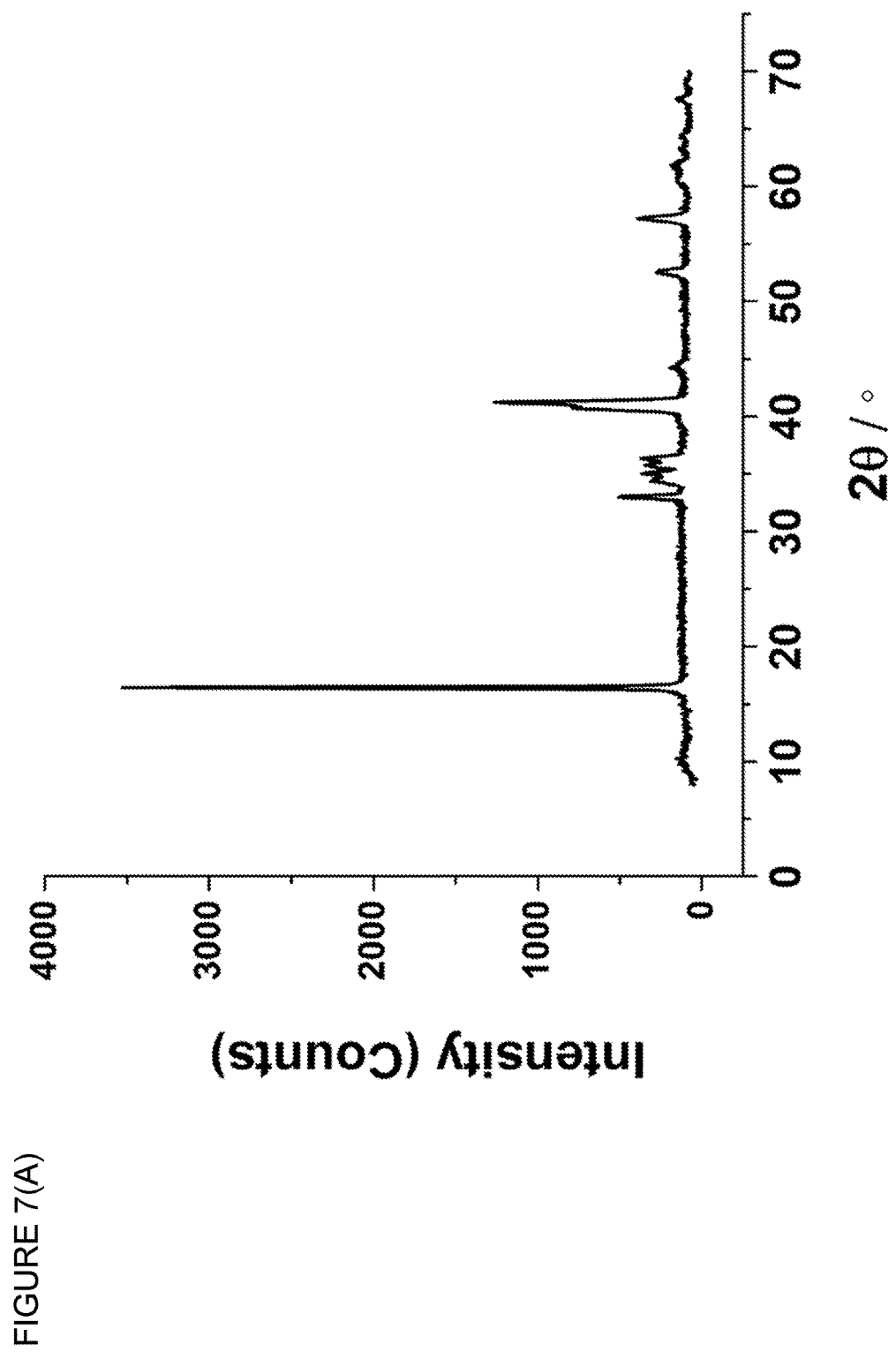
FIG. 7(A) shows the Powder X-ray diffraction pattern for $NaNi_{1/2}Ti_{1/4}Sn_{1/4}O_2$ prepared according to Example 7.
Figure 7B:
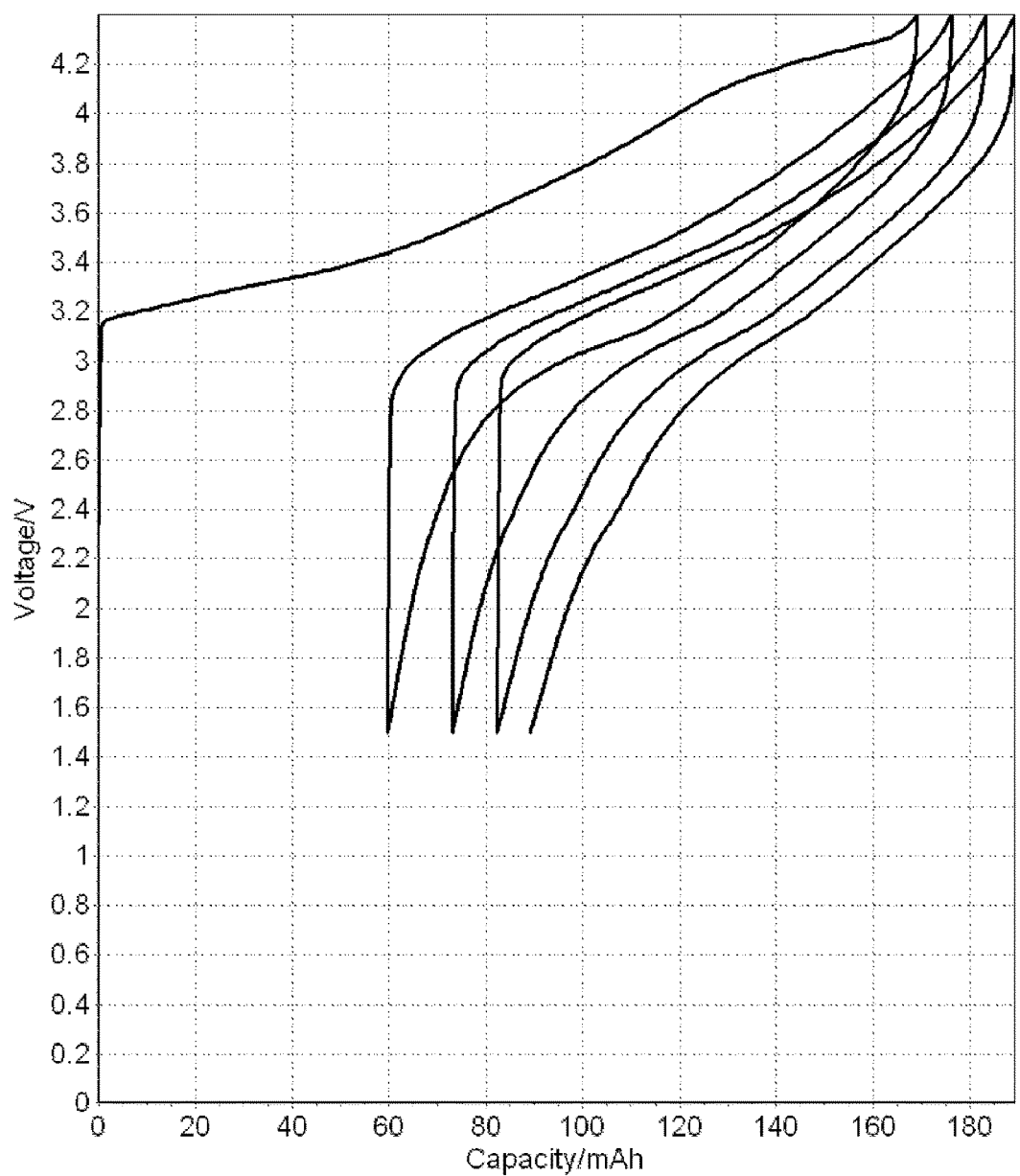
FIG. 7(B) shows the first four charge-discharge voltage profiles (Na-ion half cell Voltage [V] versus Cathode specific capacity [mAh/g]) for the cathode material prepared according to Example 7.
Figure 7C:
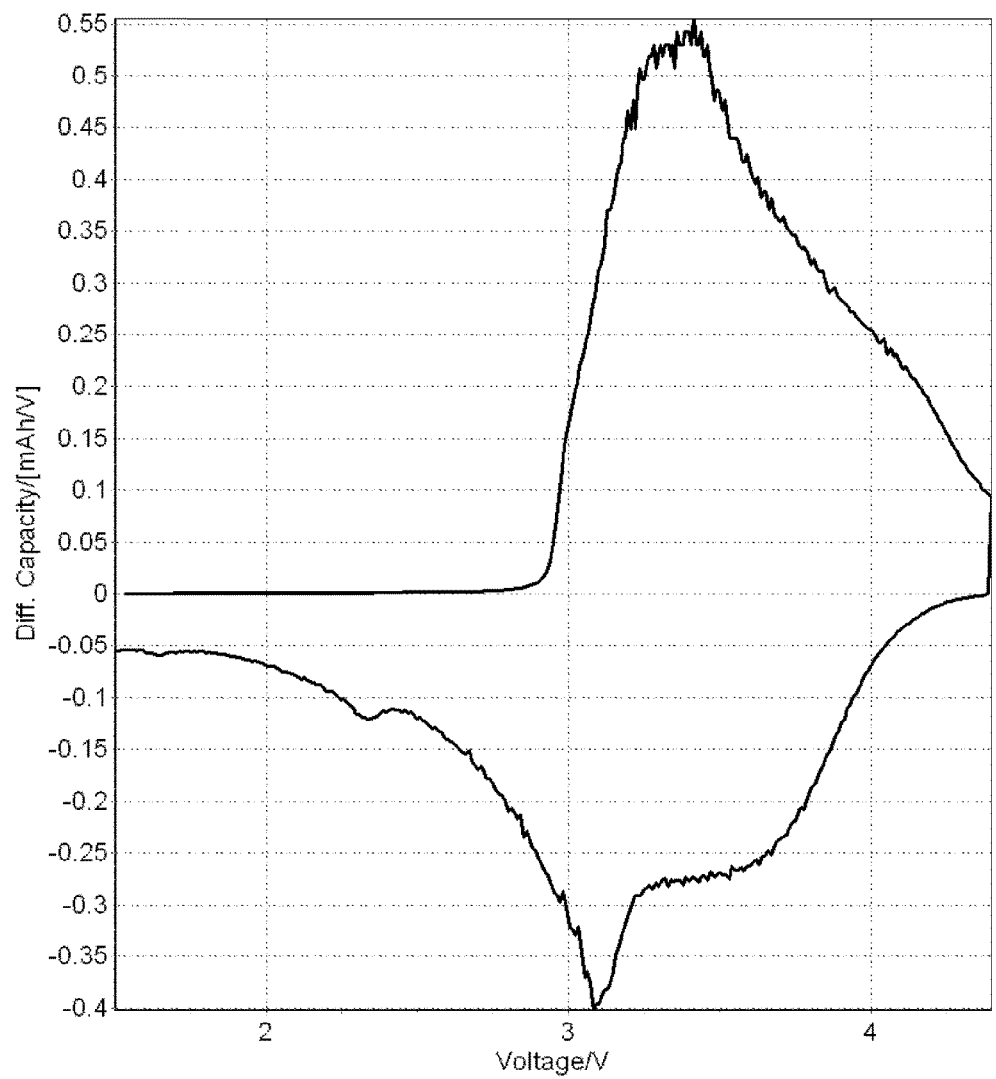
FIG. 7(C) shows the Differential Capacity Profiles for the $3^{rd}$ charge cycle (Differential Capacity [mAh/g/V] versus Na-ion half Cell Voltage [V]) for the cathode material prepared according to Example 7.
Figure 7D:
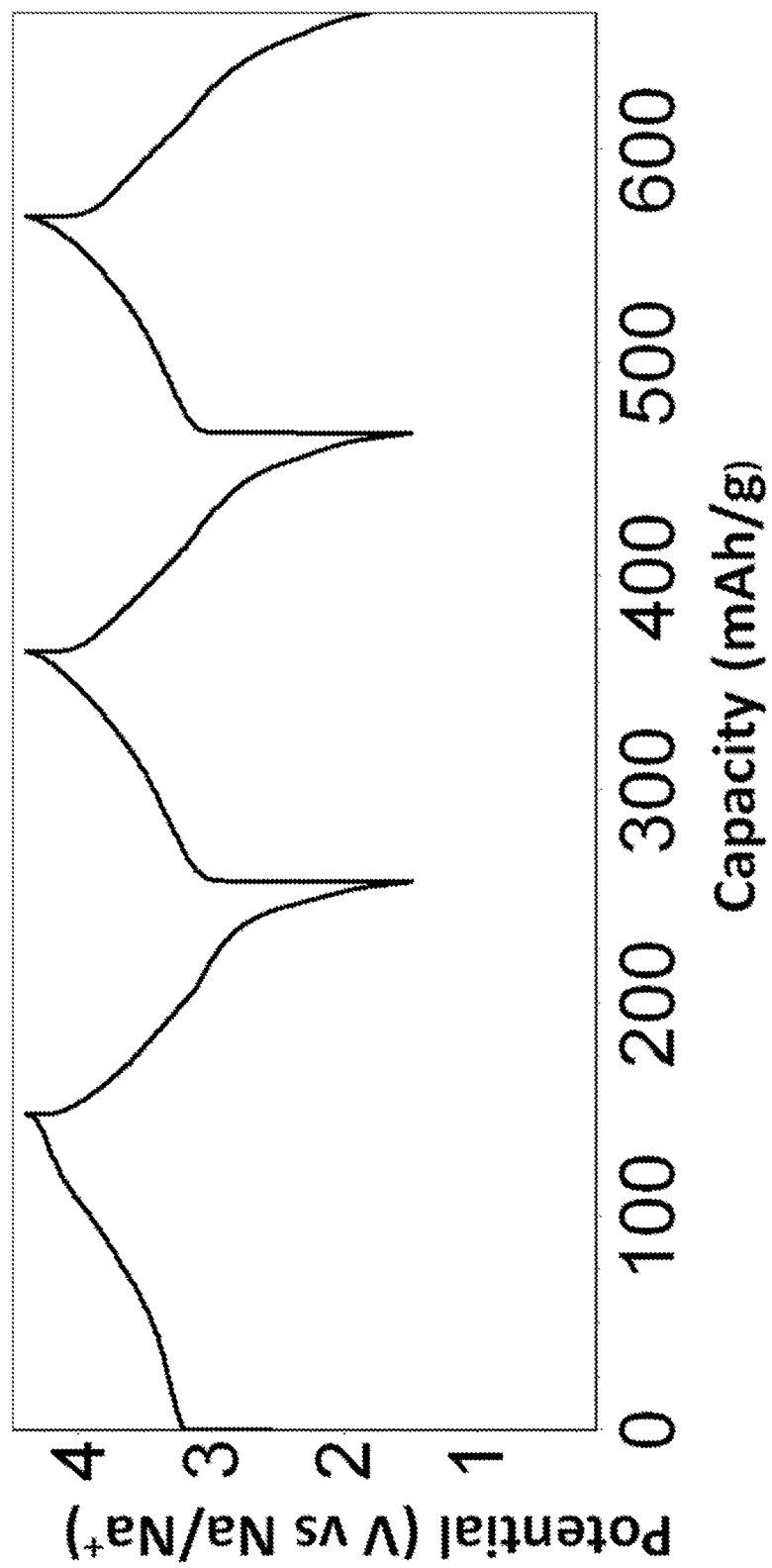
FIG. 7(D) shows the Charge-Discharge Voltage Profiles for the first three cycles (Na-ion half cell Voltage [V] versus Cumulative Cathode Specific Capacity [mAh/g]) for the cathode material prepared according to Example 7.

Referring to FIGS. 7(A)-7(D):

FIG. 7(A) shows the Powder X-ray diffraction pattern of NaNi$_{1/2}$Ti$_{1/4}$Sn$_{1/4}$O$_2$ prepared according to Example 7. An initial charge capacity of 170 mAh/g is observed and a discharge capacity of 112 mAh/g when cycled to 4.4V vs Na/Na+ or 102 mAh/g when cycled to 4.2V vs Na/Na+. (FIG. 7B). The differential capacity of the 3$^{rd}$ cycle (FIG. 7C) shows a reversible voltage region upon discharge of 3.1V vs Na/Na+ and therefore has an average discharge voltage of 3.15V vs Na/Na+. The cumulative capacity plot is given in FIG. 7D.

The Electrochemical Properties of NaNi$_{1/2}$Ti$_{3/8}$Sn$_{1/8}$O$_2$ Prepared According to Example 8

Referring to FIGS. 8(A)-8(D)

Figure 8A:
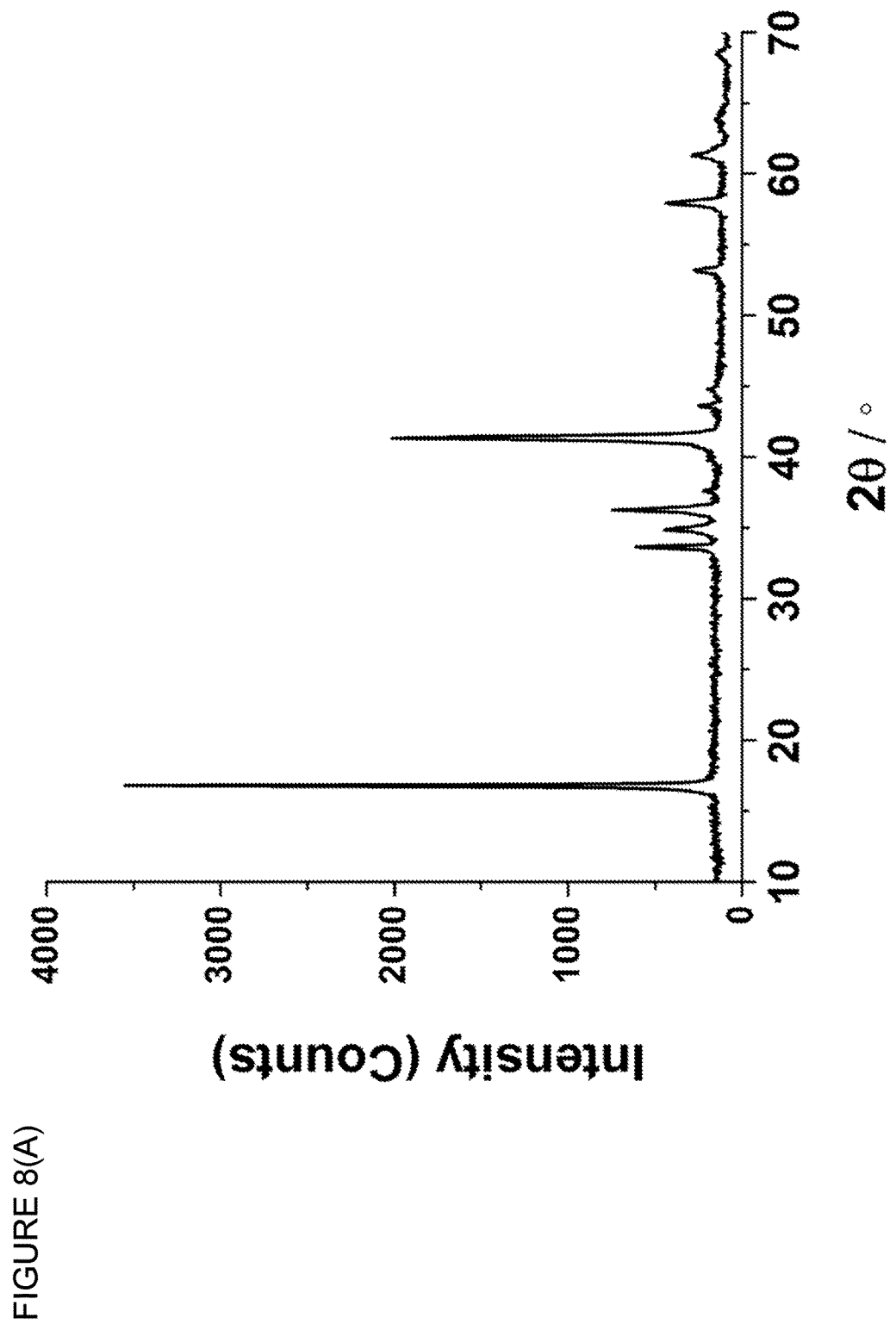
FIG. 8(A) shows the Powder X-ray diffraction pattern for $NaNi_{1/2}Ti_{3/8}Sn_{1/8}O_2$ prepared according to Example 8.
Figure 8B:
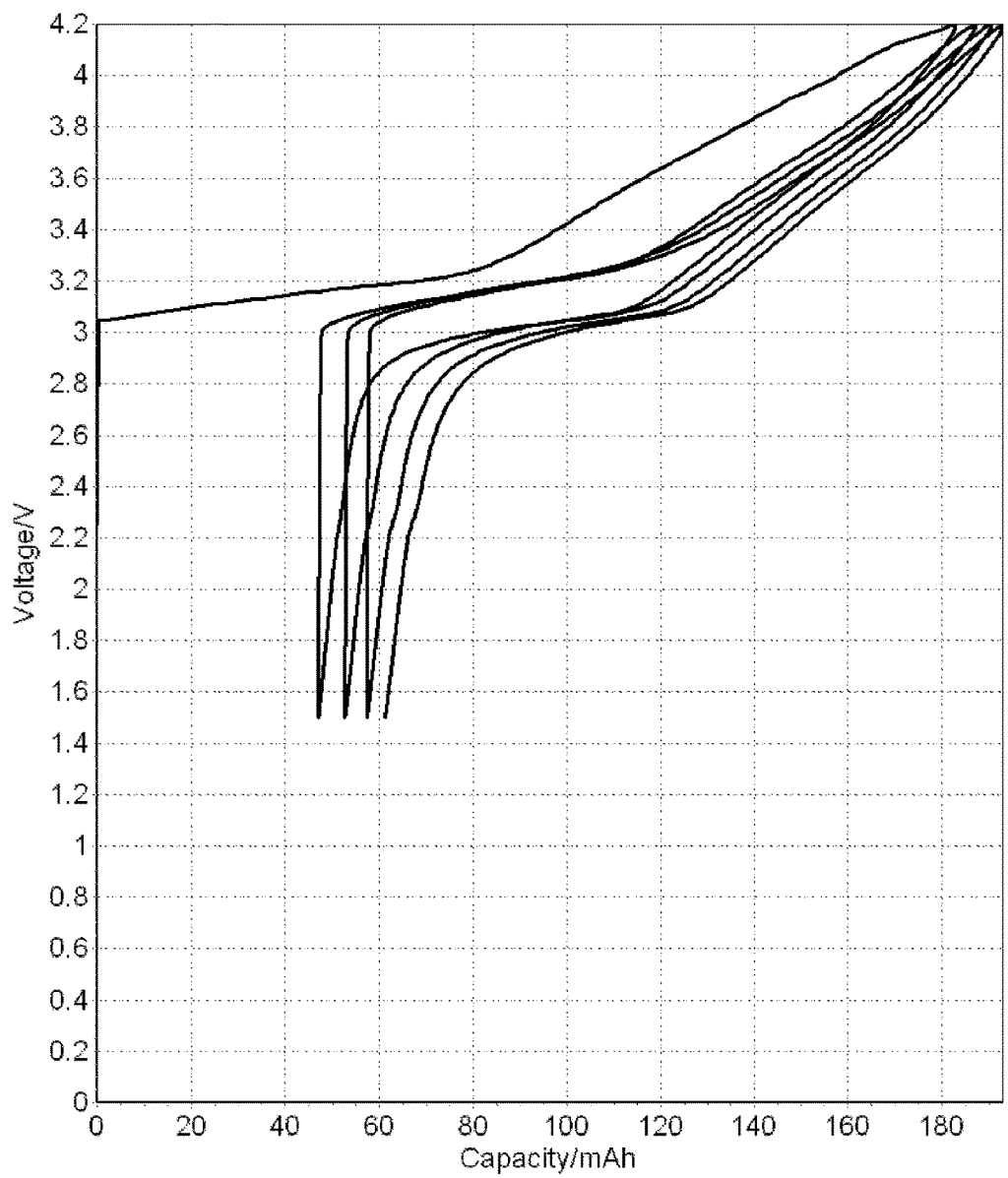
FIG. 8(B) shows the first four charge-discharge voltage profiles (Na-ion half cell Voltage [V] versus Cathode specific capacity [mAh/g]) for the cathode material prepared according to Example 8.
Figure 8C:
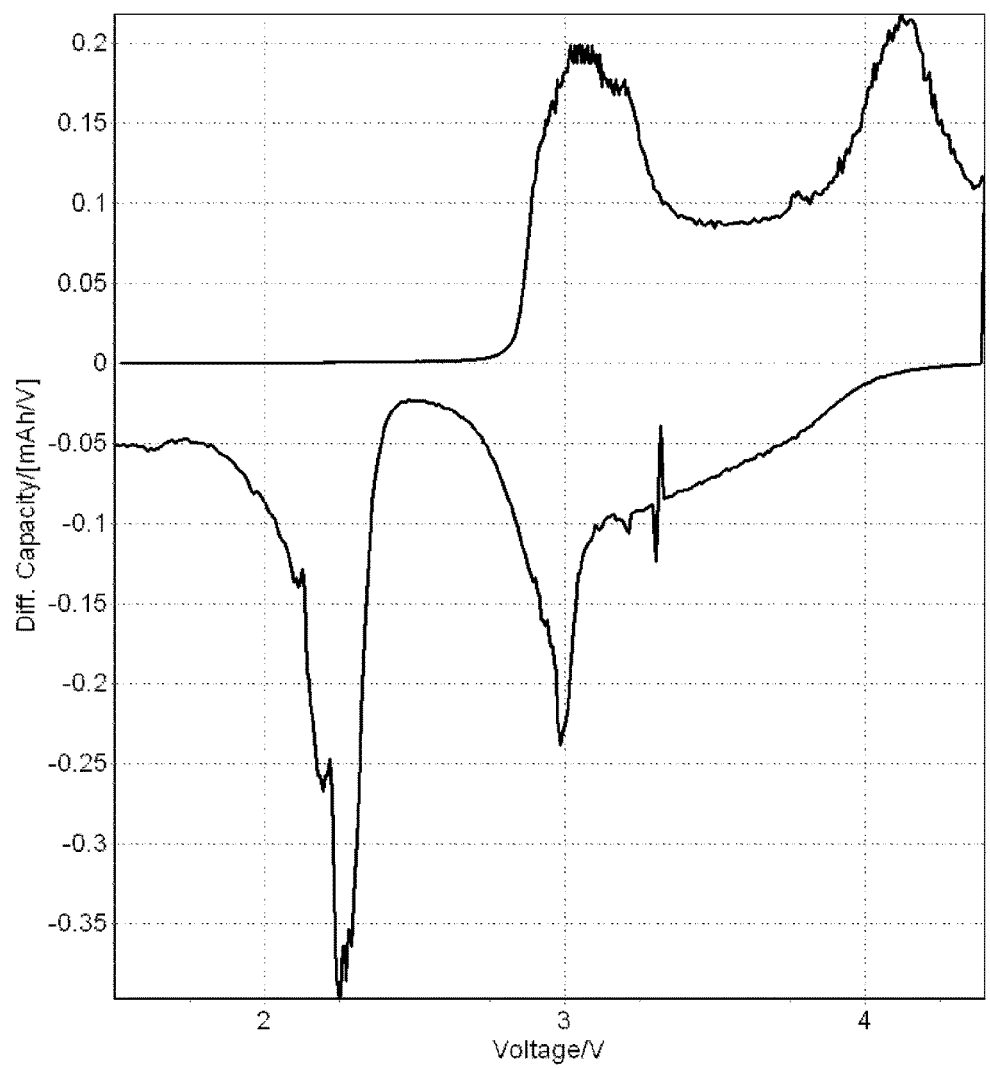
FIG. 8(C) shows the Differential Capacity Profiles for the $3^{rd}$ charge cycle (Differential Capacity [mAh/g/V] versus Na-ion half Cell Voltage [V]) for the cathode material prepared according to Example 8.
Figure 8D:
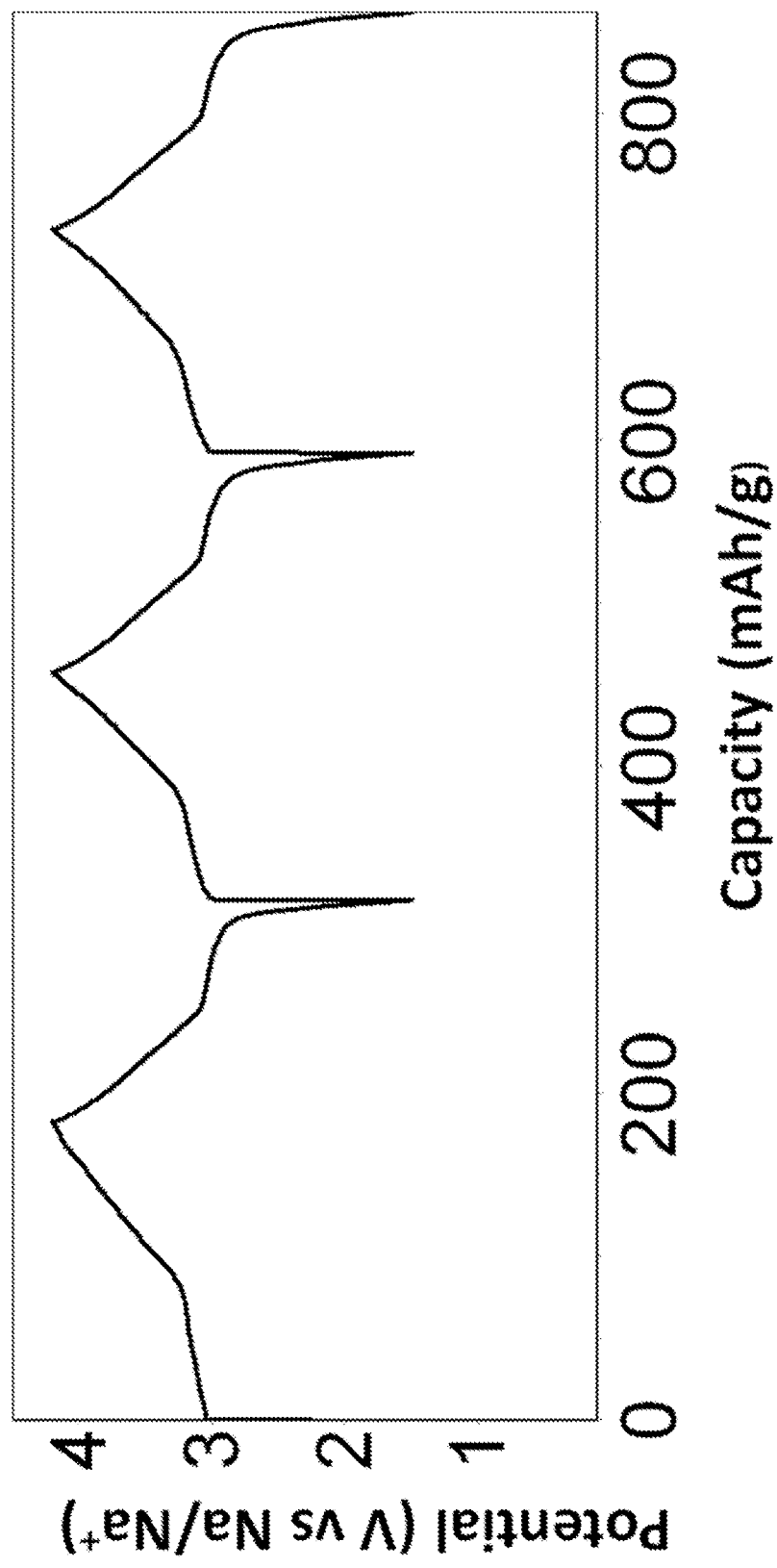
FIG. 8(D) shows the Charge-Discharge Voltage Profiles for the first three cycles (Na-ion half cell Voltage [V] versus Cumulative Cathode Specific Capacity [mAh/g]) for the cathode material prepared according to Example 8.

FIG. 8(A) shows the Powder X-ray diffraction pattern of NaNi$_{1/2}$Ti$_{3/8}$Sn$_{1/8}$O$_2$ prepared according to Example 8. FIG. 8(B) shows the first four charge-discharge voltage profiles (Na-ion half cell Voltage [V] versus Cathode specific capacity [mAh/g]) for the cathode material tested in a sodium metal half cell. Initial capacities of 185 mAh/g are observed with an initial discharge capacity of 142 mAh/g. Interestingly, this material exhibits a higher discharge capacity after being tested in the voltage region up to 4.2V vs Na/Na+ compared to 4.4V vs Na/Na+ (Table 1). The average voltage observed for discharge upon 4.2V (3.2V vs Na/Na+) cycling is also higher than when cycled at 4.4V Na/Na+ (3.01V vs Na/Na+). The Differential Capacity Profiles for the 3$^{rd}$ charge cycle can be observed in FIG. 8(C) and the main voltage regions for the redox reaction upon discharge is observed at 3.2V vs Na/Na+.

The Electrochemical Properties of Materials with Oxygen Non-Stoichiometry Example 9

Referring to FIGS. 9(A)-9(F):

In a further embodiment of the invention, the stabilisation of oxygen non-stoichiometry within materials was characterised according to the procedures outlined below. The loss of oxygen from the stoichiometric material NaNi$_{1/2}$Mn$_{1/4}$Sn$_{1/8}$Ti$_{1/8}$O$_2$ (described in Example 3) was induced by a secondary process step forming NaNi$_{1/2}$Mn$_{1/4}$Sn$_{1/8}$Ti$_{1/8}$O$_{2-d}$ (described in Example 9). The secondary process step involved re-heating the material NaNi$_{1/2}$Mn$_{1/4}$Sn$_{1/8}$Ti$_{1/8}$O$_2$ to a temperature of 950° C. under a flow of Nitrogen. The loss of oxygen from the material NaNi$_{1/2}$Mn$_{1/4}$Sn$_{1/8}$Ti$_{1/8}$O$_2$ by secondary processing was quantified using TGA-STA (Thermo-Gravimetric Analysis-Simultaneous Thermal Analysis). The loss of oxygen upon heating and cooling in different atmospheres was investigated by heating the stoichiometric layered oxide NaNi$_{1/2}$Mn$_{1/4}$Sn$_{1/8}$Ti$_{1/8}$O$_2$ (Example 3) in air or nitrogen at a rate of 10°/min up to 950° C. The temperature was then held at 950° C. for 30 minutes before cooling at a rate of 10° C./min in either a flow of nitrogen or air. This post processing and the corresponding TGA/STA analysis confirms the reversible incorporation and loss of oxygen from the material using different processing methods.

Figure 9A:
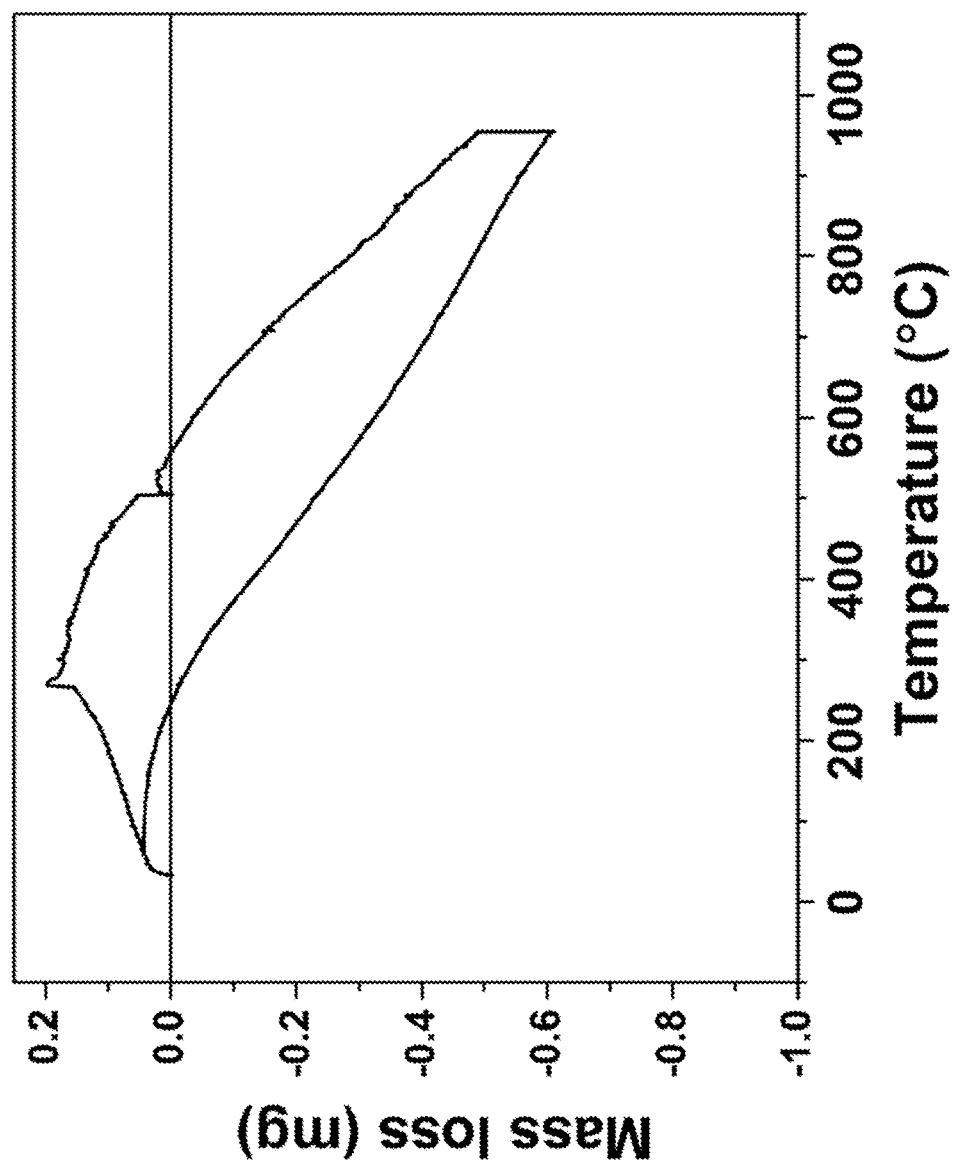
FIG. 9 (A) shows the result of TGA-STA of $NaNi_{1/2}Mn_{1/4}Sn_{1/8}Ti_{1/8}O_2$ synthesised as described in Example 9A, i.e. Example 3 followed by further heating to 950° C. and cooling in air.
FIG. 9(C) shows the Powder X-ray diffraction pattern for $NaNi_{1/2}Mn_{1/4}{}^{Sn}{}_{1/8}Ti_{1/8}O_2$ synthesised as described in Example 9B (The peaks present at 2θ=50 and 16 originate from the specimen holder)
FIG. 9(D) shows the first four charge-discharge voltage profiles (Na-ion half cell Voltage [V] versus Cathode specific capacity [mAh/g]) for the cathode material prepared according to Example 9B.
FIG. 9(E) shows the Differential Capacity Profiles for the $3^{rd}$ charge cycle (Differential Capacity [mAh/g/V] versus Na-ion half Cell Voltage [V]) for the cathode material prepared according to Example 9B.
FIG. 9(F) shows the Charge-Discharge Voltage Profiles for the first four cycles (Na-ion half cell Voltage [V] versus Cumulative Cathode Specific Capacity [mAh/g]) for the cathode material prepared according to Example 9B.
Figure 9B:
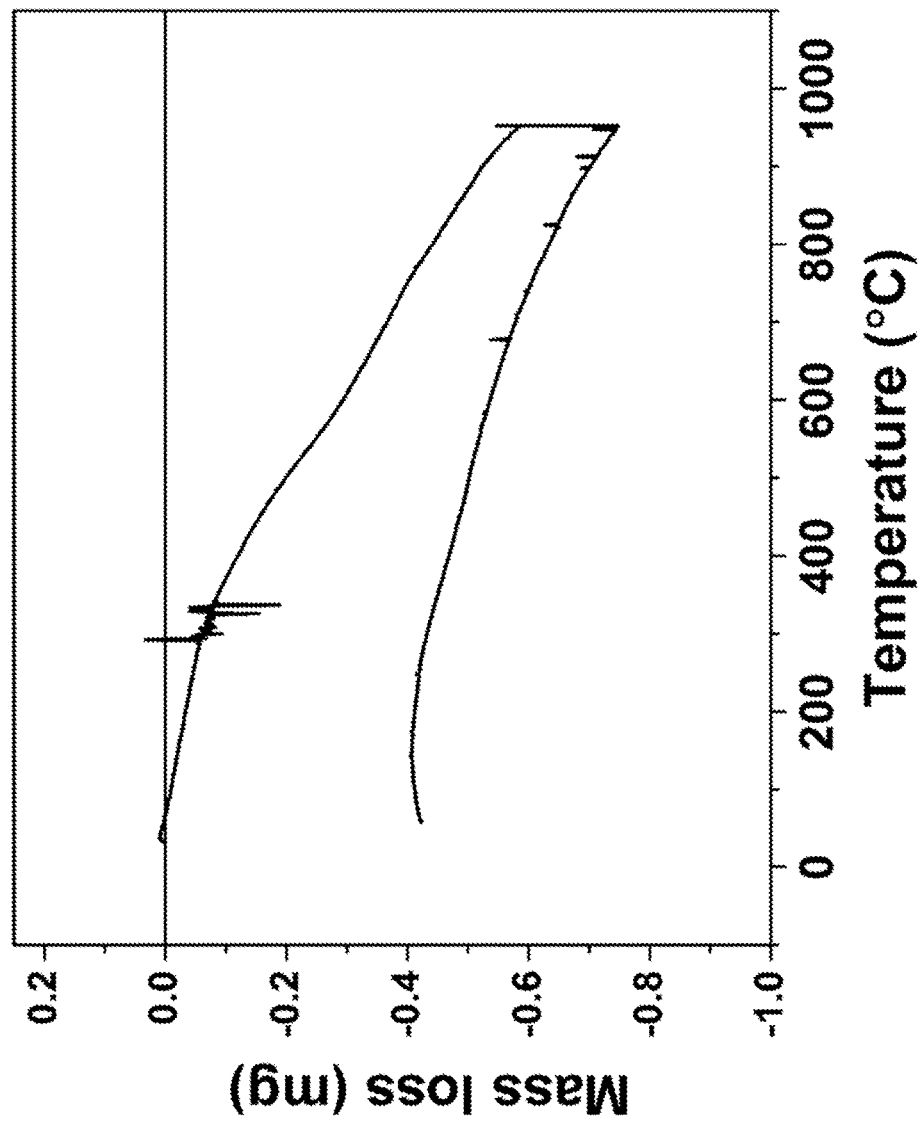

FIG. 9(A) shows the TGA-STA results of NaNi$_{1/2}$Mn$_{1/4}$Sn$_{1/8}$Ti$_{1/8}$O$_2$ heated under different atmospheres. When this material is cooled in air there is no mass difference between the starting and finishing material after firing up to 950° C. The mass loss up to 950° C. is assumed to be oxygen loss and upon cooling the oxygen is reincorporated into the structure. FIG. 9(B) shows the TGA-STA results of NaNi$_{1/2}$Mn$_{1/4}$Sn$_{1/8}$Ti$_{1/8}$O$_2$ when heated and cooled under N$_2$. In FIG. 9(B) it is observed that there is a mass difference between the starting and finishing material after firing to 950° C. This sample shows a mass loss of 0.42 mg from 75.03 mg of material, assuming that this is related to oxygen loss this leads to a formula of NaNi$_{1/2}$Mn$_{1/4}$Sn$_{1/8}$Ti$_{1/8}$O$_{1.958}$ with a formula weight of 118.23.

Figure 9C:
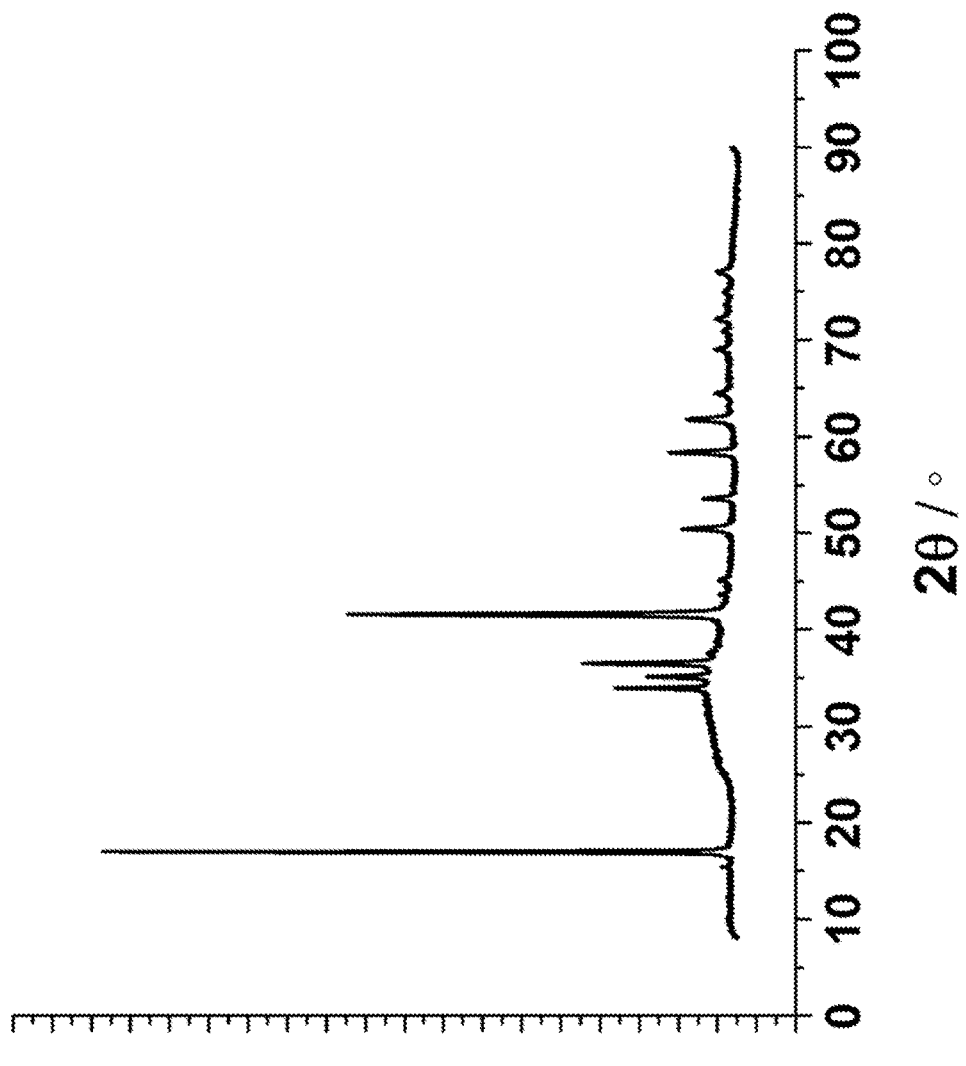
Figure 9D:
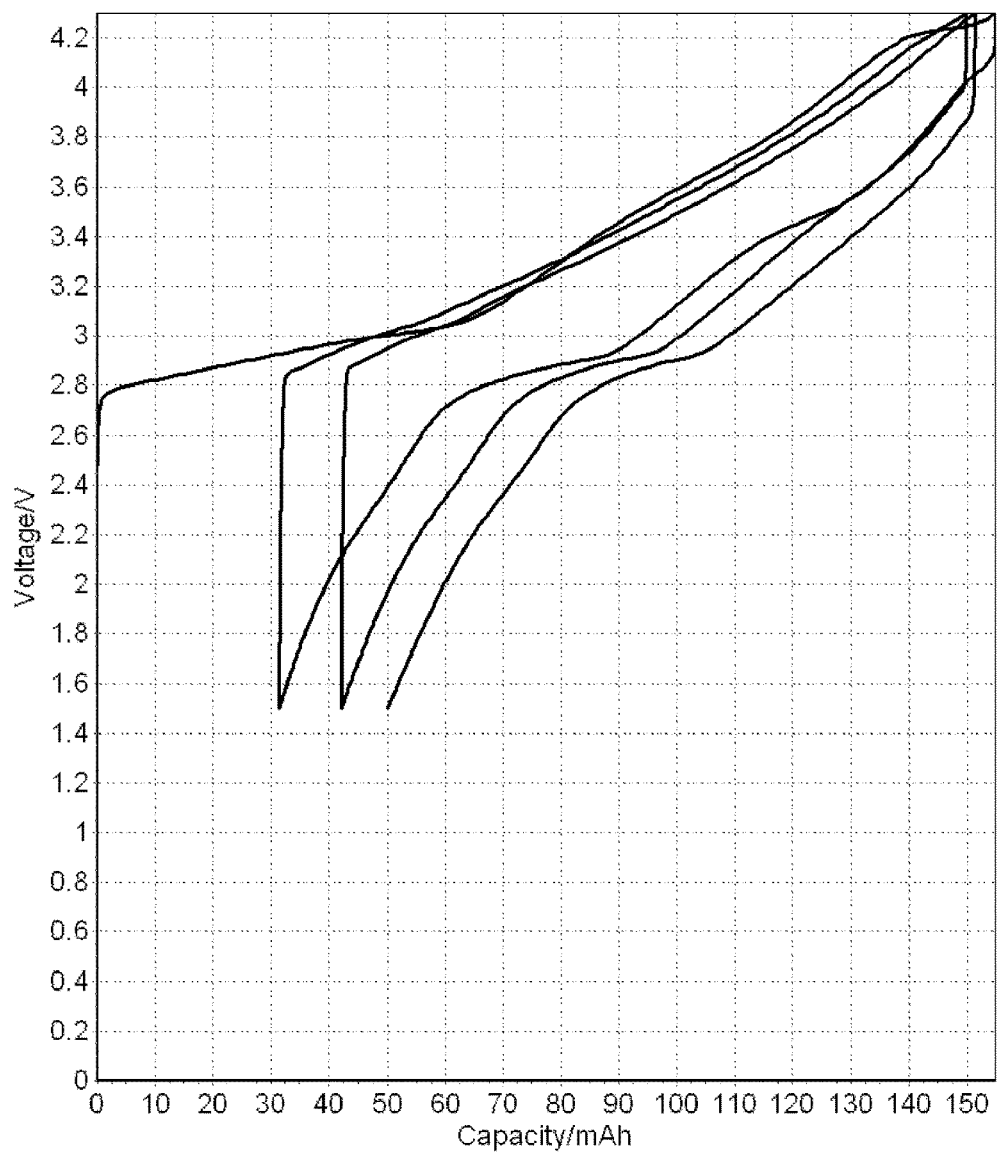
Figure 9E:
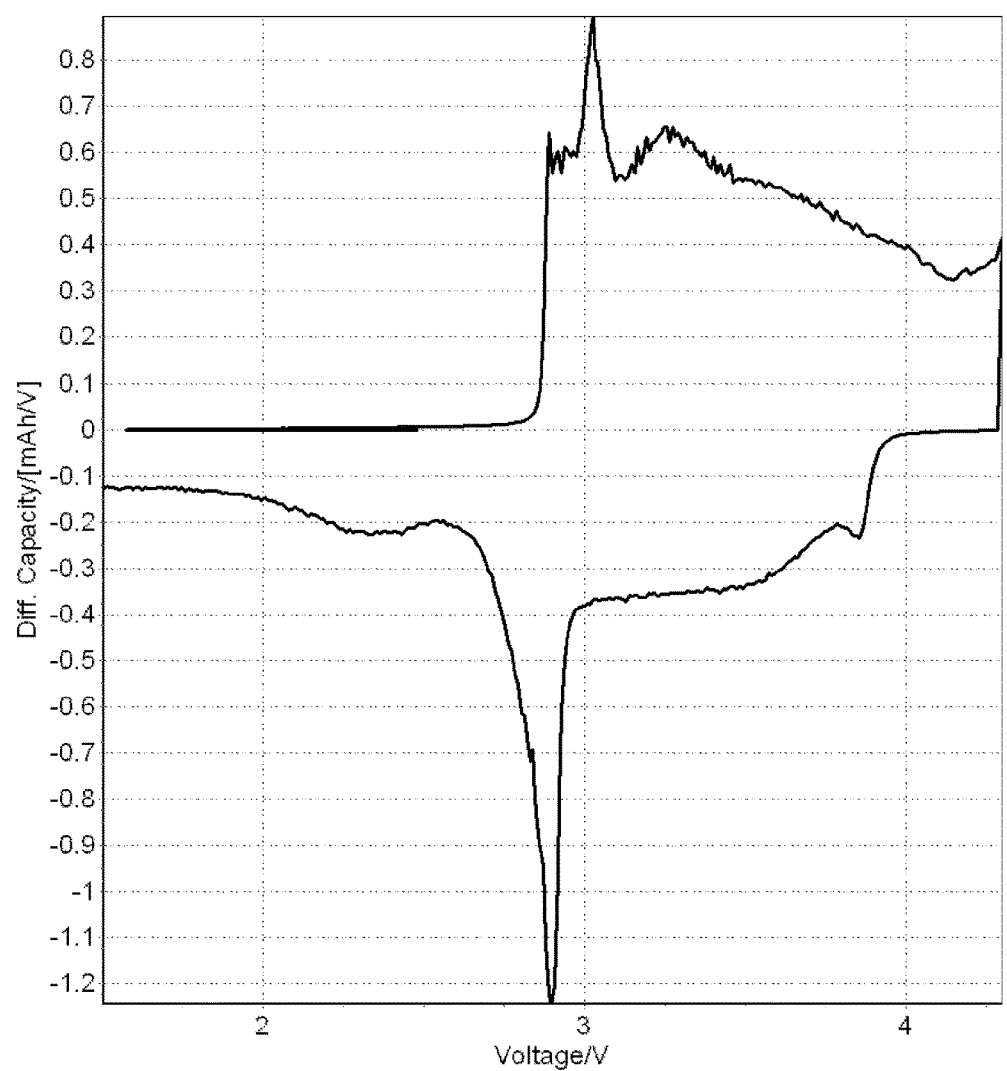
Figure 9F:
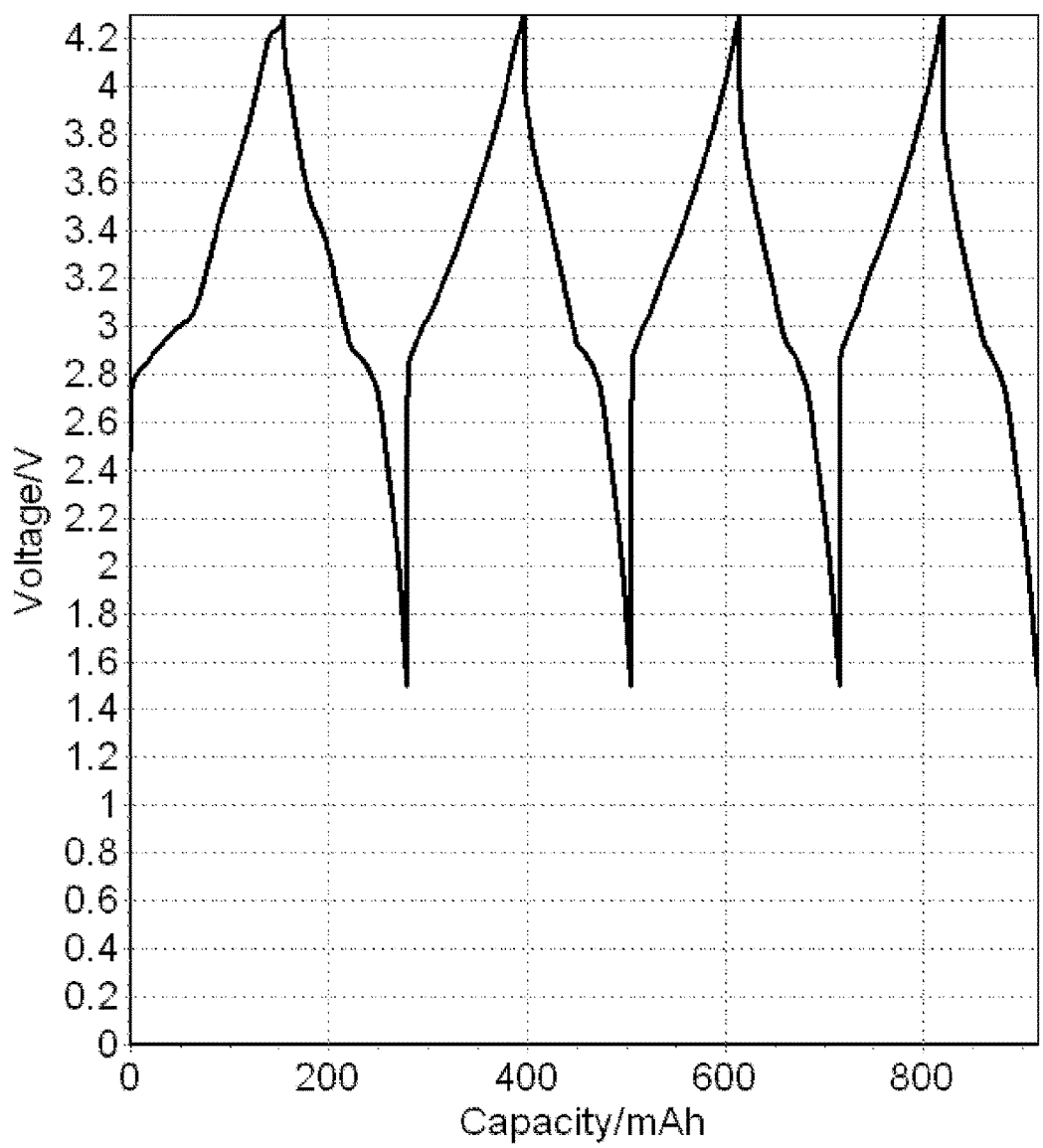

FIG. 9(C) shows Powder X-ray diffraction pattern of NaNi$_{1/2}$Mn$_{1/4}$Sn$_{1/8}$Ti$_{1/8}$O$_{1.958}$. The electrochemistry of the material NaNi$_{1/2}$Mn$_{1/4}$Sn$_{1/8}$Ti$_{1/8}$O$_{1.958}$ (Example 9) was slightly different to that measured for NaNi$_{1/2}$Mn$_{1/4}$Sn$_{1/8}$Ti$_{1/8}$O$_2$ (Example 3). When tested in a sodium metal anode cell NaNi$_{1/2}$Mn$_{1/4}$Sn$_{1/8}$Ti$_{1/8}$O$_{1.958}$ shows an initial charge capacity of 150 mAh/g, as represented in FIG. 9(D). FIG. 9(E) shows that NaNi$_{1/2}$Mn$_{1/4}$Sn$_{1/8}$Ti$_{1/8}$O$_{1.958}$ (Example 9) shows reduced losses on the first electrochemical cycle when compared to NaNi$_{1/2}$Mn$_{1/4}$Sn$_{1/8}$Ti$_{1/8}$O$_2$ (Example 3). When considered in conjunction with the prior art; Na ion cells reported in the literature commonly show poor specific capacity and show rapid capacity fade after only a few cycles. For example, it is common for a Na ion cathode material such as NaNi$_{0.5}$Ti$_{0.5}$O$_2$ to show a cycling capacity of 79 mAh/g which is significantly lower than that observed for NaNi$_{1/2}$Mn$_{1/4}$Sn$_{1/8}$Ti$_{1/8}$O$_{1.958}$ (Example 9). As shown in FIGS. 9(D)-9(E) we can see that inclusion of Sn in the structure of oxygen deficient materials still provides several notable benefits over the prior art, including high reversibility and increased cycling capacity. The cumulative capacity plot of Example 9 is shown in FIG. 9(F).

The Electrochemical Properties of Materials with Oxygen Non-Stoichiometry Example 10

Referring to FIGS. 10(A)-10(F)

The loss of oxygen from the stoichiometric material NaNi$_{1/2}$Ti$_{3/8}$Sn$_{1/8}$O$_2$ (Example 8) was also induced by a secondary process step forming NaNi$_{1/2}$Ti$_{3/8}$Sn$_{1/8}$O$_{2-d}$ (Example 10). The secondary process step involved re-heating the material to a temperature of 950° C. under a flow of Nitrogen. The loss of oxygen from the stoichiometric material NaNi$_{1/2}$Ti$_{3/8}$Sn$_{1/8}$O$_2$ (Example 8) was quantified using TGA-STA (Thermo-Gravimetric Analysis-Simultaneous Thermal Analysis) in a similar manner to that described for the synthesis of Example 9. The loss of oxygen upon heating and cooling NaNi$_{1/2}$Ti$_{3/8}$Sn$_{1/8}$O$_2$ in different atmospheres was measured by reheating in air or nitrogen at a rate of 10°/min up to 950° C. The temperature was then held at 950° C. for 30 minutes before cooling at a rate of 10° C./min in either a flow of nitrogen or air. This post processing and the corresponding TGA/STA analysis confirms the reversible incorporation and loss of oxygen from the material in different processing methods in this material composition also.

Figure 10A:
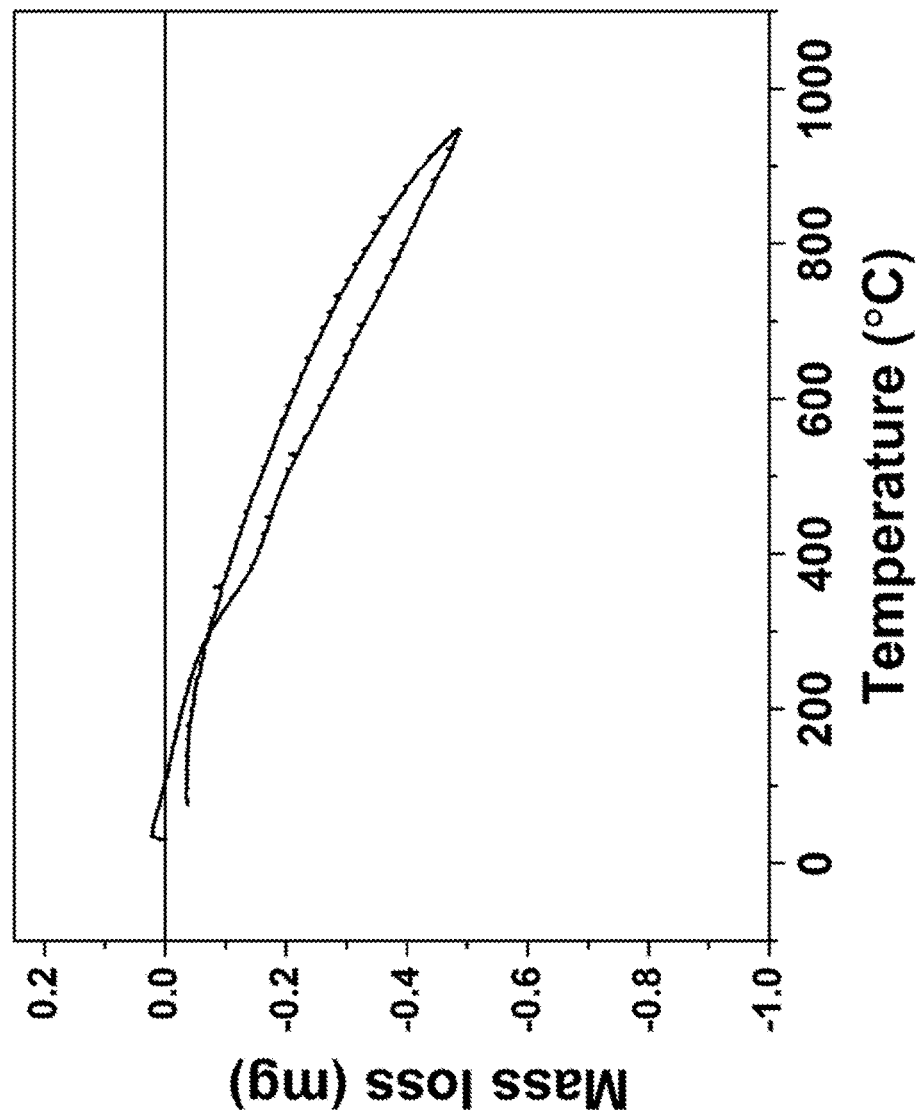
FIG. 10 (A) shows the result of TGA-STA of $NaNi_{1/2}Ti_{3/8}Sn_{1/8}O_2$ prepared according to Example 10A, i.e. Example 8 followed by an additional heat treatment step in which the sample was heated to 950° C. and cooled in air.
FIG. 10(C) shows the Powder X-ray diffraction pattern of $NaNi_{1/2}Ti_{3/8}Sn_{1/8}O_2$ prepared according to Example 10B (The peaks present at 2θ=50 and 16 originate from the specimen holder)
FIG. 10(D) shows the first four charge-discharge voltage profiles (Na-ion half cell Voltage [V] versus Cathode specific capacity [mAh/g]) for the cathode material prepared according to Example 10B.
FIG. 10(E) shows the Differential Capacity Profiles for the $3^{rd}$ charge cycle (Differential Capacity [mAh/g/V] versus Na-ion half Cell Voltage [V]) for the cathode material prepared according to Example 10B.
FIG. 10(F) shows the Charge-Discharge Voltage Profiles for the first four cycles (Na-ion half cell Voltage [V] versus Cumulative Cathode Specific Capacity [mAh/g]) for the cathode material prepared according to Example 10B.
Figure 10B:
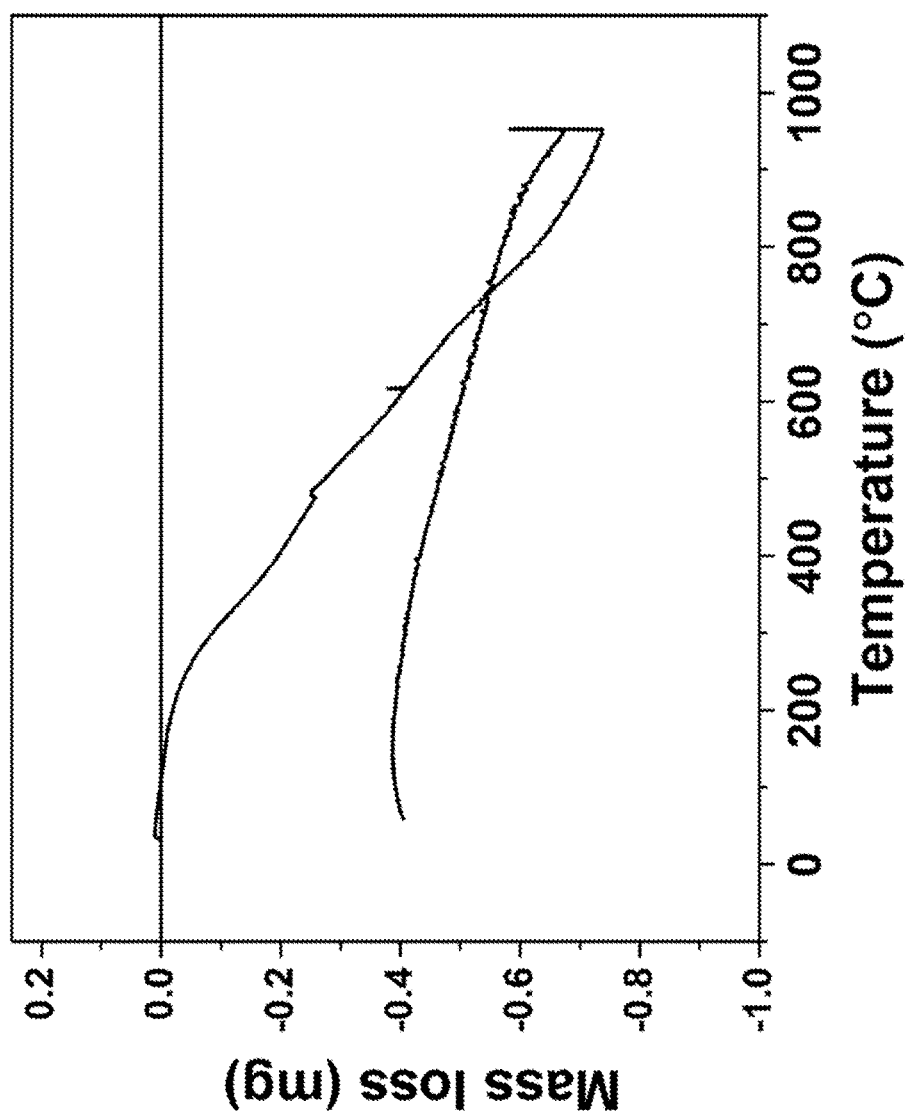

FIG. 10(A) shows the TGA-STA results of NaNi$_{1/2}$Ti$_{3/8}$Sn$_{1/8}$O$_2$ when reheated to a temperature of 950° C. under a flow of air or nitrogen. When this material is heated and cooled in air there is no mass loss difference between the starting and finishing material after firing up to 950° C. FIG. 10 (B) shows the TGA-STA results of NaNi$_{1/2}$Ti$_{3/8}$Sn$_{1/8}$O$_2$ as when heated and cooled under N$_2$, in which a clear mass difference exists between the starting and finishing material after firing to 950° C. under Nitrogen. This sample shows a mass loss of 0.4 mg from 75.504 mg of material, assuming that this is related to oxygen loss this leads to a formula of NaNi$_{1/2}$Ti$_{3/8}$Sn$_{1/8}$O$_{1.96}$ with a formula weight of 116.52.

Figure 10C:
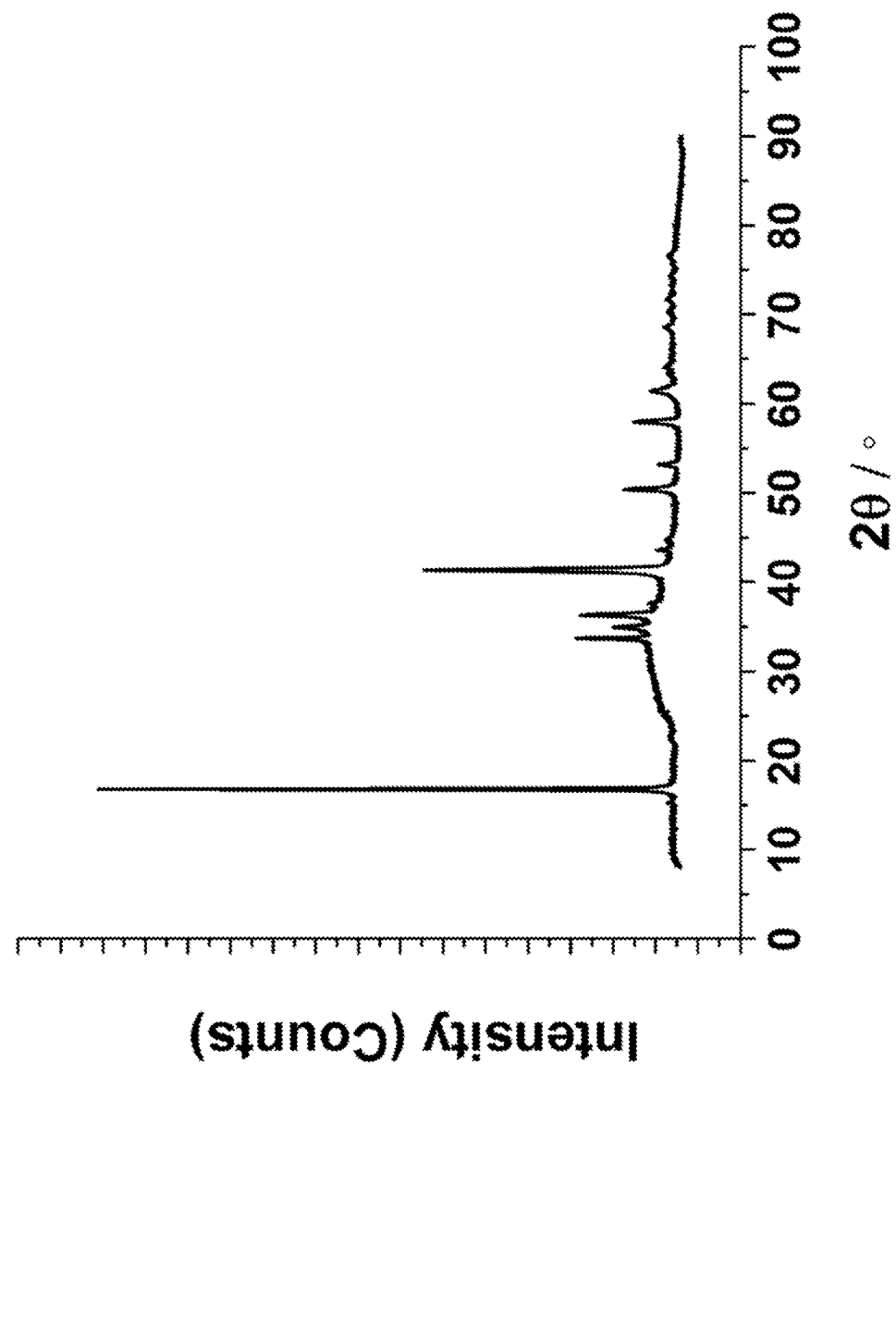
Figure 10D:
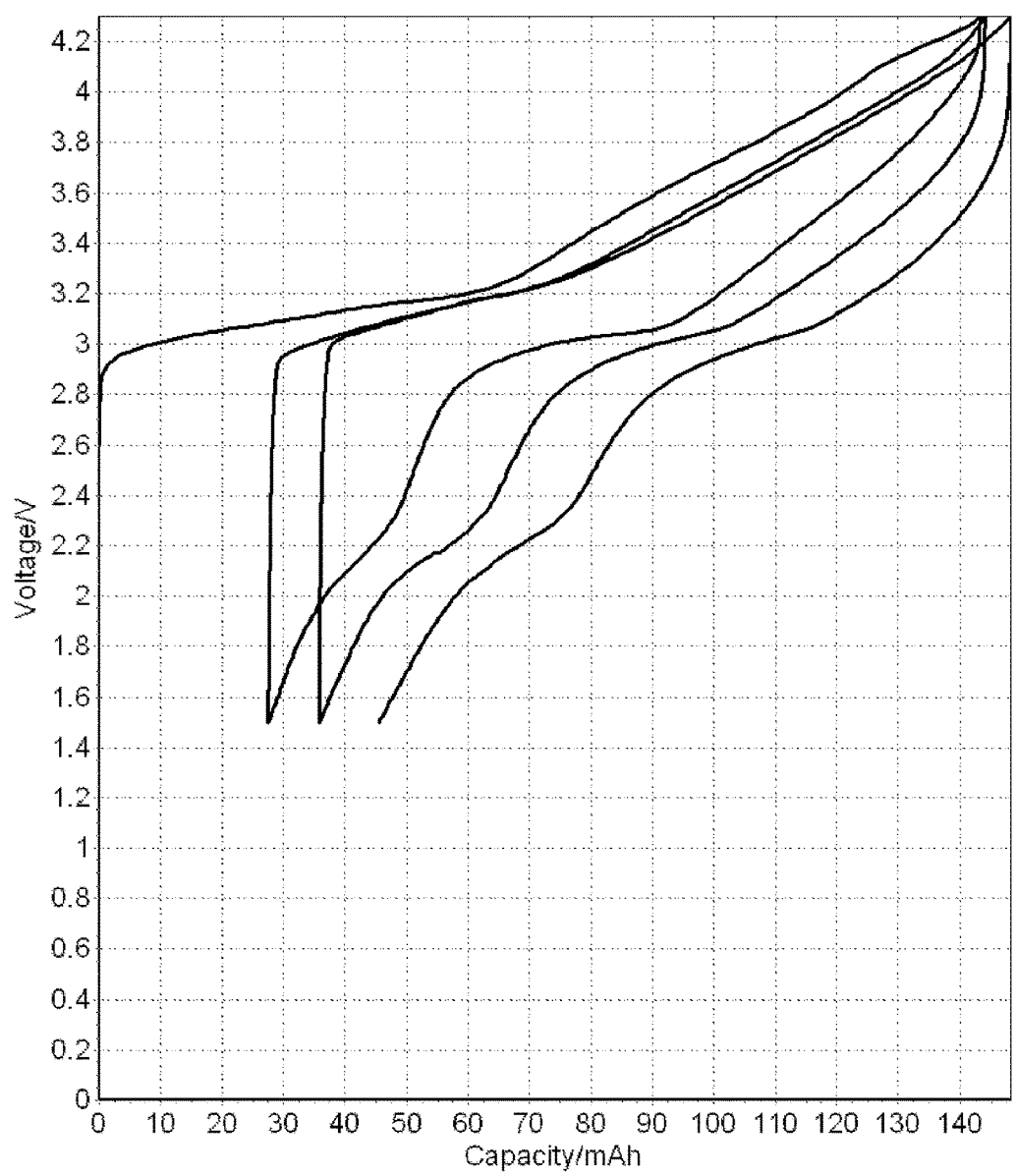
Figure 10E:
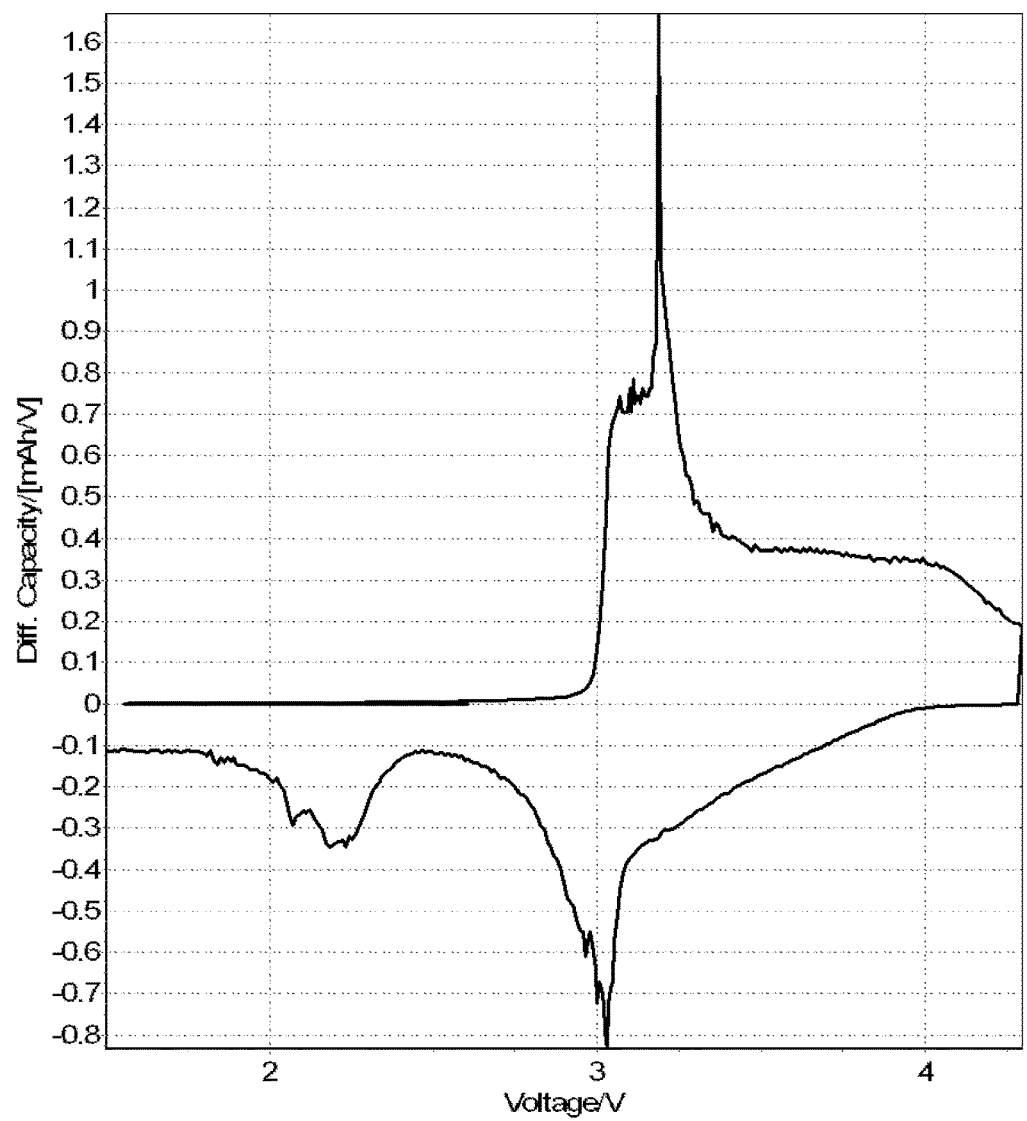
Figure 10F:
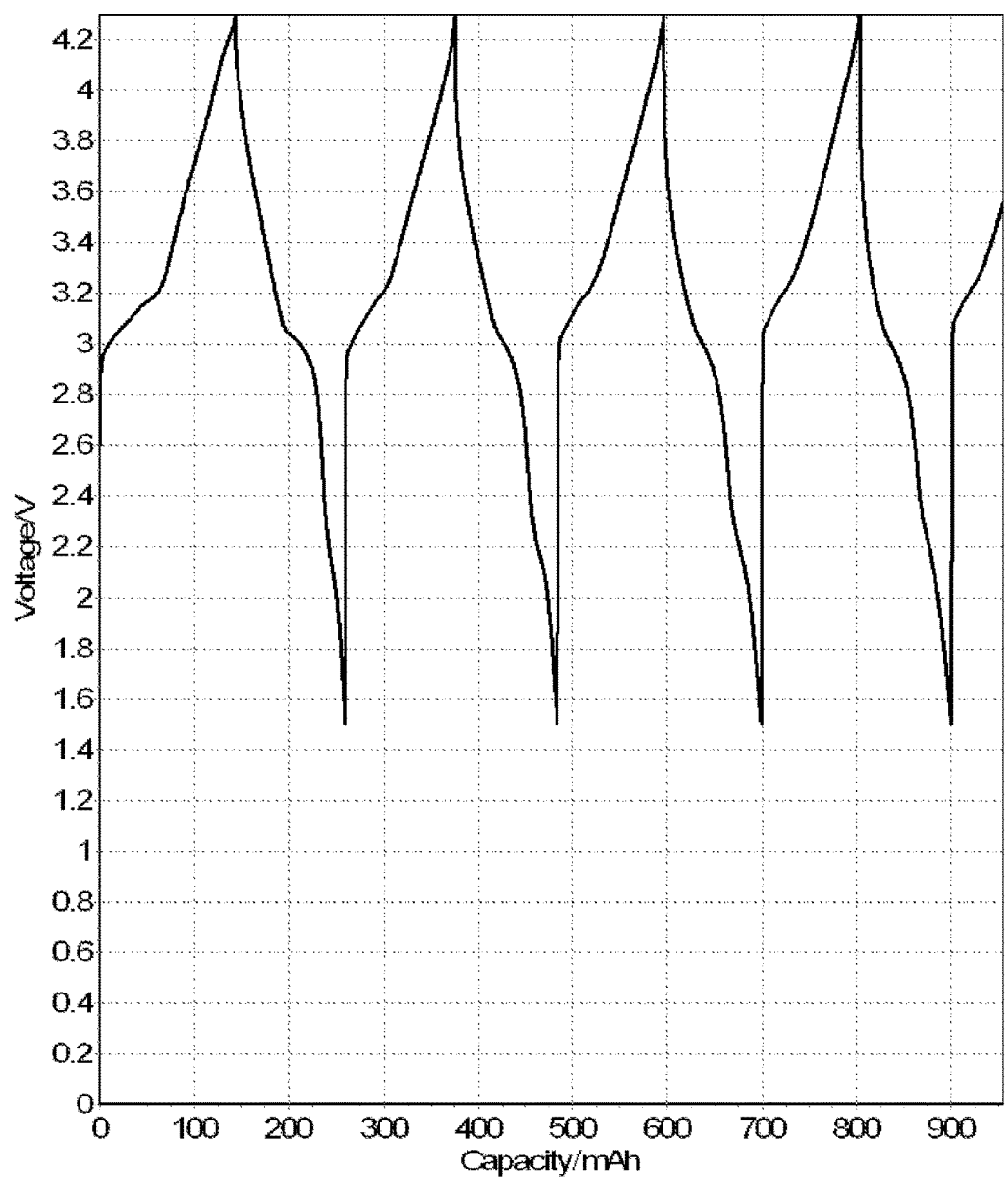

FIG. 10(C) shows the Powder X-ray diffraction pattern of NaNi$_{1/2}$Ti$_{3/8}$Sn$_{1/8}$O$_{1.96}$ (Example 10) after heating the layered oxide under nitrogen to 950° C. and cooling under nitrogen. FIG. 10(D) shows the first four charge-discharge voltage profiles (Na-ion half cell Voltage [V] versus Cathode specific capacity [mAh/g]) for the cathode material tested in a sodium metal half cell. Initial charge capacities of 145 mAh/g are observed with an initial discharge capacity of 120 mAh/g. When considered in conjunction with the prior art; NaNi$_{0.5}$Ti$_{0.5}$O$_2$ shows a cycling capacity of 79 mAh/g and a capacity fade of ca. 50% in the first 30 cycles. As shown in FIGS. 10(D)-10(E) we can see that inclusion of Sn in the structure of oxygen deficient materials still provides several notable benefits over the prior art, including high reversibility, and higher discharge capacities. The cumulative capacity plot of Example 10 is shown in FIG. 10(F).

The Electrochemical Properties of NaNi$_{1/4}$Na$_{1/6}$Mn$_{13/24}$Sn$_{1/24}$O$_2$, Prepared According to Example 11

Figure 11A:
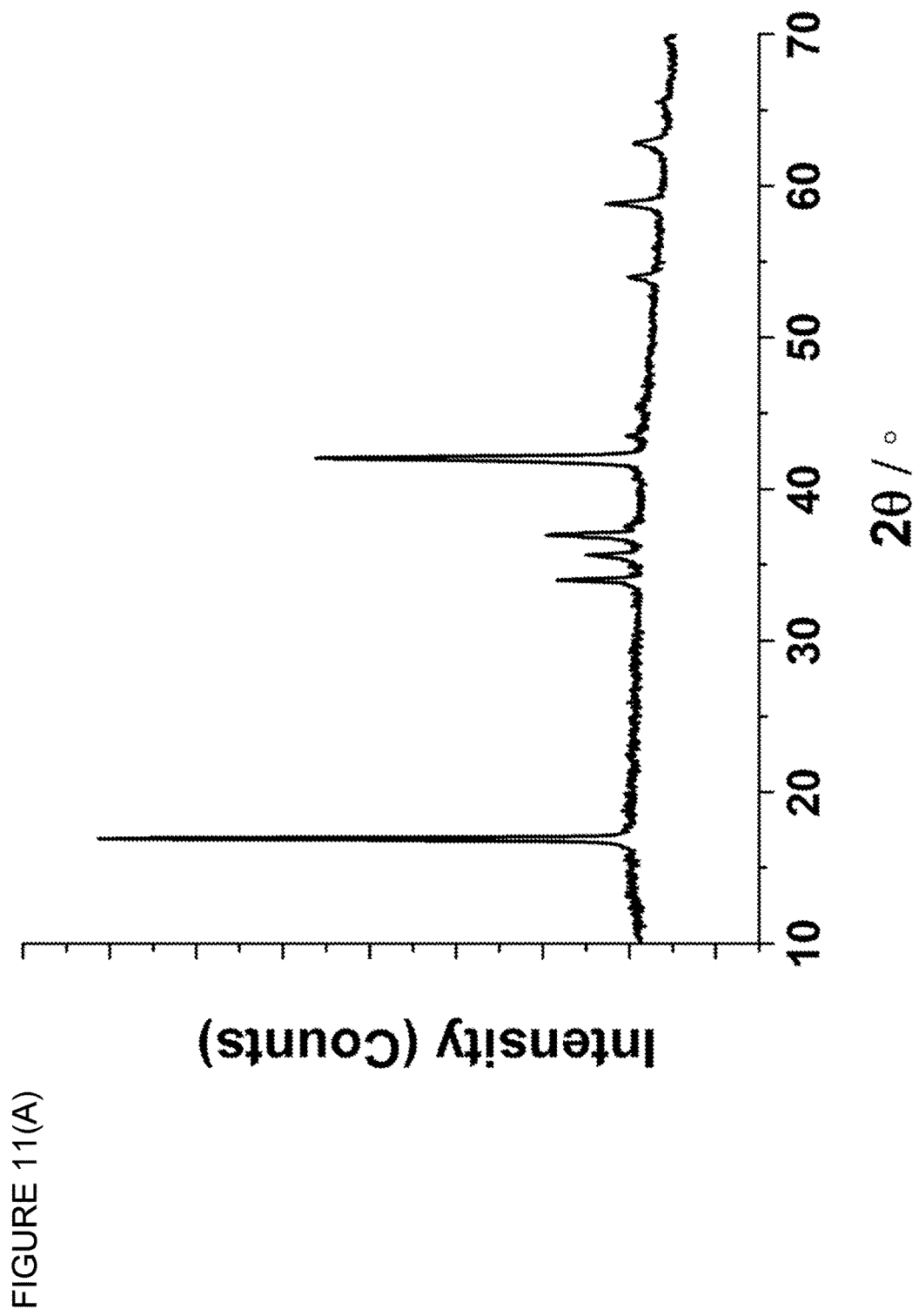
FIG. 11(A) shows the Powder X-ray diffraction pattern for $NaNi_{1/4}Na_{1/6}Mn_{13/24}Sn_{1/24}O_2$ prepared according to Example 11.

Referring to FIGS. 11(A)-11(B)

The data shown in FIGS. 11(A)-11(B) shows the Powder X-ray diffraction pattern of Na NaNi$_{1/4}$ Na$_{1/6}$Mn$_{13/24}$Sn$_{1/24}$O$_2$ which shows this material crystallises into a O3 layered oxide phase, and FIG. 11(B) shows the first ten charge-discharge voltage profiles (Na-ion half cell Voltage [V] versus Cathode specific capacity [mAh/g]) for the cathode material.

The data shown in figure (FIG. 11(B)) is derived from the constant current cycling of Na NaNi$_{1/4}$ Na$_{1/6}$Mn$_{13/24}$Sn$_{1/24}$O$_2$ (Example 11) in a Na metal anode cell. The data was collected at an approximate current density of 10 mA/g between the voltage limits of 1.50 V-4.3 V Vs Na/Na$^+$. From FIG. 11(B) it is seen that the incorporation of Sn in the cathode active material shows an increase in the reversible cathode capacity to ca. 200 mAh/g. Furthermore, it is clear in this example that inclusion of Sn yields a sloping Voltage profile which is less structured than many prior art materials. This is an important observation as it indicates a single phase reaction upon de-intercalation and a solid solution of sodium in the structure. This is advantageous for good cyclability and prolonged cycle life.

The Electrochemical Properties of NaNi$_{1/4}$Na$_{1/6}$Mn$_{1/12}$Ti$_{5/12}$Sn$_{1/12}$O$_2$, Prepared According to Example 12

Figure 12A:
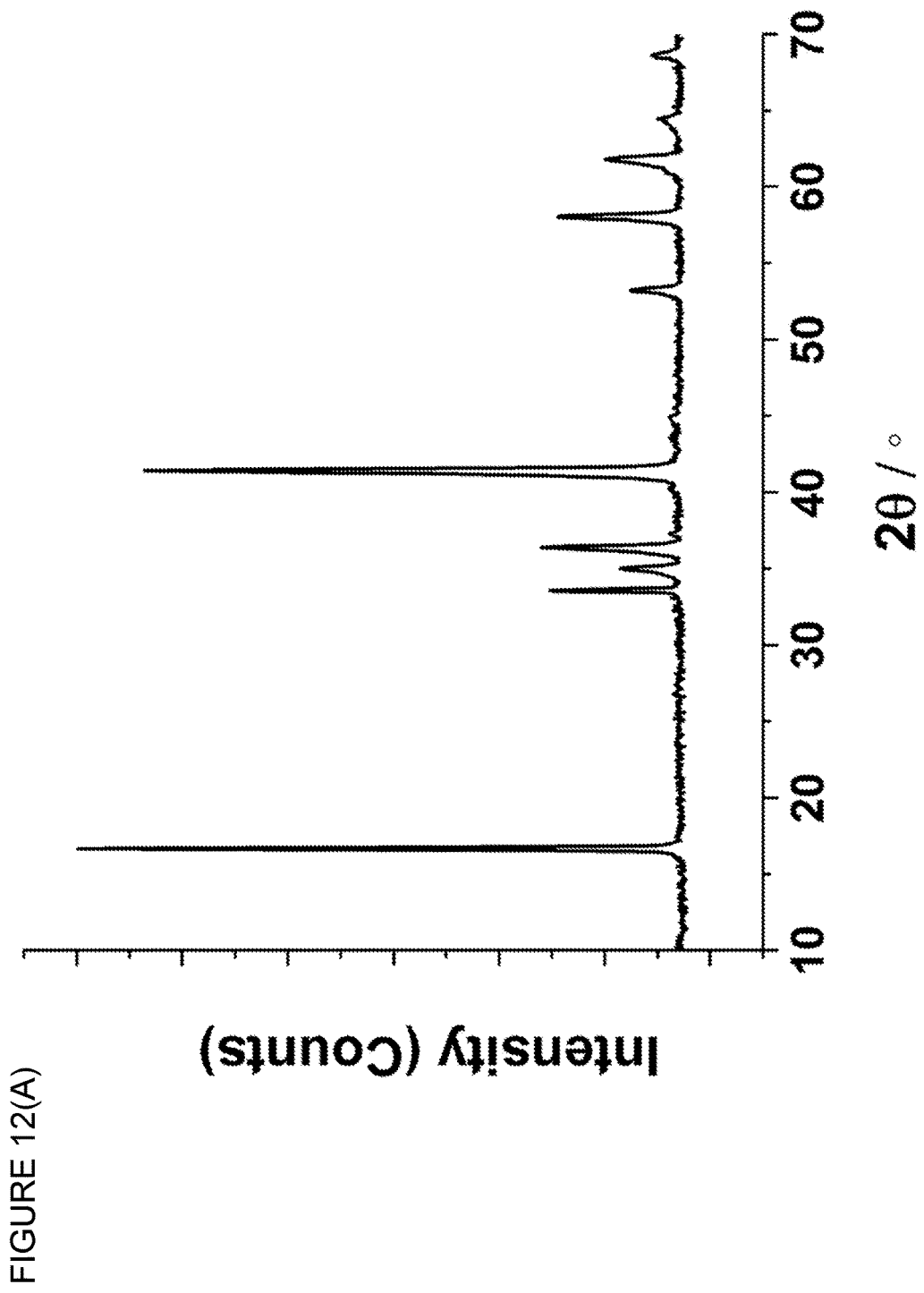
FIG. 12(A) shows the Powder X-ray diffraction pattern of $NaNi_{1/4}Na_{1/6}Mn_{1/12}Ti_{5/12}Sn_{1/12}O_2$ prepared according to Example 12.
Figure 12B:
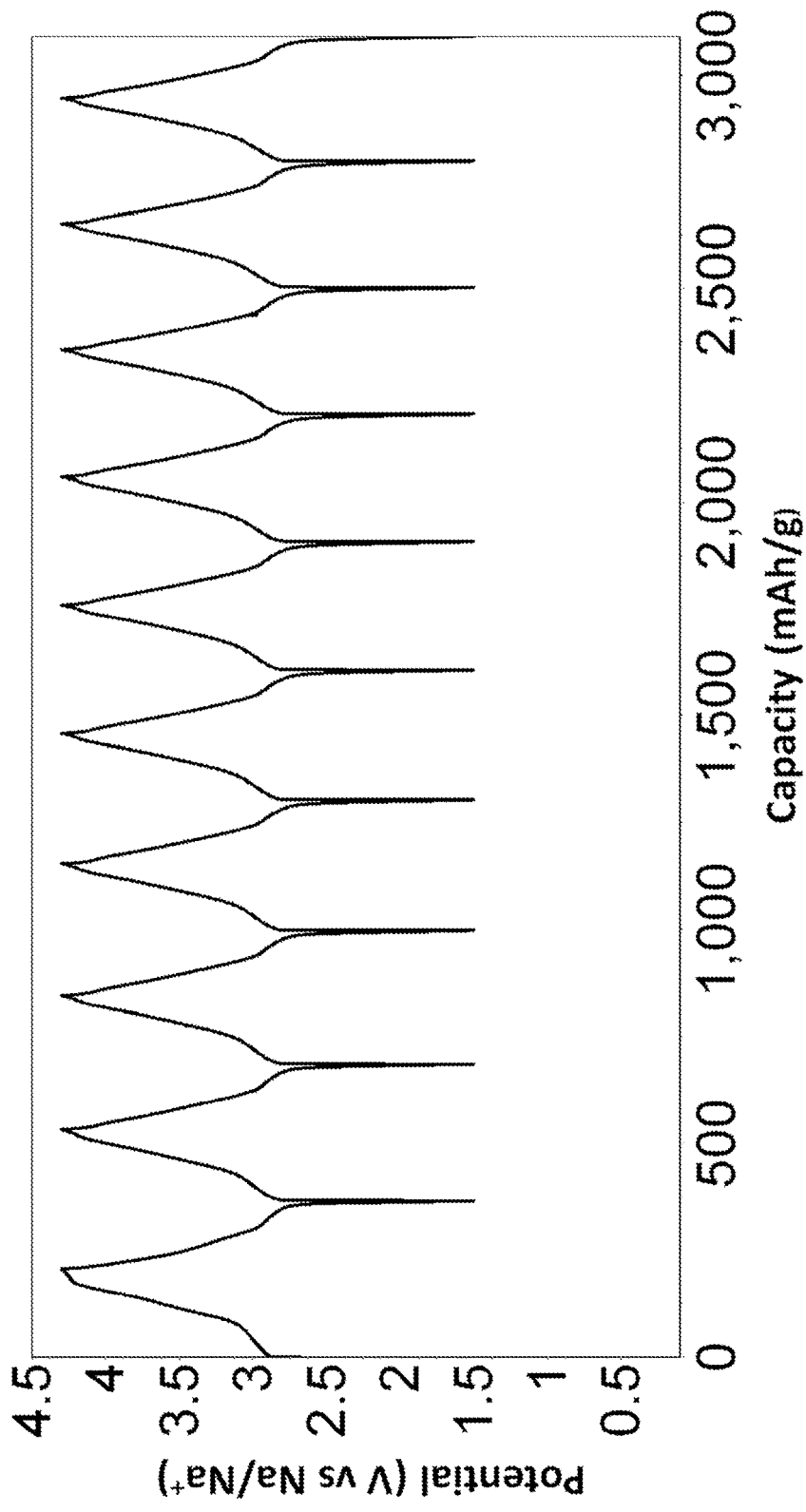
FIG. 12(B) shows the first ten charge-discharge voltage profiles (Na-ion half cell Voltage [V vs Na/Na$^+$] plotted against Cathode specific capacity [mAh/g]) for the cathode material prepared according to Example 12.

Referring to FIGS. 12(A)-12(B):

NaNi$_{1/4}$Na$_{1/6}$Mn$_{1/12}$Ti$_{5/12}$Sn$_{1/12}$O$_2$ was prepared according to Example 12 by a solid state reaction. The material has an O3 type layered oxide structure as shown in FIG. 12(A), when tested in a sodium metal anode cell an initial charge capacity of 230 mAh/g is observed and a discharge capacity of 163 mAh/g. From FIG. 12(B) it is observed that the incorporation of Sn in the cathode active material shows an increase in the reversible cathode capacity and consistent with other examples demonstrated a sloping voltage profile. This is advantageous for good cyclability and prolonged cycle life.

The Electrochemical Properties of NaNi$_{1/4}$Na$_{1/6}$Mn$_{2/12}$Ti$_{4/12}$Sn$_{1/12}$O$_2$, Prepared According to Example 13

Figure 13A:
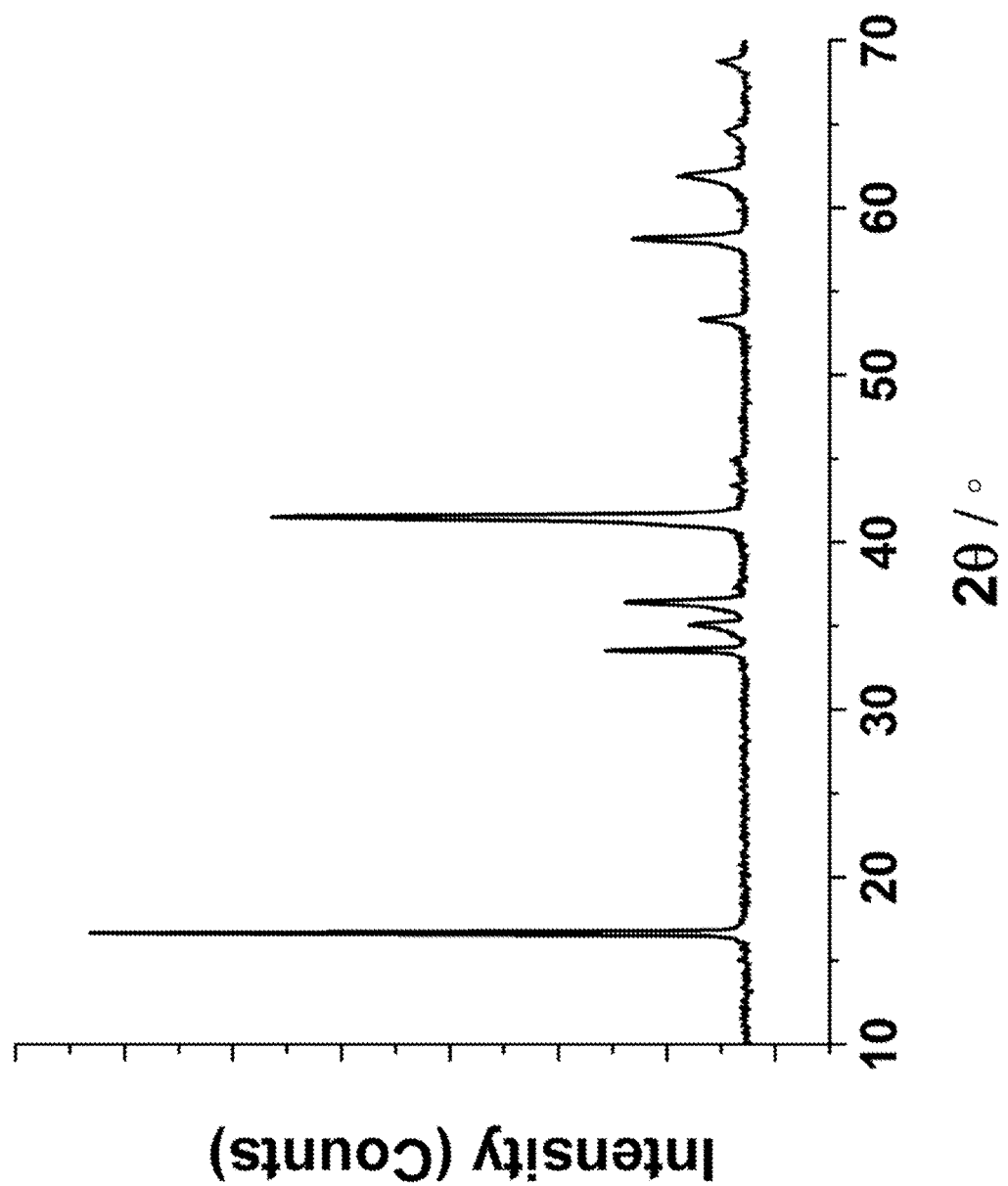
FIG. 13(A) shows the Powder X-ray diffraction pattern of $NaNi_{1/4}Na_{1/6}Mn_{2/12}Ti_{4/12}Sn_{1/12}O_2$ prepared according to Example 13.
Figure 13B:
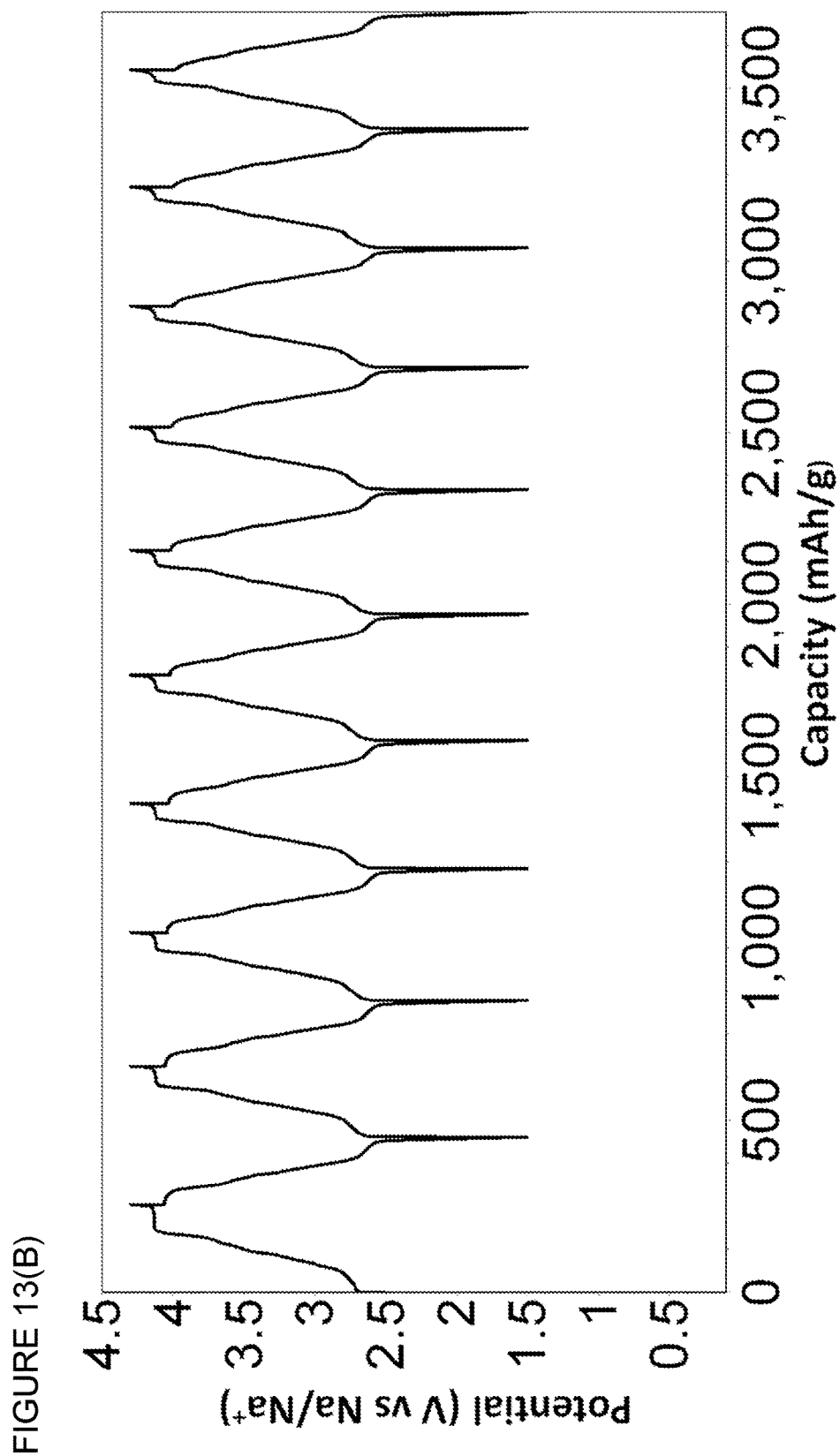
FIG. 13(B) shows the first ten charge-discharge voltage profiles (Na-ion half cell Voltage [V vs Na/Na$^+$] plotted against Cathode specific capacity [mAh/g]) for the cathode material prepared according to Example 13.

Referring to FIGS. 13(A)-13(B):

NaNi$_{1/4}$Na$_{1/6}$Mn$_{2/12}$Ti$_{4/12}$Sn$_{1/12}$O$_2$ was prepared according to Example 13 by a solid state reaction. The material also has an O3 type layered oxide structure as shown in FIG. 13(A), when tested in a sodium metal anode cell an initial charge capacity of 210 mAh/g is observed and a discharge capacity of 160 mAh/g. From FIG. 13(B) it is observed that the incorporation of Sn in the cathode active material shows an increase in the reversible cathode capacity and consistent with other examples demonstrated a sloping voltage profile. This is advantageous for good cyclability and prolonged cycle life.

The invention claimed is:

1. An electrode comprising an active compound of the formula:

$$A_U M^1{}_V M^2{}_W M^3{}_X O_{2\pm\delta}$$

wherein
A is one or more alkali metals selected from sodium and/or potassium;
M$^1$ comprises one or more redox active metals with an oxidation state in the range +2 to +4
M$^2$ comprises tin, optionally in combination with one or more metals;
M$^3$ comprises one or more transition metals either alone or in combination with one or more non-transition elements selected from alkali metals, alkaline earth metals, other metals and metalloids, with an oxidation state in the range +1 to +5;
wherein
the oxidation state of M$^1$, M$^2$, and M$^3$ are chosen to maintain charge neutrality and further wherein
δ is in the range 0≤δ≤0.4;
U is in the range 0.3<U<2;
V is in the range 0.1≤V<0.75;
W is in the range 0<W<0.75;
X is in the range 0≤X<0.5;
and (U+V+W+X)<4.0.

2. The electrode according to claim 1, wherein
U is in the range 0.5<U<2;
V is in the range 0.1≤V<0.75;
W is in the range 0<W<0.75 and
X is in the range 0≤X<0.5.

3. The electrode according claim 1, wherein M$^1$ comprises one or more metals selected from nickel, manganese, cobalt, iron and chromium.

4. The electrode according to claim 1, wherein M$^2$ comprises tin, optionally in combination with one or more metals selected from magnesium, copper, titanium, vanadium, chromium and manganese.

5. The electrode according to claim 1, wherein $M^3$ comprises one or more transition metals selected from titanium, vanadium, niobium, tantalum, hafnium, chromium, molybdenum, tungsten, manganese, iron, osmium, cobalt, nickel, palladium, platinum, copper, silver, gold, zinc, cadmium, scandium, yttrium, zirconium, technetium, rhenium, ruthenium, rhodium, iridium and mercury; and optionally one or more non-transition elements selected from: alkali metals including lithium, sodium and potassium; other metals including aluminium, gallium, indium, lead, bismuth and thallium; alkaline earth metals including magnesium, calcium, beryllium, strontium and barium; and metalloids including boron, silicon, germanium, arsenic, antimony and tellurium.

6. The electrode according to claim 1 wherein the formula of the compound is one of:
$NaNi_{1/2}Mn_{1/4}Sn_{1/4}O_2$
$NaNi_{1/3}Mn_{1/3}Sn_{1/6}Mg_{1/6}O_2$
$NaNi_{1/2}Mn_{1/4}Sn_{1/8}Ti_{1/8}O_2$
$NaNi_{1/4}Mn_{4/12}Sn_{3/12}Na_{1/6}O_2$
$NaNi_{1/3}Mn_{1/6}Sn_{1/6}Mg_{1/6}Ti_{1/6}O_2$
$NaNi_{1/2}Mn_{1/4}Sn_{1/8}Ti_{1/8}O_2$
$NaNi_{1/2}Ti_{1/4}Sn_{1/4}O_2$
$Na_{0.95}Ni_{0.3167}Mn_{0.3167}Mg_{0.1625}Sn_{0.2018}O_2$
$Na_{0.95}Ni_{0.3167}Sn_{0.3167}Mg_{0.1625}Ti_{0.2018}O_2$
$NaNi_{1/2}Sn_{1/2}O_2$
$NaNi_{1/2}Ti_{1/4}Sn_{1/4}O_2$
$NaNi_{1/2}Ti_{3/8}Sn_{1/8}O_2$
$NaCo_{1/8}Ni_{1/8}Na_{1/6}Mn_{4/12}Sn_{3/12}O_2$
$NaCo_{1/2}Mn_{4/12}Sn_{3/12}Na_{1/6}O_2$
$NaCo_{1/2}Mn_{1/4}Sn_{1/8}Ti_{1/8}O_2$
$NaCo_{1/2}Sn_{1/2}O_2$
$NaCo_{1/2}Sn_{1/4}Ti_{1/4}O_2$
$NaMn_{1/2}Sn_{1/2}O_2$
$NaMn_{1/2}Ti_{1/4}Sn_{1/4}O_2$
$NaFe_{1/2}Mn_{1/4}Sn_{1/8}Ti_{1/8}O_2$
$NaFe_{1/2}Sn_{1/2}O_2$
$NaFe_{1/4}Mn_{4/12}Sn_{3/12}Na_{1/6}O_2$
$NaNi_{1/2}Mn_{1/4}Sn_{1/8}Ti_{1/8}O_{1.9}$
$NaNi_{1/2}Ti_{3/8}Sn_{1/8}O_{1.95}$
$NaNi_{1/4}Na_{1/6}Mn_{13/24}Sn_{1/24}O_2$
$NaNi_{1/4}Na_{1/6}Mn_{1/12}Ti_{5/12}Sn_{1/12}O_2$
$NaNi_{1/4}Na_{1/6}Mn_{2/12}Ti_{4/12}Sn_{1/12}O_2$.

7. An energy storage device comprising the electrode according to claim 1.

8. The energy storage device according to claim 7 suitable for use as one or more of the following: a sodium and/or potassium ion cell; a sodium and/or potassium metal cell; a non-aqueous electrolyte sodium and/or potassium ion cell; and an aqueous electrolyte sodium and/or potassium ion cell.

9. A rechargeable battery comprising the electrode according to claim 1.

10. An electrochemical device comprising the electrode according to claim 1.

11. An electrochromic device comprising the electrode according to claim 1.

12. A method of preparing the compound according to claim 1 comprising the steps of:
a) mixing starting materials together,
b) heating the mixed starting materials in a furnace at a temperature of between 400° C. and 1500° C., for between 2 and 20 hours to form a reaction product; and
c) allowing the reaction product to cool.

13. The energy storage device according to claim 7, further comprising a counter electrode and one or more electrolyte materials.

14. A compound of the formula:

$$A_U M^1{}_V M^2{}_W M^3{}_X O_{2\pm\delta}$$

wherein
A is one or more alkali metals selected from sodium and/or potassium;
$M^1$ comprises one or more redox active metals with an oxidation state in the range +2 to +4, selected from nickel, manganese, iron and chromium;
$M^2$ comprises tin, optionally in combination with one or more metals;
$M^3$ comprises one or more transition metals either alone or in combination with one or more non-transition elements selected from alkali metals, alkaline earth metals, other metals and metalloids, with an oxidation state in the range +1 to +5;
wherein
the oxidation state of $M^1$, $M^2$, and $M^3$ are chosen to maintain charge neutrality and further wherein
$\delta$ is in the range $0 \leq \delta \leq 0.4$;
U is in the range $0.3 < U < 2$;
V is in the range $0.1 \leq V < 0.75$;
W is in the range $0 < W < 0.75$;
X is in the range $0 \leq X < 0.5$;
and $(U+V+W+X) < 4.0$.

15. The compound according to claim 14, wherein
U is in the range $0.5 < U < 2$;
V is in the range $0.1 \leq V < 0.75$;
W is in the range $0 < W < 0.75$ and
X is in the range $0 \leq X < 0.5$.

16. The compound according to claim 14, wherein $M^2$ comprises tin, optionally in combination with one or more metals selected from magnesium, copper, titanium, vanadium, chromium and manganese.

17. The compound according to claim 14, wherein $M^3$ comprises one or more transition metals selected from titanium, vanadium, niobium, tantalum, hafnium, chromium, molybdenum, tungsten, manganese, iron, osmium, cobalt, nickel, palladium, platinum, copper, silver, gold, zinc, cadmium, scandium, yttrium, zirconium, technetium, rhenium, ruthenium, rhodium, iridium and mercury; and optionally one or more non-transition elements selected from: alkali metals including lithium, sodium and potassium; other metals including aluminium, gallium, indium, lead, bismuth and thallium; alkaline earth metals including magnesium, calcium, beryllium, strontium and barium; and metalloids including boron, silicon, germanium, arsenic, antimony and tellurium.

18. The compound according to claim 14 of the formula:
$NaNi_{1/2}Mn_{1/4}Sn_{1/4}O_2$
$NaNi_{1/3}Mn_{1/3}Sn_{1/6}Mg_{1/6}O_2$
$NaNi_{1/2}Mn_{1/4}Sn_{1/8}Ti_{1/8}O_2$
$NaNi_{1/4}Mn_{4/12}Sn_{3/12}Na_{1/6}O_2$
$NaNi_{1/3}Mn_{1/6}Sn_{1/6}Mg_{1/6}Ti_{1/6}O_2$
$NaNi_{1/2}Mn_{1/4}Sn_{1/8}Ti_{1/8}O_2$
$NaNi_{1/2}Ti_{1/4}Sn_{1/4}O_2$
$Na_{0.95}Ni_{0.3167}Mn_{0.3167}Mg_{0.1625}Sn_{0.2018}O_2$
$Na_{0.95}Ni_{0.3167}Sn_{0.3167}Mg_{0.1625}Ti_{0.2018}O_2$
$NaNi_{1/2}Sn_{1/2}O_2$
$NaNi_{1/2}Ti_{1/4}Sn_{1/4}O_2$
$NaNi_{1/2}Ti_{3/8}Sn_{1/8}O_2$
$NaMn_{1/2}Sn_{1/2}O_2$
$NaMn_{1/2}Ti_{1/4}Sn_{1/4}O_2$
$NaFe_{1/2}Mn_{1/4}Sn_{1/8}Ti_{1/8}O_2$
$NaFe_{1/2}Sn_{1/2}O_2$
$NaFe_{1/4}Mn_{4/12}Sn_{3/12}Na_{1/6}O_2$
$NaNi_{1/2}Mn_{1/4}Sn_{1/8}Ti_{1/8}O_{1.9}$ $NaNi_{1/2}Ti_{3/8}Sn_{1/8}O_{1.95}$
$NaNi_{1/4}Na_{1/6}Mn_{13/24}Sn_{1/24}O_2$
$NaNi_{1/4}Na_{1/6}Mn_{1/12}Ti_{5/12}Sn_{1/12}O_2$
$NaNi_{1/4}Na_{1/6}Mn_{2/12}Ti_{4/12}Sn_{1/12}O_2$.

* * * * *